United States Patent [19]

Saga et al.

[11] Patent Number: 5,425,109
[45] Date of Patent: Jun. 13, 1995

[54] SYSTEM FOR IDENTIFYING FREEHAND DRAWINGS

[75] Inventors: Sato Saga; Hiromi Makino, both of Hokkaido, Japan

[73] Assignee: Mutoh Industries Ltd., Tokyo, Japan

[21] Appl. No.: 126,410

[22] Filed: Sep. 24, 1993

[30] Foreign Application Priority Data

| Oct. 22, 1992 | [JP] | Japan | 4-308291 |
| Nov. 20, 1992 | [JP] | Japan | 4-335229 |
| Nov. 20, 1992 | [JP] | Japan | 4-335230 |
| Nov. 20, 1992 | [JP] | Japan | 4-335231 |
| Nov. 20, 1992 | [JP] | Japan | 4-335232 |
| Nov. 20, 1992 | [JP] | Japan | 4-335233 |
| Nov. 20, 1992 | [JP] | Japan | 4-335234 |
| Nov. 20, 1992 | [JP] | Japan | 4-335235 |

[51] Int. Cl.$^6$ .............................................. G06K 9/00
[52] U.S. Cl. ..................... 382/187; 382/159; 382/201; 395/141
[58] Field of Search ................ 382/13, 23, 25, 14; 395/141, 142, 143

[56] References Cited

U.S. PATENT DOCUMENTS

| 4,878,249 | 10/1989 | Mifune et al. | 382/13 |
| 5,121,442 | 6/1992 | Togawa et al. | 382/23 |
| 5,231,697 | 7/1993 | Yamada | 395/141 |

FOREIGN PATENT DOCUMENTS 4157573 5/1992 Japan .

OTHER PUBLICATIONS

"The Fuzzy Spline Curve Indentifier: A Method for Enhancing Human Interface in Pen–Computing", Sato Saga et al., 6th Sapporo International Computer Graphics Symposium, Nov. 24, 1992.

"Fuzzy Spline Interpolation and its Application to On--Line Freehand Curve Indentification", Sato Saga et al., Second IEEE International Conference on Fuzzy Systems, Mar. 28, 1993.

Primary Examiner—Yon J. Couso
Attorney, Agent, or Firm—Lowe, Price, LeBlanc & Becker

[57] ABSTRACT

A system for identifying freehand curve drawings has: an input section for inputting a freehand curve drawing as a series of point data; a fuzzy-curve information generating section for generating fuzzy-curve information from the series of point data by adding input vagueness information to each of the series of points; a segmentation section for dividing the fuzzy curve information into a plurality of segments by evaluating a degree of standstill at each point; a curve-class identifying section for identifying a curve class and a representative curve in the class by measuring a possibility of the curve class for each segment with respect to each of a plurality of curve classes; and a connecting section for connecting representative curves by adjusting positions of the representative curves at each segment identified by the curve-class identifying section.

20 Claims, 45 Drawing Sheets

FIG. 19(a)     FIG. 19(b)
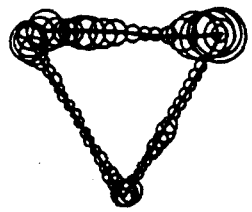 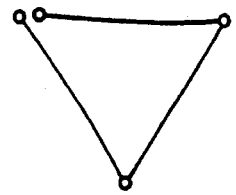
FIG. 20(a)     FIG. 20(b)
 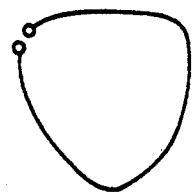
FIG. 21(a)     FIG. 21(b)
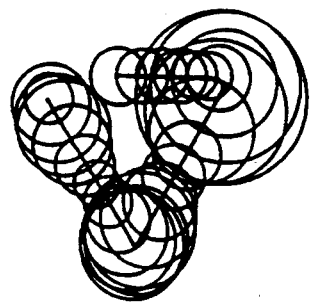 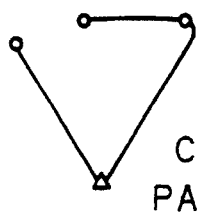
CANDIDATE FOR
PARTITION POINT

FIG. 54

If pLine                                                                Then Line(L)

If not(pLine) and pCircle                         and pClosed            Then Circle(C)

If not(pLine) and pCircle                         and not(pClosed)       Then Circular Arc(CA)

If not(pLine) and not(pCircle) and pEllipse       and pClosed            Then Ellipse(E)

If not(pLine) and not(pCircle) and pEllipse       and not(pClosed)       Then Elliptic Arc(EA)

If not(pLine) and not(pCircle) and not(pEllipse)  and pClosed            Then Closed Free Curve(FC)

If not(pLine) and not(pCircle) and not(pEllipse)  and not(pClosed)       Then Open Free Curve(FO)

FIG. 67A
FIG. 67B
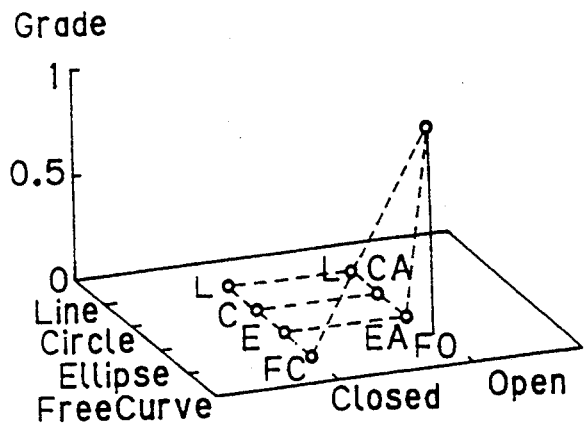
FIG. 68A
FIG. 68B
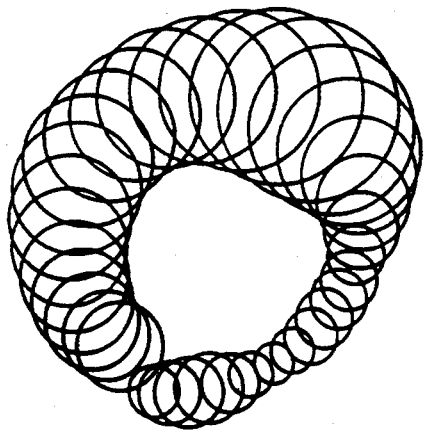
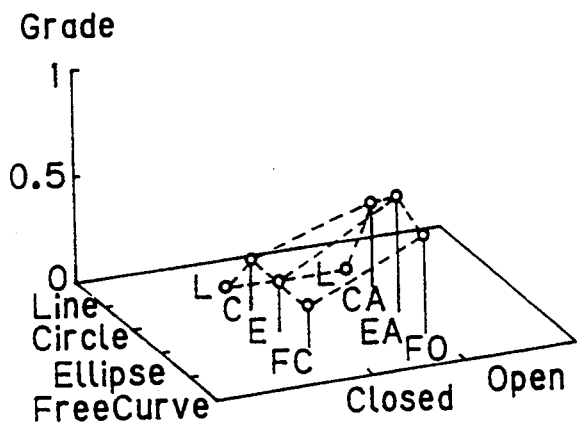

SYSTEM FOR IDENTIFYING FREEHAND DRAWINGS

BACKGROUND OF THE INVENTION

1. Field of the Invention

The present invention relates to a system for identifying freehand drawings such as characters and symbols, more specifically, the present invention relates to a freehand curve-drawing identifying system which inputs a fuzzy curve as fuzzy curve data involving vagueness in drawing, compares a curve sample model in which the input fuzzy curve data is divided into a plurality of segments with a fuzzy reference model as a reference pattern to discriminate a pattern of the input curve, and recognizes a pattern of the entire freehand curve from the segments.

2. Description of the Related Art

In recent years, a system so called a pen computer and the like, i.e. a computer system having as an input and output unit a pen and tablet system with a display unit has been highlighted. Such a pen computer system comprises, for example, a computer, a tablet with display connected to the computer and an input pen for input operation connected to the tablet. In this case, the tablet with display serves both as a display unit of an output unit of the computer and as an input unit of the computer.

In systems using such freehand input and in application programs executed by such systems, pen-input data by a drawer is recognized within the computer. For this reason, a curve-drawing data input by freehand pen must be recognized and determined within the computer.

Data input by pen on the tablet is generally given as a series of dots sampled at regular intervals of time. Accordingly, a spline interpolation technique is used to suitably interpolate to the sequence of dots so as to be capable of handling theoretically as a continuous curve.

As a conventional spline interpolation technique to obtain an interpolation curve from a given series of dots, combination coefficient of basis function is obtained based on coordinate data of each given point so as to express that the spline curve passes through these points. Then, a control polygon of the spline curve is obtained and finally the interpolation curve is obtained.

For example, in case of a cubic spline curve, a spline curve is obtained connected by cubic Bézier curves (which satisfies a so-called "$C^2$ continuity" conditions, for example) which mutually and smoothly joins between passing points of the given interpolation point.

In order to determine characters or symbols from the spline-interpolated pattern data, a degree of matching between an input sample drawing and a predetermined reference drawing is obtained and a character or a symbol is recognized and determined corresponding to the reference drawing having the highest matching degree.

In such a conventional computer system, the spline interpolation process of sampled drawings is performed on the premise that the given series of dots are conclusive dots. However, the given input points often involve vague points and points positions of which are not rigorously correct. Nevertheless, the conventional system takes no account of cases where vague points and points, positions of which are not correct are involved in the given series of dots.

Further, not only the sampled drawings but also the reference drawings are processed as-certain conclusive data. As a result, the information associated with the degree of matching is obtained as mere conclusive information.

Accordingly, it is extremely difficult for the conventional system to perform the recognition process reflecting the intention of the drawer by suitably evaluating the vagueness from the input series of dots which may involve the vague points and points positions of which are not correct.

In order to solve this problem, the inventors of the present application have filed a Japanese Patent Application Tokuganhei 4-157573 with the Japanese Patent Office, which proposes a pattern recognition method and apparatus therefor capable of performing the pattern recognition reflecting the intention of the drawer by suitably evaluating vague elements from the input information.

According to this pattern recognition method and apparatus therefor, an input sampled drawing is expressed by fuzzy spline curves involving vagueness of the input sampled drawing. This system obtains predetermined number of fuzzy-expressed representative point information associated with the sampled drawing and predetermined number of fuzzy-expressed representative point information associated with the reference drawing in one-to-one correspondence with the representative points of the sampled drawing. Then, the system obtains interval truth values of the entire curve drawing from interval truth values of degree of matching between corresponding pairs of the representative point information of the sampled drawing and the representative point information of the reference drawing. Finally, the system determines the degree of matching of the entire curve drawing.

However, it is difficult to process huge data instantaneously from a view point of limited processing capability of an inference processing system when a freehand drawing intended by the drawer is inferred, discriminated and recognized from curve information of the input sampled drawing expressed by the fuzzy spline curves involving vagueness.

SUMMARY OF THE INVENTION

An object of the present invention is to provide a system for identifying freehand curve drawings, which can identify the freehand curve drawings with higher accuracy and decrease the operational elements in one processing unit.

Another object of the present invention is to provide a system for identifying freehand curve drawings capable of identifying a curve at each segment while keeping continuity of the freehand curve drawings.

Further object of the present invention is to provide a system for identifying freehand curve drawings capable of identifying the freehand curve drawings with higher accuracy by inconclusive and conversational processing.

According to the present invention, a system for identifying freehand curve drawings comprises: an input section for inputting a freehand curve drawing as a series of point data; a fuzzy-curve information generating section for generating fuzzy-curve information from the series of point data by adding input vagueness information to each of the series of points; a segmentation section for dividing the fuzzy curve information into a plurality of segments by evaluating a degree of standstill at each point; and a curve-class identifying section for identifying a curve class and a representative curve in the class by measuring a possibility of the curve class for each segment with respect to each of a plurality of curve classes.

According to a preferred embodiment of the present invention, a connecting section for connecting the representative curves by adjusting positions of the representative curves at each segment identified by the curve-class identifying section.

According to another preferred embodiment of the present invention, the fuzzy-curve information generating section generates, in accordance with input state of the freehand curve drawings to the input section, the fuzzy-curve information from the series of points by adding an information of vagueness of input to each of the series of points, and interpolating to each of the series of points and the information of vagueness of input. The segmentation section indefinitely divides the fuzzy-curve information into a plurality of segments. A first correcting section is provided for appropriately correcting the divided result of the segmentation section. The curve-class identifying section indefinitely identifies the curve class and the representative curve in the class at each segment. A connecting section is provided for connecting the representative curves by adjusting the position of the representative curve at each segment obtained by the curve-class identifying section.

The connected representative curves are displayed by a display means. A second correcting section is provided for correcting the curve class and the representative curve at each segment to restart the connecting section. Further, a parameter converting section is provided for converting the connected representative curve at each segment into parameters of the curve drawing.

According to the present invention, the curve class is identified at each segment. Accordingly, the identification accuracy is high and the calculation load is small. Further, according to the specific embodiment of the present invention, the inconclusive and conversational segmentation is performed, resulting in reliable segmentation. According to another embodiment of the present invention, the inconclusive and conversational identification of the curve class and the representative curve is performed, resulting in reliable identification. According to a further embodiment of the present invention, the representative curve at each segment is connected each time the curve is identified. Accordingly, the continuity of the curve drawing can be kept even if the process is made in units of segments.

BRIEF DESCRIPTION OF THE DRAWINGS

This invention will be described in detail with reference to the accompanying drawings wherein:

FIG. 19 is a diagram for explaining a fuzzy curve of a carefully drawn triangle and partition points thereof in order to explain the principle of the present invention;

FIG. 20 is a diagram for explaining a fuzzy curve of a carefully drawn free curve and partition points thereof in order to explain the principle of the present invention;

FIG. 21 is a diagram for explaining a fuzzy curve of a roughly drawn triangle and partition points thereby in order to explain the principle of the present invention;

FIG. 54 is a view for explaining a rule of inference of curve classes according to the present invention in the fuzzy recognition of the freehand curves;

FIGS. 67A and 67B relate to the explanation of the algorithm for the fuzzy recognition of the freehand curves to which the present invention is applied and illustrate diagrams showing yet another example of a curve sample model and an inference result of the fuzzy curve classes due to the algorithm of the present invention;

FIGS. 68A and 68B relate to the explanation of the algorithm for the fuzzy recognition of the freehand curves to which the present invention is applied and illustrate diagrams showing yet another example of a curve sample model and an inference result of the fuzzy curve classes due to the algorithm of the present invention;

DETAILED DESCRIPTION OF THE PREFERRED EMBODIMENTS

Figure 1:
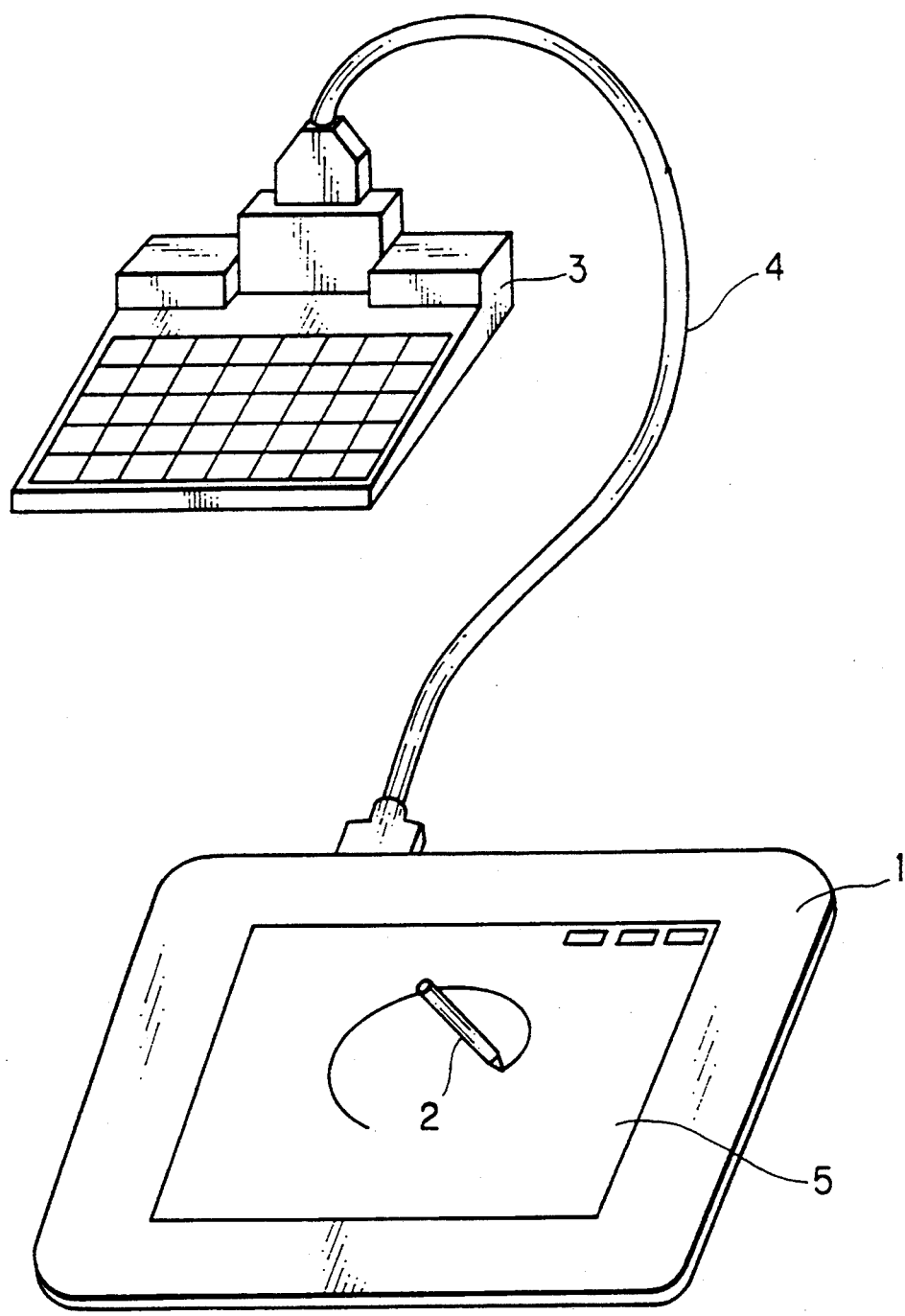
FIG. 1 is a perspective view of a freehand curve-drawing identifying system according an embodiment of the present invention.

FIG. 1 shows an arrangement of a system according to a preferred embodiment of the present invention. The system comprises a tablet unit 1 with a display, a pen 2 for inputting data, a computer 3, and a signal line 4 connecting the tablet unit 1 with the computer 3. The display unit 1 with a display and the pen 2 constitute an input section for inputting freehand curve drawings as a sequence of points. A curve drawn on a display/input surface 5 of the tablet unit 1 is appropriately corrected by an interactive operation using the pen 2. Accordingly, the tablet unit 1 and the pen 2 also constitute, together with the computer 3, a correcting section. The computer 3 executes a process for identifying a curve from a sequence of points input through the tablet unit 1.

Figure 2:
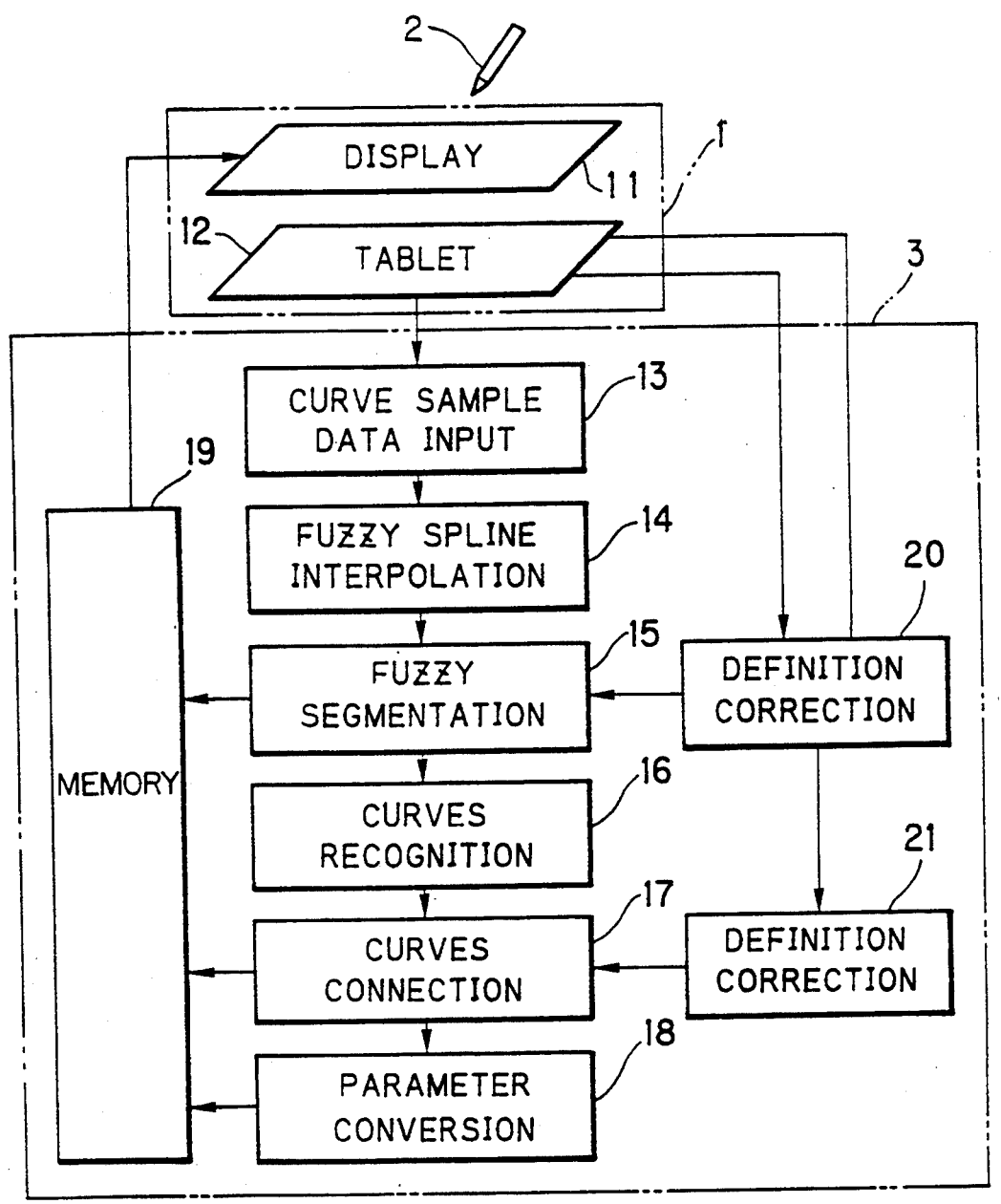
FIG. 2 is a block diagram of the system in FIG. 1.

FIG. 2 shows a detailed arrangement of the system. The tablet unit 1 is constituted by a liquid crystal display 11 and a tablet 12 which are stacked on each other. The computer 3 is provided with a curve-ample-data input section 13, a fuzzy spline interpolation section 14, a fuzzy segmentation section 15, a curve recognizing section 16, a curve connecting section 17 and a parameter converting section 18. The computer 3 is provided with a memory 19. The memory 19 stores each of the processed results from the fuzzy segmentation section 15, the curve connecting section 18, and the parameter converting section 18 for displaying on the display 11. Further, the computer 3 is provided with a definition/correction section 20 for defining and correcting segmentation results from the fuzzy segmentation section 15 in accordance with an operation of the tablet 12, and a definition/correction section 21 for defining and correcting processed results from the curve recognizing section 16 and the curve connecting section 17 in accordance with an operation of the tablet 12. These sections are typically constituted by a CPU and a software.

Figure 3A:
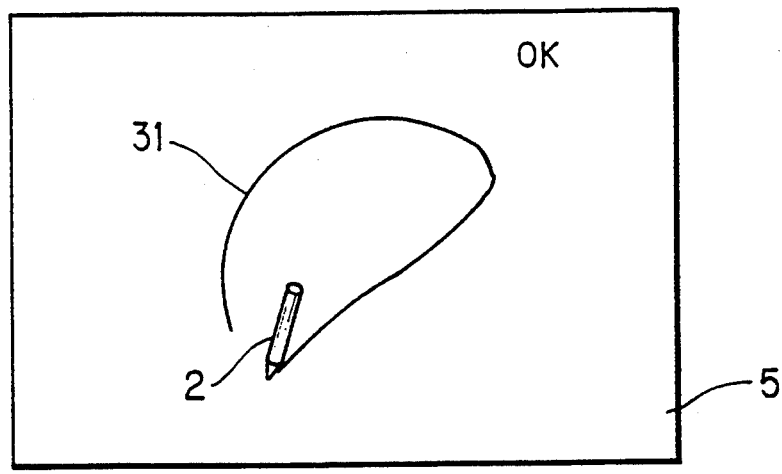
FIGS. 3A through 3C are views showing operational behavior using the system in FIG. 1.
Figure 3B:
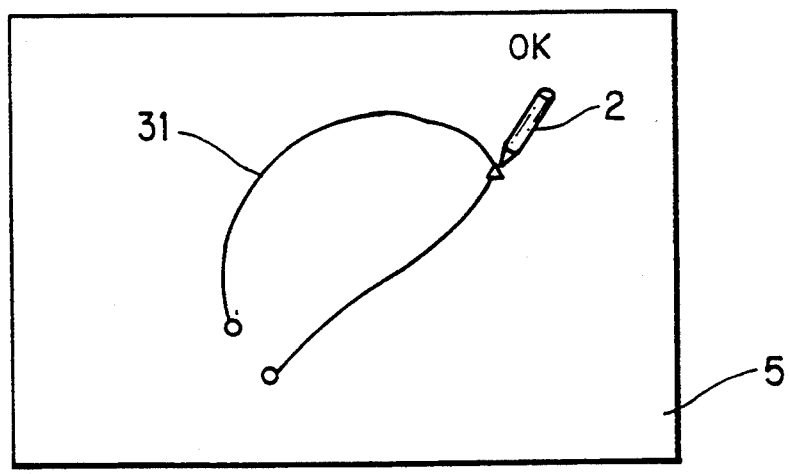
Figure 3C:
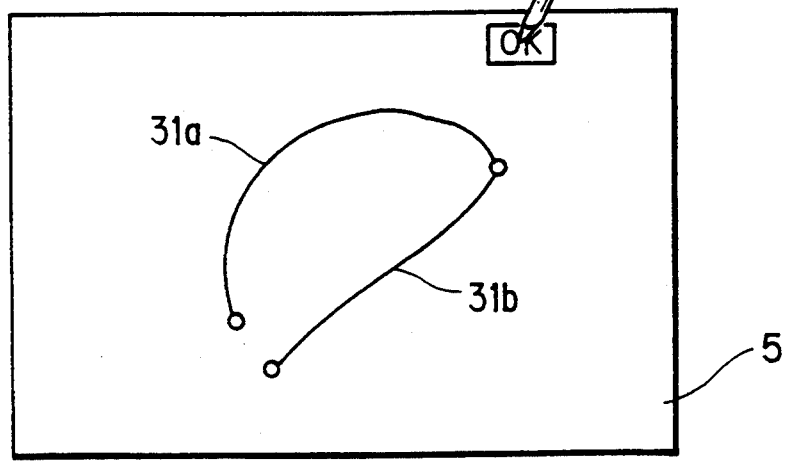
Figure 4A:
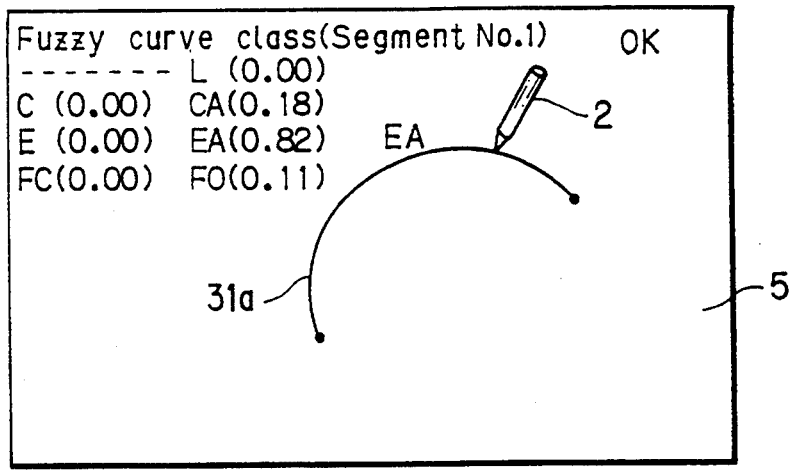
FIGS. 4A through 4C are views showing operational behavior following FIGS. 3A through 3C.
Figure 4B:
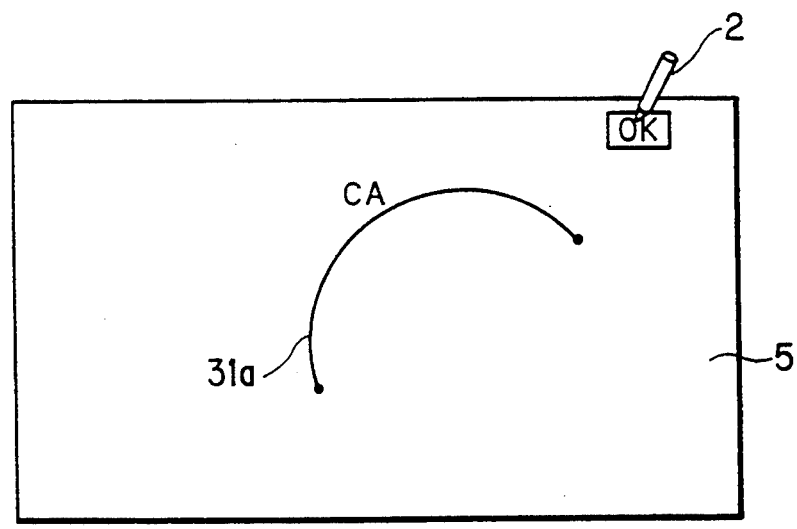
Figure 4C:
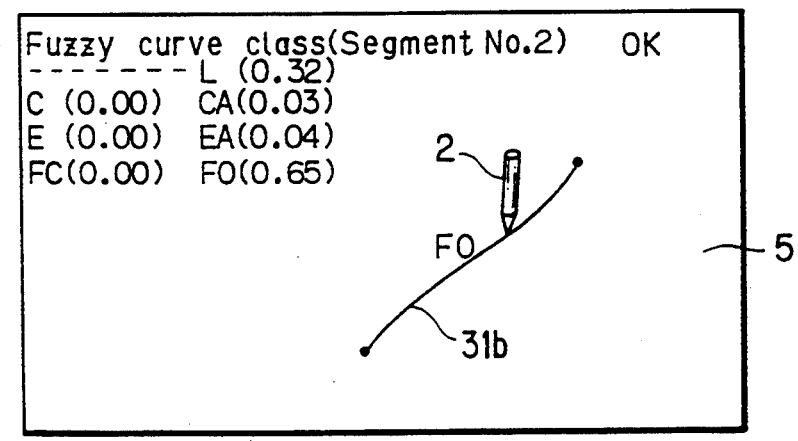
Figure 5A:
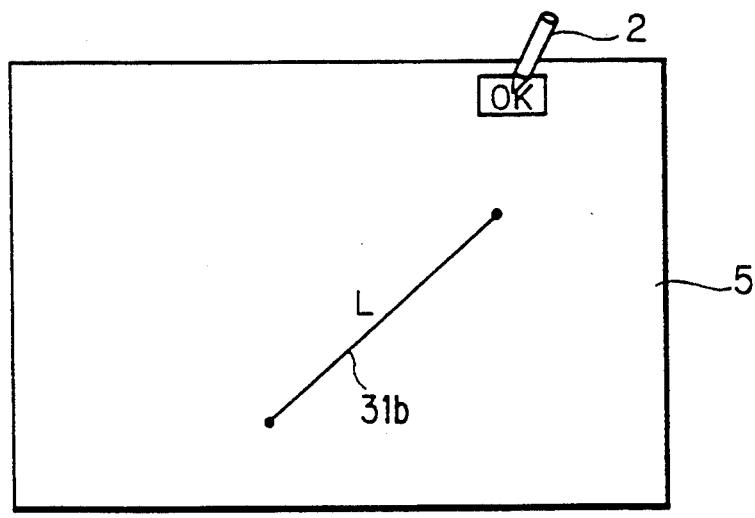
FIGS. 5A through 5C are views showing operational behavior following FIGS. 4A through 4C.
Figure 5B:
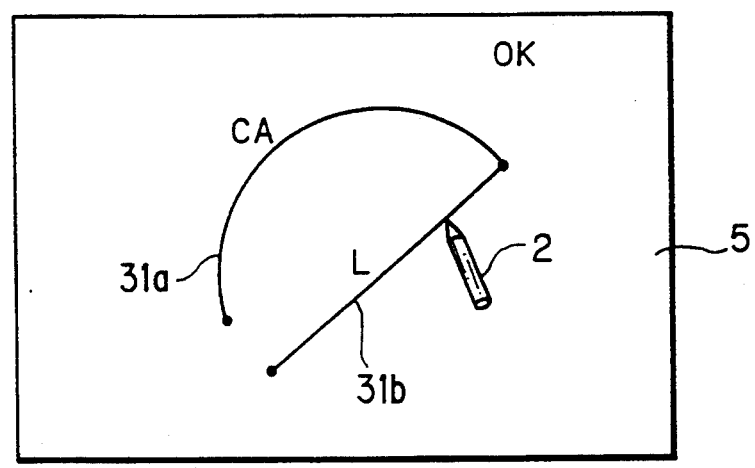
Figure 5C:
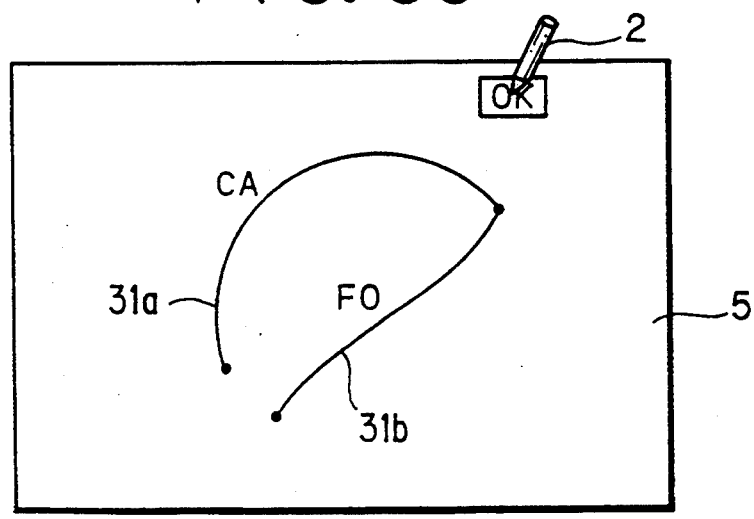

An operational procedure of the system will now be described with reference to FIGS. 3 through 5. As shown in FIG. 3A, when a freehand curve drawing 31 is drawn on the display/input surface 5 of the tablet unit 1 by the pen 2, definite partition points marked with "o" and a candidate for a partition point marked with "Δ" of the freehand curve drawing 31 are displayed on the freehand curve drawing 31. When the candidate for a partition point is desired to be corrected to the definite partition point, the tip of the pen 2 is contacted with the mark "Δ" as shown in FIG. 3B. In response to this contact, the candidate for a partition point is converted into the definite partition point. If it is confirmed that the segmentation is correct, the tip of the pen 2 contacted with a mark "OK" as shown in FIG. 3C. In this example, the freehand curve drawing 31 is divided into two segments 31a and 31b. Next, as shown in FIG. 4A, a curve recognition result with respect to the segment 31a is displayed on the display/input surface 5. In this example, a grade of an elliptic arc (EA) is highest. If a drawer is not satisfied with this recognition result, the drawer may contact the tip of the pen 2 with the elliptic arc displayed on the display/input surface 5. In response to this contact, a curve to be displayed is changed to a circular arc (CA) as a next recognition candidate, as shown in FIG. 4B. If the drawer confirms the recognition result, he or she may contact the tip of the pen 2 with mark "OK", as shown in FIG. 4B. Similarly, a recognition result is corrected/defined with respect to the segment 31b, as shown in FIGS. 4C and 5A. As a result, the recognition result is displayed as shown in FIG. 5B. If the drawer desires to correct the recognition result, he or she may contact the pen 2 with the segment to be corrected, as shown in FIG. 5B. As a result, the segment is changed to a next recognition candidate, as shown in FIG. 5C.

Figure 6:
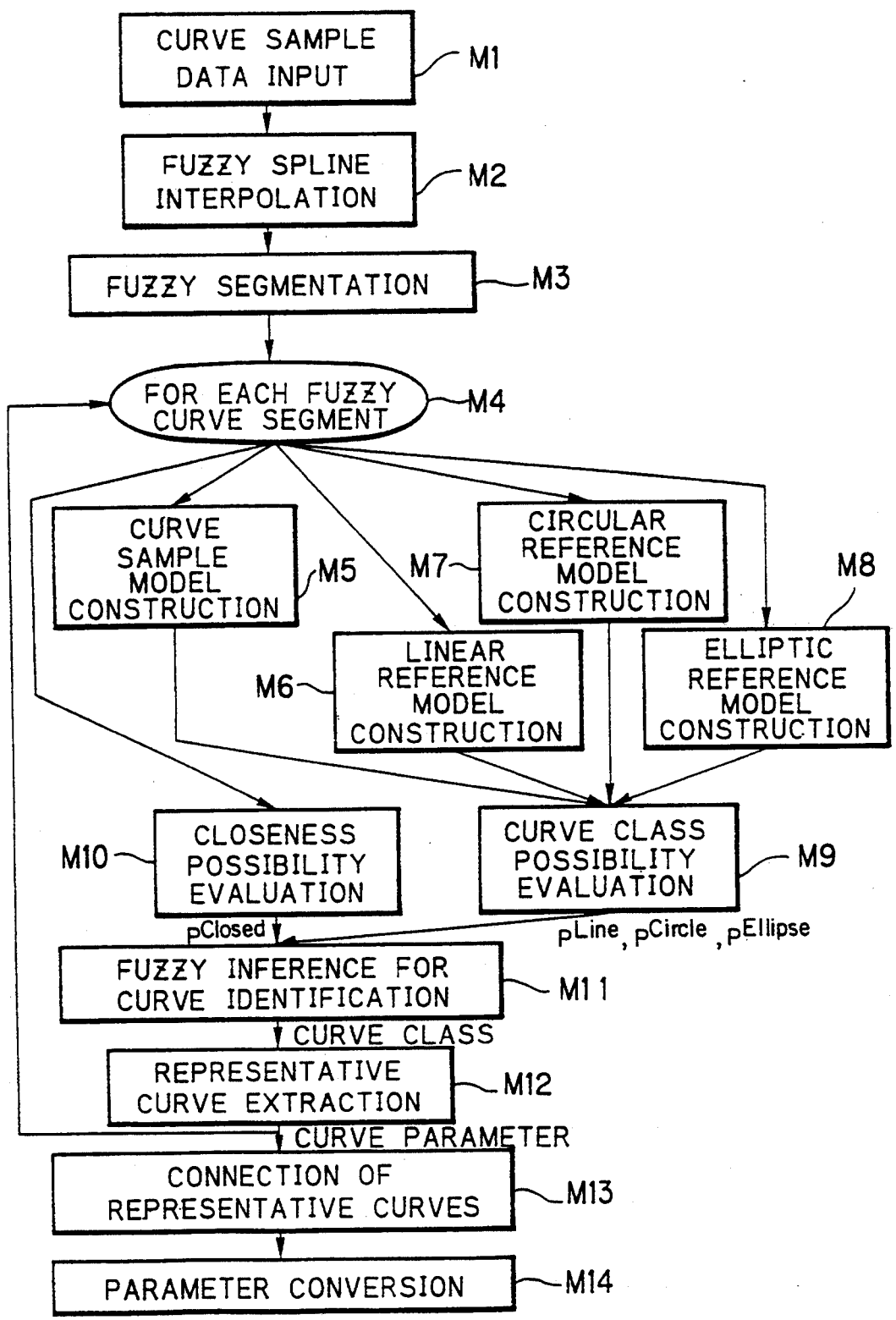
FIG. 6 is a flowchart showing an operation of the system in FIG. 1.

FIG. 6 shows an algorithm for identifying a curve drawing from an input sequence of points, which realizers the above described operation.

First, when a sequence of sample data points of a freehand curve drawing are input from the tablet unit 1 (Curve Sample Data Input M1), a fuzzy version of the sequence of sample data points is prepared based on an acceleration of drawing and the like. Further, the obtained sequence of fuzzy sample data points are subjected to a fuzzy spline interpolation to obtain fuzzy spline curve representation of the input curve (Fuzzy Spline Interpolation M2). Next, the entire fuzzy spline curve is divided into portions corresponding to fundamental curves such as a line, a circle, and an ellipse, based on stops of a stroke. This division is executed by a fuzzy segmentation method taking account of vagueness of the input curve, and finally, a partition point is decided interactively (Fuzzy Segmentation M3).

When the above described preprocesses are completed, curve classes are inferred in a fuzzy manner for each divided basic curve segment (Process For Each Fuzzy Curve Segment M4). This operation is executed as follows.

First, possibilities are obtained in a fuzzy manner that the basic curve segments are "line", "circular arc (including circle)", and "elliptic arc (including ellipse)" (Curve Class Possibility Evaluation M9). This is realized by hypothetical verification. More specifically, a curve reference model for each curve class is constructed based on several representative points of the basic curve segment represented as a part of the fuzzy spline curve (Linear Reference Model Construction M6, Circular Reference Model Construction M7, Elliptic Reference Model Construction M8). Next, a curve sample model of the basic curve segment is constructed from the original fuzzy spline curve (Curve Sample Model Construction M5). At this time, the curve classes of the basic curve segment are obtained in a fuzzy manner by evaluating, for each curve class, as possibilities, a degree to which the curve segment model is closed to a hypothetical reference model over the entire basic curve segment.

On the other hand, a possibility that the basic curve segment is a closed curve is obtained in a fuzzy manner by using starting and ending points of the basic curve segment obtained as fuzzy points on the fuzzy spline curve (Closeness Possibility Evaluation M10).

If the possibility of each curve class and the possibility of the closed curve are obtained, a fuzzy inference is executed by using these possibilities as input to recognize the curve class intended by the drawer in a fuzzy manner (Fuzzy Inference for Curve Identification M11). In this stage, the recognition result of the curve class is obtained as a discrete fuzzy set a definition range of which is over a set which consists of seven curve classes: line, circle, circular arc, ellipse, elliptic arc, open free curve and closed free curve. A single curve class is decided by an interactive process with the drawer based on the inferred fuzzy result. This interactive process is performed based on the inferred fuzzy result and effectively executed depending on the vagueness of the curve drawn.

Once the curve class is decided, a recognized curve is obtained as a curve reference model corresponding thereto. Note that since the curve reference model itself is a fuzzy representation, a representative portion is extracted as an ordinary curve depending on its application (Representative Curve Extraction M12).

When the above described processes are completed with respect to all the basic curve segments and a representative curve for each segment is obtained, a connection process of these representative curves is performed depending on its application (Connection of Representative Curves M13). This connection process is necessary because even if the entire curve is drawn by one stroke, each curve segments to be recognized is not always obtained as connected. This connection process is repetitively performed each time the curve class is interactively decided in the Fuzzy Inference for Curve Identification M11.

Finally, a representation form of each recognized representative curve is converted into a parameter form which is for use with an ordinary CAD (Parameter Conversion M14) easily. This is because the internal representation of the recognize curve segment is obtained as a B-spline curve or a rational Bézier curve. For example, a circle represented by the rational Bézier curve is converted into parameters such as "center" and "radius".

Each process in this main flowchart will now be described in detail.

<Fuzzy Spline Interpolation M2>

In this process, when a sequence of fuzzy points each having vagueness in its positional information and a certain extent is given, the spline interpolation is performed with respect to the sequence of fuzzy points while allowing for the vagueness to generate a smooth curve having the extent due to the vagueness.

For example, if it is assumed that a sequence of sample points of a freehand curve drawing have internally vagueness in their positional information and represented as two-dimensional fuzzy points (a sequence of points each represented as a two-dimensional fuzzy set), these fuzzy points are interpolated under a certain hypothesis to be represented as a continuous curve involving vagueness, namely a fuzzy spline curve. Accordingly, it is possible to theoretically process and store in the form that can be utilized easily within a computer.

Vagueness in positional information of a sequence of points is an inaccuracy, namely vagueness that actually drawn and sampled data have with respect to conceptual positional information of a diagram which a drawer has intended to draw. Generally, positional information of a sampled point of a curve of a portion that a drawer is carefully drawing has high accuracy with respect to a diagram that the drawer intends to draw. Accordingly, it can be considered that a small number of vague elements are involved in the positional information. On the other hand, it can be considered that the positional information of a sampled point of a curve of a portion that the drawer roughly is drawing involves many vague elements with respect to a diagram that the drawer intends to draw. Accordingly, upon taking account of such nature, appropriate vagueness is added to the positional information at each sampled point, a fuzzy spline curve is generated by the fuzzy spline interpolation method and stored in a computer. As a result, the shape of the input curve drawing and vagueness information corresponding to the drawing manner of each portion of the curve drawing are stored as the input curve information.

As a method for adding the vagueness information as described above, acceleration or pressure of the pen in the freehand drawing may be utilized. Generally, it is assumed that each sampled point has its positional vagueness in proportion to the acceleration of drawing at the point.

As described above, if the input curve drawing as well as the vagueness information at each portion thereof are stored as fuzzy spline curve information, the input curve information is stored in the computer in such a manner that data of an ellipse drawn intentionally carefully and data of ellipse resulting from a roughly drawn circle can be distinguished each other.

The fuzzy spline curve information once stored in a computer as described above can be utilized as elements for inferring and recognizing a curve drawing that the drawer intended to draw from the sampled data of the freehand curve drawing.

A principle of the above described fuzzy spline interpolation will now be described in detail.

In the fuzzy spline interpolation, a fuzzy vector having a conical membership function is introduced in order to express vectors on a two-dimensional plane involving vagueness. An operation of the fuzzy vector is defined based on an extension principle. Next, the ridge of the control polygon of the spline curve is expressed by the fuzzy vector to construct a fuzzy spline curve which is an extension of an ordinary spline curve. Further, the fuzzy spline curve interpolates to the fuzzy points on the plane involving vagueness while involving vagueness.

<Conical Fuzzy Vector and its Operation>

Fuzzy vectors having a conical membership function are introduced. A summing operation of the fuzzy vector as well as multiplication of the fuzzy vector by a crisp scalar are defined.

First, a membership function of the conical fuzzy vector and its notation will now be described.

Figure 7:
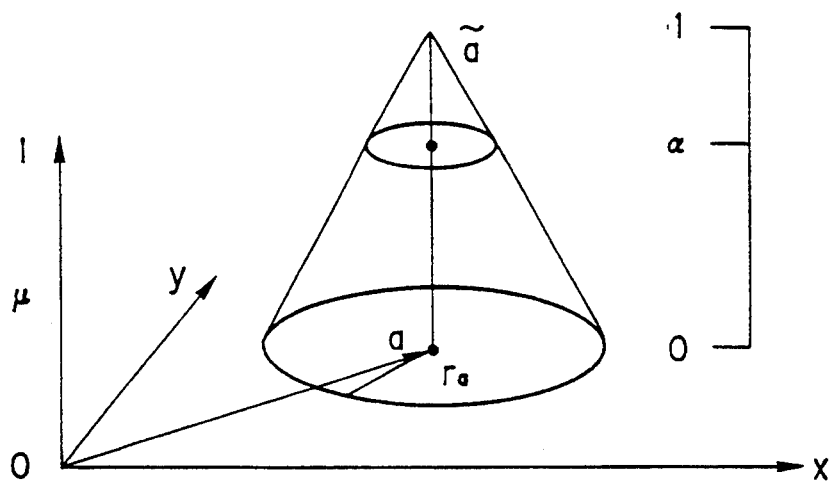
FIG. 7 is a diagram for explaining a conical membership function of a fuzzy position vector in order to explain a principle of fuzzy spline interpolation in fuzzy recognition of freehand curves to which the present invention is applied.

In order to express a two-dimensional vector involving vagueness on a plane, a fuzzy vector characterized by a conical membership function as shown in FIG. 7 is introduced.

A first fuzzy vector having the conical membership function is defined by equation (1) by using a vector a which points at the position of the ridge of the cone and the radius ra of the base of the cone.

$$\bar{a} = <a, r_a< \tag{1}$$

Note that the membership function of the first fuzzy vector defined by equation (1) is given by equation (2) with respect to an arbitrary vector variable v on the plane (The operator "V" in equation (2) expresses max (maximum value) operation which takes larger value).

$$\mu_{\bar{a}}(v) = \left(1 - \frac{\|v - a\|}{r_a}\right) V_0 \tag{2}$$

The conical fuzzy vector defined by equations (1) and (2) is a direct extension of a symmetrical triangle fuzzy number of a scalar fuzzy model.

The summing operation of the conical fuzzy vectors and the multiplication of the conical fuzzy vector by the crisp scalar will now be described.

A second fuzzy vector defined by equation (3) is introduced.

$$\bar{b} = <b, r_b> \tag{3}$$

By applying the extension principle, the summed result of the first and second fuzzy vectors is expressed by equation (4).

$$\bar{a} + \bar{b} = <a, r_a> + <b, r_b> \tag{4}$$
$$= <(a + b), (r_a + r_b)>$$

Similarly, a multiplied result of the first fuzzy vector by the crisp scalar k is expressed by equation (5).

$$k\bar{a} = k\langle a, r_a\rangle \qquad (5)$$
$$= \langle (ka),(kr_a)\rangle$$

Accordingly, a linear combination of fuzzy vectors shown in equation (6) is expressed by similar type of fuzzy vectors as shown in equation (7).

$$\bar{d}_i = \langle d_i, r_{di}\rangle \qquad (i=1,\ldots,n) \qquad (6)$$

$$\sum_{i=1}^{n} k_i\bar{d}_i = \sum_{i=1}^{n} k_i\langle d_i, r_{di}\rangle \qquad (7)$$
$$= \langle \sum_{i=1}^{n} k_i d_i, \sum_{i=1}^{n} k_i r_{di}\rangle$$

<Fuzzy Spline Curve>

A normalized B-spline function defined by a knot sequence $u_{i-1},\ldots,u_{i+n}$ is denoted by $N_i^n(u)$. Then, an arbitrary spline curve $S^n(u)$ of degree n which supports intervals $[u_{n-1}, u_{n+L-1}]$ in parameter space is expressed by equation (8).

$$S^n(u) = \sum_{i=0}^{L+n-1} d_i N_i^n(u) \qquad (8)$$

The position vectors $d_0,\ldots,d_{L+n-1}$ represent ridges of the control polygon. A point on the spline curve is given as a linear combination of ridges of the control polygon. Then, the fuzzy spline curve is defined by extending the position vector representing the ridges of the control polygon in equation (8) to fuzzy position vectors due to the above described fuzzy vectors. More specifically, the fuzzy spline curve of degree n is defined as an extension of equation (8) by equation (10), by giving ridges of the fuzzy control polygon defined by equation (9).

$$\bar{d}_i = \langle d_i, r_{di}\rangle \qquad (i=0,\ldots,L+n-1) \qquad (9)$$

$$\bar{S}^n(u) = \sum_{i=0}^{L+n-1} \bar{d}_i N_i^n(u) \qquad (10)$$

Equation (10) shows that a point on the fuzzy spline curve corresponding to the parameter value u is a linear combination of the fuzzy position vectors. Accordingly, this point can be expressed by equation (11) and is evaluated as the conical fuzzy position vector by applying the operation rule of the summing operation of the above described fuzzy vectors and the multiplication of the fuzzy vector by the crisp scalar.

$$\bar{S}^n(u) = \langle \sum_{i=0}^{L+n-1} d_i N_i^n(u), \sum_{i=0}^{L+n-1} r_{di} N_i^n(u)\rangle \qquad (11)$$

<Interpolation of Fuzzy points by a Fuzzy Spline Curve>

When a sequence of fuzzy points shown in expression (12) is given on a drawing plane by the fuzzy position vectors, a control polygon of the fuzzy spline curve passing through these points is obtained by solving the linear system expressed in equation (13).

$$\bar{p}_i (i=0,\ldots,L+n-1) \qquad (12)$$

$$\bar{p} = N\bar{D} \qquad (13)$$

If $m = L+n-1$ and si is defined as values of parameter u corresponding to the fuzzy points shown in expression (12), equations (14), (15), and (16) are obtained.

$$\bar{D} = [\bar{d}_0 \bar{d}_1 \ldots \bar{d}_m]^t \qquad (14)$$
$$\bar{P} = [\bar{p}_0 \bar{p}_1 \ldots \bar{p}_m]^t \qquad (15)$$

$$N = \begin{bmatrix} N_0^n(s_0) & N_1^n(s_0) & \ldots & N_m^n(s_0) \\ N_0^n(s_1) & N_1^n(s_1) & \ldots & N_m^n(s_1) \\ \vdots & \vdots & \ldots & \vdots \\ N_0^n(s_m) & N_1^n(s_m) & \ldots & N_m^n(s_m) \end{bmatrix} \qquad (16)$$

As described above, the linear system expressed in equation (13) may be solved with respect to equation (14) in order to obtain the control polygon of the fuzzy spline curve. Equation (13) actually expresses a triple linear system regarding an x-axis element, a y-axis element of the cone of the fuzzy vector and the radius of the base of the cone. For this reason, the control polygon of the fuzzy spline curve is obtained by solving these linear systems.

Figure 8:
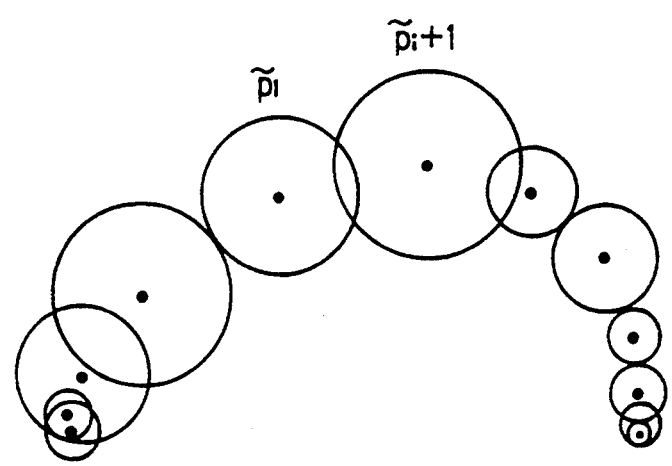
FIG. 8 is a diagram for explaining a given sequence of fuzzy points in order to explain the principle of fuzzy spline interpolation in fuzzy recognition of the freehand curves to which the present invention is applied.
Figure 9:
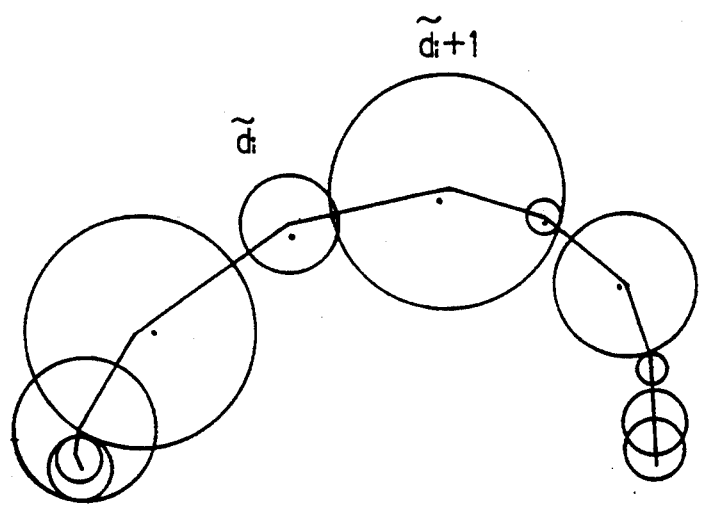
FIG. 9 is a diagram for explaining a fuzzy control polygon obtained so as to interpolate to the given sequence of fuzzy points in order to explain the principle of fuzzy spline interpolation in fuzzy recognition of the freehand curves to which the present invention is applied.
Figure 10:
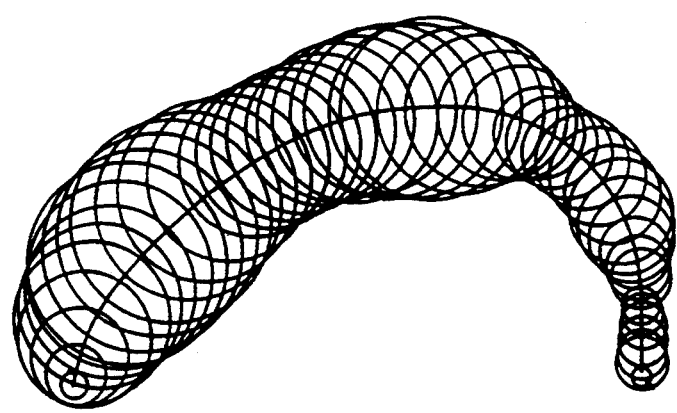
FIG. 10 is a diagram for explaining a fuzzy spline curve obtained from the fuzzy control polygon in FIG. 9 in order to explain the principle of fuzzy spline interpolation in fuzzy recognition of the freehand curves to which the present invention is applied.

A detailed example of the above described fuzzy spline interpolation will now be described. FIGS. 8 through 10 show an example in which a cubic fuzzy curve interpolates to a sequence of fuzzy points given in drawing space. Note that the circles shown in FIGS. 8 through 10 represent bases of the conical fuzzy vectors.

(1) A sequence of fuzzy points shown by expression (17) having a conical membership function is given as shown in FIG. 8.

$$\bar{p}_0,\ldots,\bar{p}_i,\bar{p}_{i+1},\ldots,\bar{p}_m \qquad (17)$$

In this state, an actual sample point is given as a ridge of the cone and vagueness is given as the radius of the base. The vagueness is given based on the acceleration of drawing, for example.

(2) The fuzzy control polygon shown by expression (18) is obtained by an ordinary spline interpolation method. This fuzzy control polygon is shown in FIG. 9.

$$\bar{d}_0,\ldots,\bar{d}_i,\bar{d}_{i+1},\ldots,\bar{d}_m \qquad (18)$$

(3) The fuzzy curve in FIG. 10 is generated with desired finesse by interpolating to and evaluating the fuzzy control polygon shown by expression (18) with an extended method of an ordinary de Boor algorithm.

<Fuzzy Segmentation of Freehand Curve M3>

Input data must be segmented into a certain size in order to infer, by applying the above described fuzzy spline interpolation technique, what the drawer intended to draw from freehand input data of curve drawings input from the table and considered as involving vagueness. In this case, the freehand curve drawing is fundamentally drawn by strokes that the drawer intends. For this reason, it can be considered as effective to segment the input data by the stroke of the freehand input.

A principle of the segmentation of the fuzzy spline curve by stops in the drawing motion will now be described.

In order to recognize what the drawer intends to draw, the stops of the strokes are detected in order to recognize the strokes of the input curve drawing when the segmentation is performed. In the freehand input, the drawing speed will be slow at the stops of the strokes and the stops will be appear on the curve drawing as a corner or a standstill. For this reason, it can be considered that the stops of the strokes can be extracted by checking whether or not a point is standstill. Accordingly, the fuzzy segmentation by stops of the strokes can be performed by evaluating in fuzzy manner whether or not a point is standstill for a predetermined period of time.

<Fuzzy Spline Interpolation to Sampled Points>

A sequence of sampled points pi, sampled at regular intervals of time, is not always considered to have accurate positional information exactly reflecting the intention of the drawer of the curve. In general, the more roughly a curve is drawn, the more vague its positional information will be. From this observation, we assume that each sampled point has its positional vagueness in proportion to the acceleration of drawing at the point. This is realized by using the fuzzy vector model defined by equation (19) to express each sampled point pi.

$$\tilde{p}_i = <p_i, r_{pi}> \quad (19)$$

where the value of rpi is set in proportion to the acceleration at the sampled point pi.

A fuzzy spline curve which interpolates to the sampled points expressed as fuzzy vectors is obtained using the method described above.

<Evaluation of Standstills by Interval Truth Values>

The spline curve is evaluated at regular intervals of time which are shorter than the original sampling intervals by using equation (11). From this, a finer fuzzy point sequence expressed by equation (20) is obtained.

$$\tilde{g}_i = <g_i, r_{gi}> \quad (20)$$

The degree of standstill at each fuzzy point shown in equation (20) is evaluated by an interval truth value [Ni, Pi] (the operator "V" in equation (21) represents a max (maximum value) operation which takes a larger value, the operator "Λ" in equation (22) represents a min (minimum value) operation which takes a smaller value, the operator "inf" in equation (21) represents an operation taking a lower limit value, and the operator "sup" in equation (22) represents an operation taking an upper limit value).

$$N_i \stackrel{def}{=} \inf_v ((1 - \mu_{\tilde{q}_i}(v)) V \mu_{\tilde{q}_{i-k}}(v)) \quad (21)$$

$$P_i \stackrel{def}{=} \sup_v (\mu_{\tilde{q}_i}(v) \Lambda \mu_{\tilde{q}_{i-k}}(v)) \quad (22)$$

The necessity measure Ni and the possibility measure Pi in equation (21) and equation (22) are defined as the necessity and the possibility that the statement shown in expression (23) is established at the fuzzy point. Selecting an appropriate integer for k, the statement is understood to be "the position on the curve at the moment i is the same as the position on the curve a few periods (k periods) of time before that moment."

$$\tilde{q}_i \text{ is } \tilde{q}_{i-k} \quad (23)$$

<Fuzzy Segmentation>

Using obtained interval truth values which evaluate the degree of standstill at each point, a method to divide a freehand curve into segments corresponding to intended strokes is proposed. This method results in definite segmentation where the curve is drawn carefully. On the other hand, vagueness of the segmentation is detected where the curve is drawn roughly.

<Labeling of Evaluated Fuzzy Points>

Figure 11:
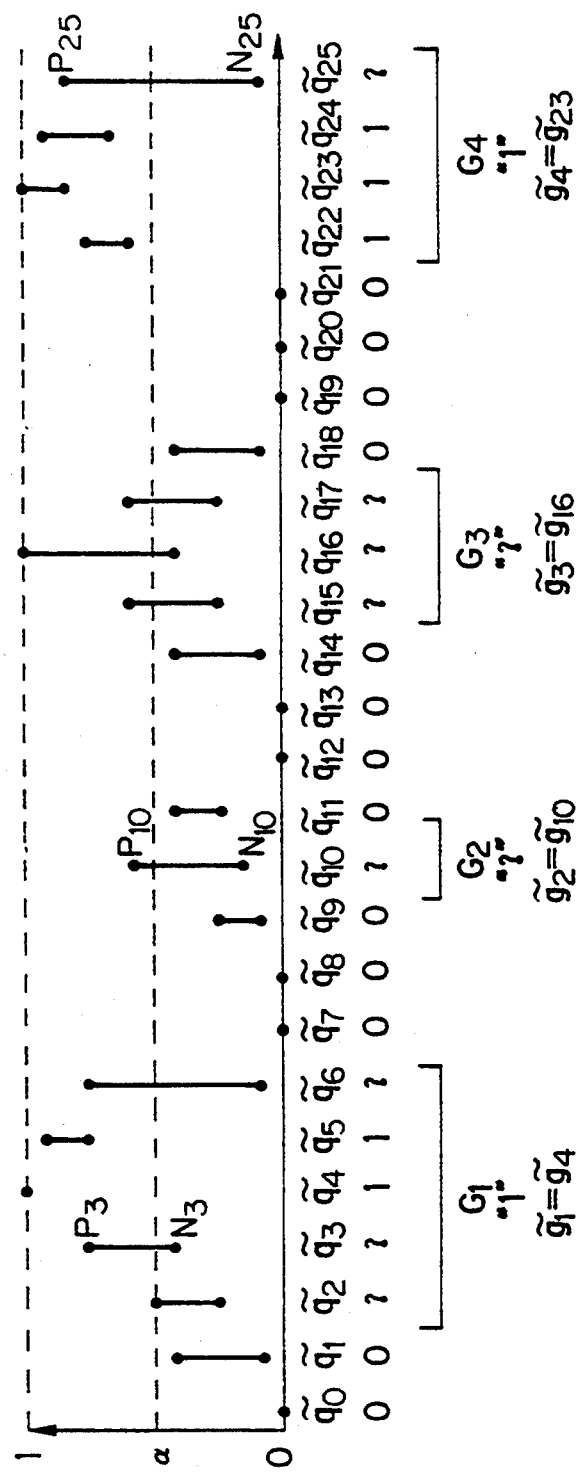
FIG. 11 is a diagram for explaining labeling, grouping and extraction of representative points from interval truth values of a sequence of fuzzy points in order to explain the principle of fuzzy spline interpolation in fuzzy recognition of the freehand curves to which the present invention is applied.

The interval truth values [Ni, Pi] are quantized compared with an arbitrary threshold value $\alpha \in [0,1]$ and each is labeled "1"(true), "?"(unknown) or "0"(false), as shown in FIG. 11.

<Grouping of Evaluated Fuzzy Points>

Next, group all fuzzy points labeled "?" or "1" into groups Gj which are separated by fuzzy points labeled "0". Each group Gj can then be considered to correspond to standstill candidate or candidate for a partition point connecting two segments.

<Fuzzy Extraction of Partition Points>

Each group Gj itself is then labeled "1" if it includes at least one fuzzy point labeled "1"; otherwise, it is labeled "?". Now selecting one fuzzy point from each group Gj as shown in FIG. 7 partition points are extracted and inherit their labels from their mother groups, shown by equation (24).

$$\tilde{g}_1 = \tilde{g}_4$$

$$\tilde{g}_2 = \tilde{g}_{10}$$

$$\tilde{g}_3 = \tilde{g}_{16} \quad (24)$$

$$\tilde{g}_4 = \tilde{g}_{23}$$

Those partition points labeled "1" can be automatically treated as definite partition points. On the other hand, ones which are labeled "?" are mere candidates of partition points and should be presented to the drawer of the curve for an explicit decision.

In accordance with the above described principle, the fuzzy spline curve information involving vagueness information can be divided into definite segments due to strokes by effectively utilizing the vagueness information and can be subjected to the recognition process.

Figure 12:
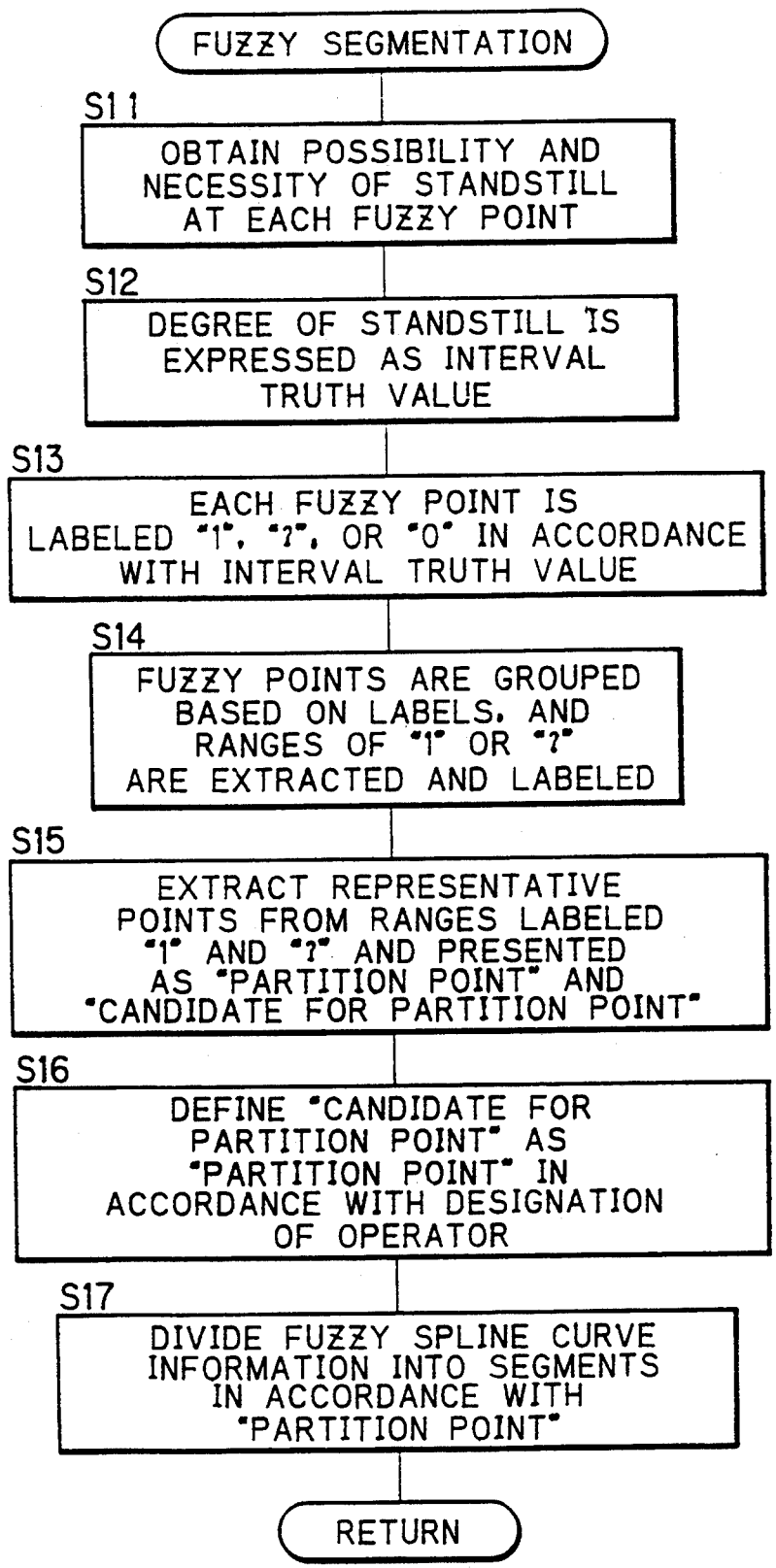
FIG. 12 is a flowchart for explaining fuzzy segmentation in the pattern recognition process in FIG. 6.
Figure 13:
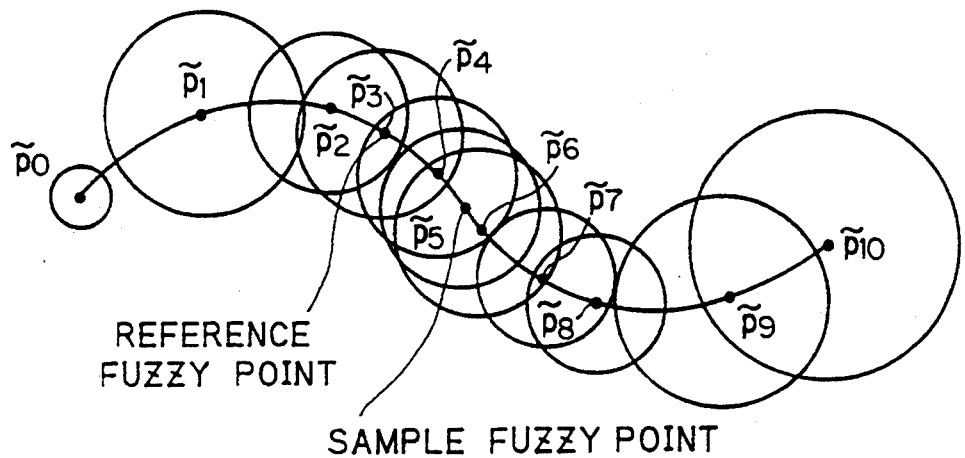
FIG. 13 is a view for diagrammatically explaining an example of a sequence of fuzzy evaluation points of a fuzzy spline curve in order to explain the fuzzy segmentation process in FIG. 12.

A flowchart for realizing such fuzzy segmentation process M3 is shown in FIG. 12.

(1) First, the necessity and the possibility are calculated that each of the fuzzy points is the standstill (step S11).

In step S11, the possibility and the necessity that each point excluding the first $n_{ts}$ fuzzy points and the last fuzzy points is the standstill is calculated with respect to standstill determination time ts based on factor $n_{ts}$ defining a preset standstill determination time. The factor $n_{ts}$ is the number of preceding fuzzy points (preceding the sampled fuzzy point) which are to be referenced for determining the possibility and the necessity that the sampled fuzzy point is the standstill. The time ts is the factor $n_{ts}$ multiplied by the sampling interval of the fuzzy point. More specifically, a fuzzy point ts time before is assumed to be a reference and a fuzzy point highlighted at the moment is assumed to be a sample and the possibility and the necessity that the sampled fuzzy point coincides with the reference fuzzy point.

Figure 14:
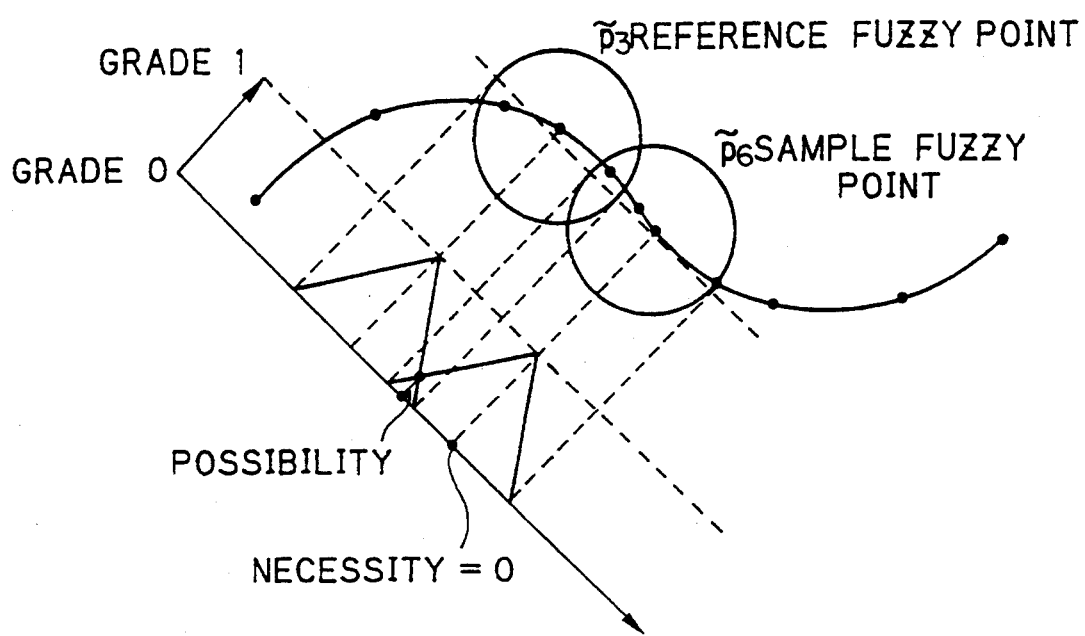
FIG. 14 is a view for diagrammatically explaining an example of obtaining the possibility and the necessity that the fuzzy points coincides with the fuzzy point corresponding to a sample a predetermined periods of time before in order to explain the fuzzy segmentation process in FIG. 12.

For example, when a sequence of fuzzy evaluation points as shown in FIG. 3 is given, and $n_{ts}=3$, an example of the calculation of the possibility and necessity that the sampled fuzzy point is the standstill is shown in FIG. 14. Note that the possibility is set to "1" and the necessity is set to "1" with respect to the first and the last fuzzy points. Further, the possibility is set to "1" and the necessity is set to "0" with respect to the second and n ts-th fuzzy points as starting and ending conditions.

Figure 15:
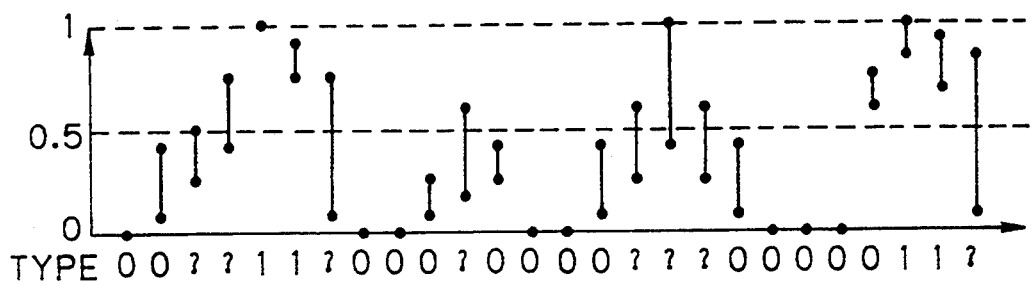
FIG. 15 is a view for diagrammatically explaining an example of quantizing the interval truth values of the degree of standstill at each fuzzy point in order to explain the fuzzy segmentation process in FIG. 12.

(2) The possibility and the necessity of the standstill at each fuzzy point calculated in step S11 is expressed as an interval truth value (step S12). An example of the interval truth value of the standstill with respect to each fuzzy point in step S12 is shown in FIG. 15.

(3) The interval truth value at each fuzzy point obtained in step S12 is quantized and labeled "1" if it is the standstill, labeled "?" if it may be the standstill, and labeled "0" if it is not the standstill (step S13).

More specifically, in step S13, the interval truth value of the possibility and the necessity that each fuzzy point is the standstill is compared with a threshold level $\alpha$ and quantized into the following three types and labeled.

(3-a) When the possibility is $\geq \alpha$ and the necessity is $\geq \alpha$, the fuzzy point can be inferred as the standstill and labeled type "1".

(3-b) When the possibility is $\geq \alpha$ and the necessity is $< \alpha$, the fuzzy point may be the standstill but is not explicit and thus labeled type "?" as a possible standstill.

(3-c) When the possibility is $< \alpha$ and the necessity is $< \alpha$, the fuzzy point can be inferred as not the standstill and labeled as type "0".

In step S13, when the threshold level (initial value) is $\alpha = 0.5$, for example, each fuzzy point is labeled type as shown in FIG. 15 depending on the interval truth value. In each of the interval truth values shown in FIG. 15, the top indicates the possibility and the bottom indicates the necessity.

(4) The fuzzy points are grouped based on the labels labeled in step S13, and the areas of "1" or "?" are extracted and labeled (step S14).

More specifically, in step S14, the sequence of fuzzy points is partitioned at a portion which is determined as not the standstill and labeled type "0" in the quantization in step S13. The areas including one or both of label "1" and label "?" are extracted as a range where the standstills are existed. The range including only the labels "?" is labeled "?". The areas including only labels "1" and the areas including labels "1" and "?" are labeled "1".

(5) The representative points are extracted from the arenas labeled "1" or "?" extracted in step S14 and presented to the drawer as a partition point and a candidate for a partition point, respectively (step S15). In step S15, the representative points are extracted from the areas labeled "1" or "?" as follows.

(5-a) When all the fuzzy points are labeled "1" in the range labeled "1", the center fuzzy point or the neighboring fuzzy points in the range (when the fuzzy point is in the middle of the range, the center point is chosen or when the fuzzy point is not in the middle of the range, fuzzy points on both sides of the center are chosen, as described above) are chosen as the representative points and defined as the standstill labeled type "1", namely a partitioned point.

(5-b) When the fuzzy points labeled "1" and "?" are existed in the range labeled "1", the center fuzzy point of the fuzzy points on both sides of type "1" or the neighboring fuzzy points in the range are chosen as the representative points and defined as the standstill labeled type "1", namely the partition point.

(5-c) In the range labeled "?", all the fuzzy points within the range are labeled "?". Accordingly, the center fuzzy point or the neighboring fuzzy points in the range are chosen as the representative points and defined as the standstill candidate labeled type "?", namely a candidate for a partition point.

In step S15, the partition points and candidates for the partition points are presented to the drawer by displaying them on the display 11, for example.

As a method for presenting the partition points and the candidates for the partition points to the drawer, in step S15, it is desirable to display partition pint "o" and a candidate for a partition point "Δ" distinguishably, by overlaying them on the spline curve as shown in FIG. 3B, for example. Alternatively, these points may be displayed in the form of a graph of the interval truth value as shown in FIG. 17.

Figure 16:
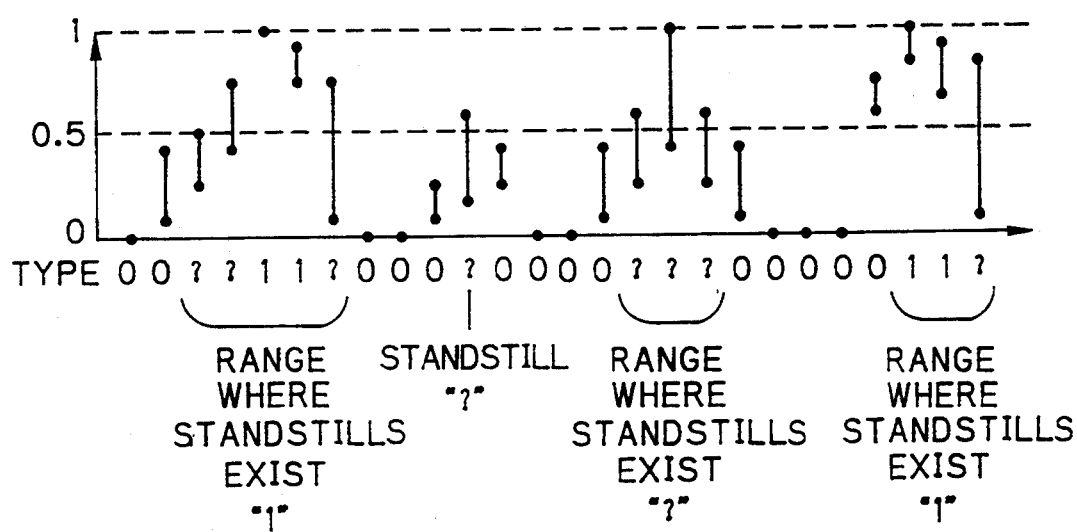
FIG. 16 is a view for diagrammatically explaining an example of extracting an existence range of standstills in order to explain the fuzzy segmentation process in FIG. 12.
Figure 17:
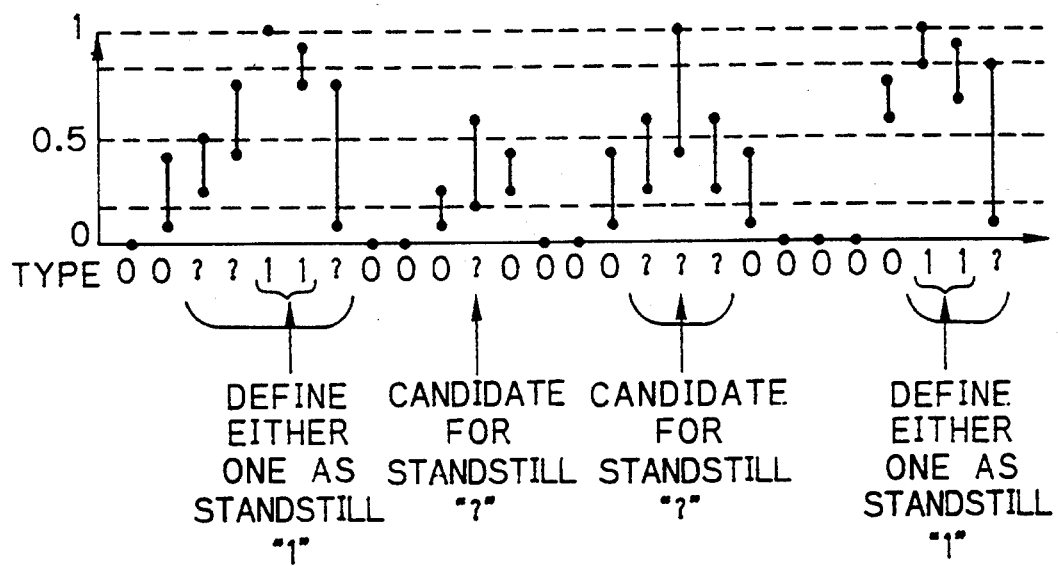
FIG. 17 is a view for diagrammatically explaining an example of extracting a standstill candidate in order to explain the fuzzy segmentation process in FIG. 12.

Am example of extracting the representative points with respect to an example of FIG. 16 is shown in FIG. 17.

(6) The partition points are defined based on the partition points and the candidate for the partition points presented to the drawer in step S15 and by the interactive operation (step S16). In step S16, an operation of designating the partition points based on the candidates for partition points is mainly performed by the drawer.

More specifically, in step S16, when the candidates for the partition points are desirably changed to the partition points, the drawer changes the candidate to the partition point by designating an arbitrary candidate for a partition point displayed on the display 11 with a pointing device such as the pen 2 or a mouse.

Note that if the absolute number of partition points and the candidates for the partition points is insufficient, the threshold level $\alpha$ is changed (for example, the threshold level $\alpha$ is assumed to be within a range of 0.1 through 0.9) in the stage of S16 and steps S13 through S15 are repetitively executed to appropriately define the partition points in step S16.

Figure 18:
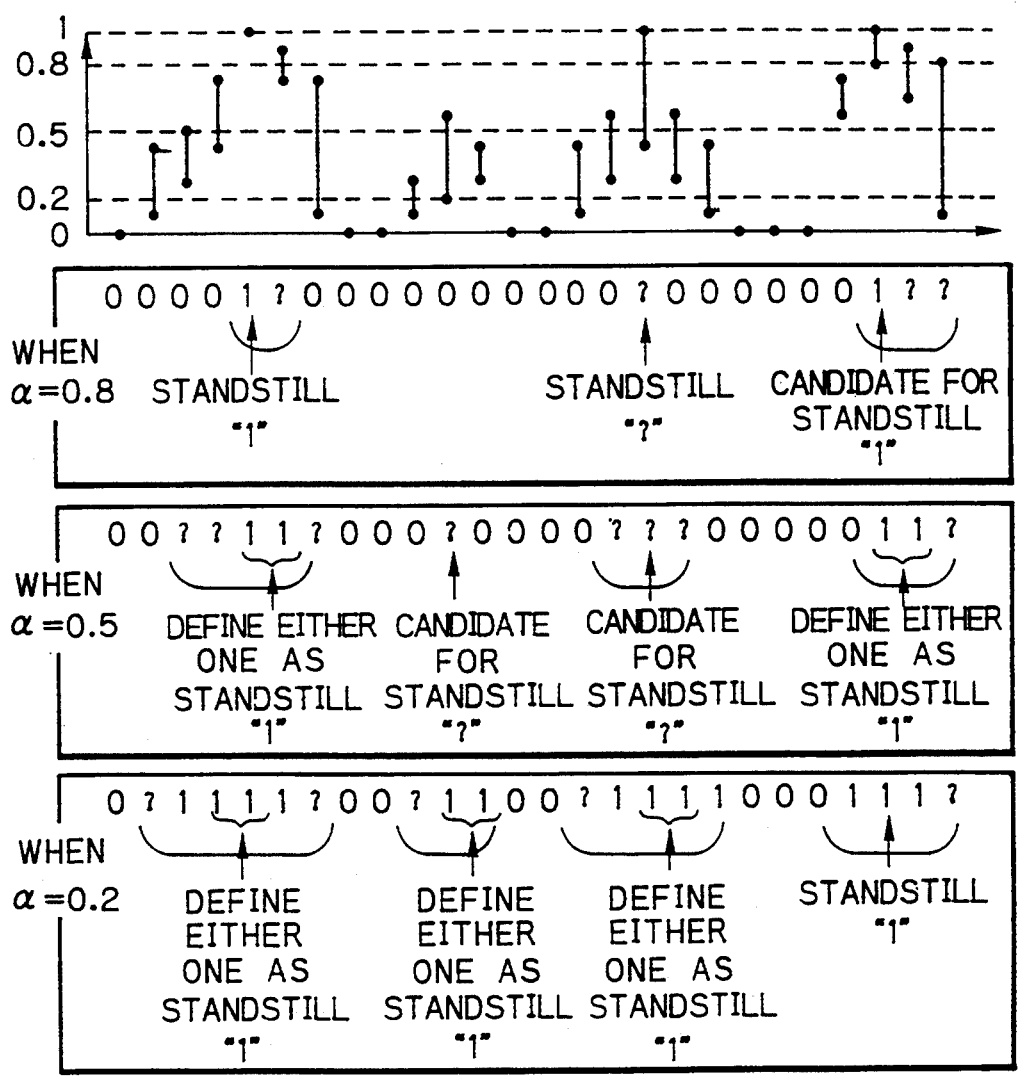
FIG. 18 is a view for diagrammatically explaining a determination operation of the standstills in order to explain the fuzzy segmentation process in FIG. 12.

FIG. 18 shows a difference between the extraction results of the candidates of the partition points when the threshold level $\alpha$ is set not only to 0.5 but also 0.8 and 0.2 in the example shown in FIG. 17. As is apparent from FIG. 18, when the threshold level is raised ($\alpha = 0.8$), the standstills are extracted under a critical condition so that a range within which the standstills are existed. When the threshold level is lowered ($\alpha = 0.2$), the standstills are extracted under a loose condition such that any point which may be considered as the standstill is extracted. Accordingly, the range within which the standstills are existed is widened.

(7) Once the partition points are defined in step S16, the fuzzy spline curve is divided into segments at the partition points (step S17).

By executing these steps, when the drawer explicitly and intentionally inputs strokes, the system detects it and automatically performs the segmentation. Accordingly, the system can perform an appropriate pattern recognition along the intention of the drawer. Further, if the intention of the drawer is not explicitly expressed, the system presents to the drawer portions including the possibility of segmentation. Accordingly, the present invention can realize a natural human interface which confirms the intention of the drawer. The carefully drawn curves shown in FIGS. 19 and 20 are properly and definitely divided into strokes. On the other hand, the roughly drawn curve shown in FIG. 21 has one partition point left in question, which reflects the vagueness of the input curve.

In the embodiment described above, a fuzzy point in the middle of the range or the neighboring points in the middle (the point when a fuzzy point is in the middle of the range or the fuzzy points on both sides of the center point when the fuzzy point is not in the middle of the range) are defined as the representative points in order to extract the representative points from the areas labeled "1" and "?" obtained by the grouping. However, the center point is not always necessarily be defined as the representative point. The representative point can be defined by extracting one point from the existence range based on a certain reference.

<Fuzzy Recognition Algorithm of Freehand Curves M4 through M14>

An algorithm for the fuzzy recognition of the freehand curves by a fuzzy recognition system of freehand curves to which the present invention is applied will now be described in detail.

The present system realizes a direct drawing-input-human interface which allows for a drawer to draw freehand curves with a stylus pen on an input device such as a pen computer in which a tablet and a display are stacked each other and generates within a computer a curve having a desired geometrical meaning of the drawer. More specifically, the present system realizes a human interface which allows for a drawer to input by freehand to the computer seven curve classes: line, circle, circular arc, ellipse, elliptic arc, open free curve and closed free curve. If this human interface is for use with CAD, the more directive and natural drawing-input interface can be realized which excludes indirect operations such as a menu selection as seen in a conventional system.

A gap is inevitably caused between positional information of an observed curve and that of an ideal curve which a drawer intentionally intended to draw. Accordingly, the positional information of the input and observed curve sample cannot be treated definitely. The present system gives a method for realizing an inference of an ideal curve intended by the drawer while taking account of the vagueness of the freehand curve, by expressing the input curve sample by a fuzzy spline curve and storing as information the vagueness of the observed positional information itself.

In this embodiment, the inference and recognition operation is performed by setting vagueness information of the input curve sample based on a degree of carefulness of the drawn curve. Accordingly, a human interface can be realized which permits a drawer to draw the intended curve classes naturally in accordance with the shape of the curve and a degree of carefulness of a drawing manner. As a result, according to the present system, the more carefully the drawing is, the more complex curves having the higher degree of freedom the drawn curves tend to be classified as. Further, the rougher the drawing is, the simpler curves the drawn curves tend to be classified as. This implies that a drawer can intend to draw a rather simple curve by drawing roughly and symbolically, but draw a rather complex curve by drawing carefully, showing that the actually drawing curve is really intentional.

For example, a drawer can input curves such that a round curve roughly drawn can be recognized as a circle even if its shape is somewhat distorted. Further, the drawer can input intentionally a free curve shaped similarly to a circle but varying slightly by drawing carefully. According to a method of the present invention, an inference is performed in accordance with the information including vagueness. For this reason, an inferred result, namely, an "inferred curve class" and a "recognized curve shape" can be obtained as fuzzy representation involving vagueness reflecting vagueness of an input curve sample. This fuzzy representation permits enough information for deciding curve class and curve shape to be conveyed to a drawer or to a high-grade inference system. For this reason, this method permits a natural and effective next-candidate selection operation of a drawer and an implementation of a high-grade inference system which determines along with other information.

<A Flow of Algorithm>

The present algorithm is on the premise that an freehand curve input from the tablet, for example is expressed as the fuzzy spline curve by the fuzzy spline interpolation described above and is divided into segments for each fundamental curves by the fuzzy segmentation described above. The method according to the present invention gives a means for inferring in a fuzzy manner that which of the seven curve classes of line, circle, circular arc, ellipse, elliptic arc, open free curve and closed free curve, each fundamental curve segment corresponds to, and outputs a sequence of fundamental curves decided interactively as data for use with CAD.

<Curve Sample Model and its FMPS:M5>

Among input curve samples, a model representing a shape of a portion of the target fundamental curve segment is constituted as a sampled curve model. Further, a fuzzy matching point set (hereinafter referred to as "FMPS") is extracted from the sampled curve model. This FMPS represents an entire shape of the curve with approximately 10 fuzzy points, for example and is used for verifying the degree to which the sampled curve model is closed to a reference model to be described later.

By the fuzzy segmentation method described above, a fuzzy start point $\tilde{q}_s$ and a fuzzy end point $\tilde{q}_e$ of one of the fundamental curve segments are obtained as two fuzzy points $\tilde{q}_i$ and $\tilde{q}_{i+k}$ on the fuzzy spline curve expressing an entire original input curve.

Accordingly, the sampled curve model of the target fundamental curve segment has already been given as the fuzzy spline curve corresponding to a parameter value interval [ui, ui+k] ranging from a parameter value ui giving the fuzzy start point $\tilde{q}_i$ to a parameter value ui+k giving the fuzzy end point $\tilde{q}_{i+k}$.

Next, the sampled curve model is evaluated by n fmps fuzzy points which are arranged equidistantly along the curve. A set of obtained n fmps fuzzy points shown by expression (25), namely 25 fuzzy points are defined as the FMPS of the sampled curve model.

$$\{\tilde{s}_1, \tilde{s}_2, \ldots, \tilde{s}_{nfmps}\} \quad (25)$$

Figure 22A:
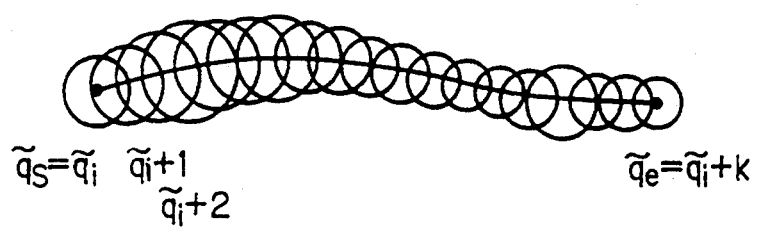
FIGS. 22A and 22B are diagrams showing an example of a curve sample model and an FMPS (Fuzzy Matching Point Set) of the curve sample model in order to explain an algorithm in the fuzzy recognition of the freehand curves to which the present invention is applied.
Figure 22B:
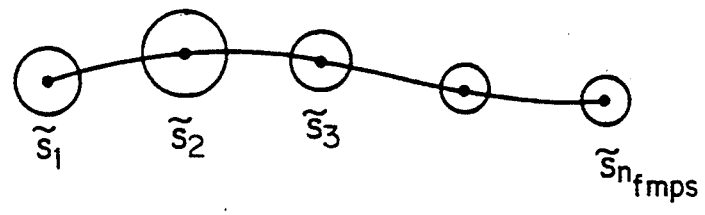
Figure 23A:
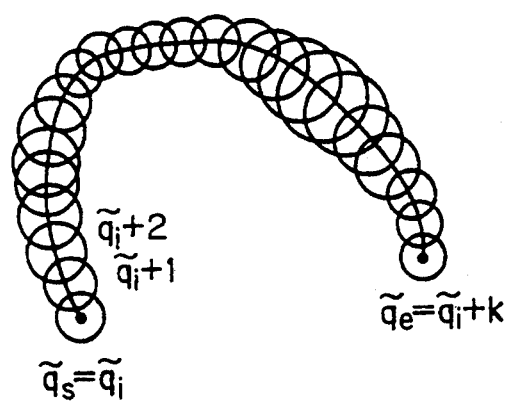
FIGS. 23A and 23B are diagrams showing another example of a curve sample model and an FMPS (Fuzzy Matching Point Set) of the curve sample model in order to explain an algorithm in the fuzzy recognition of the freehand curves to which the present invention is applied.
Figure 23B:
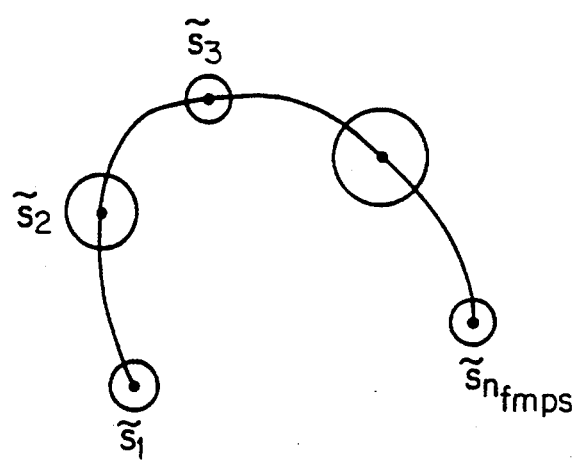

FIGS. 22 and 23 show examples of the sampled curve model and the FMPS, respectively (these figures show a case where n fmps=5, but it is actually desirable to set n fmps to approximately 10 or more so as to represent the entire features of the fundamental curve segment).

Note that it is difficult to properly and definitely obtain the points dividing the fuzzy spline curve equidistantly. Accordingly, parameter values are obtained corresponding to the points dividing approximately equidistantly based on a polygon formed by ridges of the membership functions of the evaluating points $\tilde{q}_i, \ldots, \tilde{q}_{i+k}$ on the original fuzzy spline curve. Then, the FMPS is obtained by reevaluating the fuzzy points on the fuzzy spline curve according to these parameters.

<Reference Model for each Curve Class and its FMPS>

Hypotheses are constructed with respect to the sampled curve models of the fundamental curve segments extracted by the fuzzy segmentation method described above, such that what shaped curves are obtained when the sampled curve models are assumed to be certain specific curve class among line, circular arc (including circle), and elliptic arc (including ellipse). In this embodiment, the hypotheses are called reference models for each curve class.

This reference model is constituted as a fuzzy rational Bézier curve based on several representative fuzzy points among the sampled curve models. The fuzzy rational Bézier curve is defined by extending in a fuzzy manner an ordinary rational Bézier curve which can express line, circular arc and elliptic arc. Accordingly, the obtained reference model is a fuzzy curve.

Next, similar to the above described sampled model, the FMPS shown by expression (26) is constructed representing the entire shape of the reference model constructed as the fuzzy rational Bézier curve by a set of fuzzy points of approximately 10.

$$\{\tilde{r}_1^{Class}, \tilde{r}_2^{Class}, \ldots, \tilde{r}_{nfmps}^{Class}\} \quad (26)$$
$$(Class \in \{Line, Circle, Ellipse\})$$

The FMPS of this reference model is used for verifying the degree to which a sampled curve model to be described later is closed.

<Linear Reference Model Construction M6>

A reference model when the sampled curve model of the target fundamental curve segment is assumed to be line, is constructed as a fuzzy curve satisfying selected two fuzzy representative points on the sampled curve model. Then, the FMPS of the curve reference model is extracted from the fuzzy curve.

Fuzzy Representative Points

Since a line is determined by two points, generally, arbitrary two fuzzy points on the sampled curve model are selected and used as fuzzy representative points for constructing a linear reference model. Note that it is desirable to choose the fuzzy representative points such that these points represent the entire outline of the sampled curve and these points are not too much close to each other.

Figure 25:
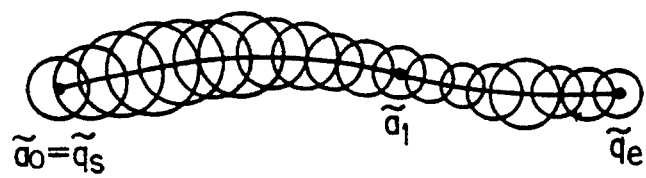
FIG. 25 relates to the explanation of the algorithm for the fuzzy recognition of the freehand curves to which the present invention is applied and illustrates an example of a curve sample model for explaining a generation principle of a segment reference model.

A case where the start point $\tilde{q}_s$ of the sampled cure model is set as one representative fuzzy point $\tilde{a}_0$ and an arbitrary fuzzy point on the sampled curve model is set as the other fuzzy representative point $\tilde{a}_1$ will now be described. In this case, the fuzzy representative points $\tilde{a}_0$ and $\tilde{a}_1$ are set as shown in FIG. 25 with respect to the sampled curve model as shown in FIG. 22A.

It can be easily understood that the linear reference model can be constructed by a similar method even in a general case where arbitrary two points on the sampled curve model are chosen as the fuzzy reference points. According to the applicant's experiment, good experimental results were obtained by selecting the start point $\tilde{q}_s$ and the end point $\tilde{q}_e$ of the sampled curve model as $\tilde{a}_0$ and $\tilde{a}_1$, respectively.

Linear Reference Model

The linear reference model is constructed as a fuzzy curve satisfying the selected fuzzy representative points $\tilde{a}_0$ and $\tilde{a}_1$. This fuzzy curve can be defined as a set of the internal fuzzy point and the external fuzzy point of the fuzzy points $\tilde{a}_0$ and $\tilde{a}_1$. (This definition is equivalent to a case where the fuzzy curve is defined as a specific case of the Bézier curve similar to circular reference model and elliptic reference model to be described later but since line is simple, it is not treated as the Bézier curve particularly).

Figure 26:
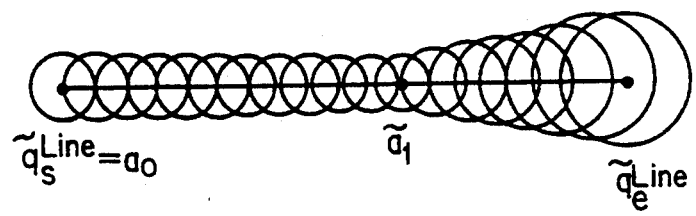
FIG. 26 relates to the explanation of the algorithm for the fuzzy recognition of the freehand curves to which the present invention is applied and illustrates an example of a fuzzy version of the segment reference model corresponding to the curve sample model in FIG. 25 for explaining the generation principle of the segment reference model.

For example, a linear reference model as shown in FIG. 26 is constructed with respect to the selected fuzzy representative points as shown in FIG. 25. The end point $\tilde{q}_e^{Line}$ is fixed to be a value such that the ratio of the arc length between $\tilde{a}_0$ and $\tilde{a}_1$ to the arc length between $\tilde{a}_1$ and $\tilde{q}_e$ along the sampled curve model equals the ratio of the distance between $\tilde{a}_0$ and $\tilde{a}_1$ to the distance between $\tilde{a}_1$ and $\tilde{q}_e^{Line}$.

The internal fuzzy point and the external fuzzy point are obtained as follows.

If the vector v is assumed to be expressed as Rv exp(jθv) (j is the imaginary unit) by using the length Rv of the vector and the angle θv from the x-axis of the vector, the α-level set of arbitrary conical fuzzy vectors $\tilde{a}$ and $\tilde{b}$ defined by expressions (1) and (3) is expressed by equations (27) and (28).

$$\tilde{a} = \{a + R_a(1-\alpha)r_a\exp(j\theta_a) | 0 \leq R_a \leq 1, 0 \leq \theta_a < 2\pi\} \quad (27)$$

$$\tilde{b} = \{b + R_b(1-\alpha)r_b\exp(j\theta_b) | 0 \leq R_b \leq 1, 0 \leq \theta_b < 2\pi\} \quad (28)$$

Based on the extension principle, the α-level set of $\tilde{a}+\tilde{b}$ obtained as an operational result of $\tilde{a}+\tilde{b}$ will the operational result of each α-level set of $\tilde{a}$ and $\tilde{b}$. Accordingly, equation (29) is introduced. As a result, the sum of the fuzzy vectors is expressed by equation (30).

$$(\tilde{a} + \tilde{b})^\alpha = \tilde{a}^\alpha + \tilde{b}^\alpha \quad (29)$$
$$= \{(a + b) + (1 - \alpha)(R_a r_a \exp(j\theta_a) + R_b r_b \exp(j\theta_b))$$
$$| 0 \leq R_a \leq 1, 0 \leq \theta_a < 2\pi, 0 \leq R_b \leq 1, 0 \leq \theta_b < 2\pi\}$$
$$= \{(a + b) + R(1 - \alpha)(r_a + r_b)\exp(j\theta)$$
$$| 0 \leq R \leq 1, 0 \leq \theta < 2\pi\}$$

$$\tilde{a} + \tilde{b} = \langle(a + b), (r_a + r_b)\rangle \quad (30)$$

Further, equation (31) is established with respect to a certain positive real number k, thus equation (32) is introduced.

$$(k\tilde{a})^\alpha = k\tilde{a}^\alpha \quad (31)$$
$$= \{ka + kR_a(1 - \alpha) r_a\exp(j\theta_a)$$
$$| 0 \leq R_a \leq 1, 0 \leq \theta_a < 2\pi\}$$
$$= \{(ka) + R(1 - \alpha)(kr_a)\exp(j\theta)$$
$$| 0 \leq R \leq 1, 0 \leq \theta < 2\pi\}$$

$$k\tilde{a} = \langle(ka), (kr_a)\rangle \quad (\text{for } k \geq 0) \quad (32)$$

On the other hand, equation (33) is established with respect to a certain negative real number k, thus equation (34) is introduced.

$$(k\tilde{a})^\alpha = k\tilde{a}^\alpha \quad (33)$$
$$= \{ka + kR_a(1 - \alpha)r_a\exp(j\theta_a)$$
$$| 0 \leq R_a \leq 1, 0 \leq \theta_a < 2\pi\}$$
$$= \{(ka) + R(1 - \alpha)(-kr_a)\exp(j\theta)$$
$$| 0 \leq R \leq 1, 0 \leq \theta < 2\pi\}$$

$$k\tilde{a} = \langle(ka), (-kr_a)\rangle \quad (\text{for } k < 0) \quad (34)$$

Equation (35) is introduced from equations (32) and (34) with respect to an arbitrary real number k.

$$k\overline{a} = <(ka),(|k|r_a)> \quad (35)$$

When the $\overline{a}$ and $\overline{b}$ are assumed to be the fuzzy points, the fuzzy point $\overline{p}$ which internally or externally divides these points into $\alpha:\beta$ can be defined by equation (36). When both the $\alpha$ and $\beta$ are positive, the fuzzy point $\overline{p}$ will be the interior-division point. When any one of $\alpha$ and $\beta$ is negative, the fuzzy point $\overline{p}$ will be exterior-division point. Note that $\alpha+\beta$ is always positive.

$$\overline{p} = \frac{\beta}{\alpha+\beta}\overline{a} + \frac{\alpha}{\alpha+\beta}\overline{b} \quad (36)$$

By introducing the results from equations (30) and (35) into equation (36), the interior-division point and the exterior-division point is obtained by equation (37) conclusively.

$$\overline{p} = \quad (37)$$

$$< \left(\frac{\beta}{\alpha+\beta}a + \frac{\alpha}{\alpha+\beta}b\right), \left(\frac{|\beta|}{\alpha+\beta}r_a + \frac{|\alpha|}{\alpha+\beta}r_b\right) >$$

Figure 27:
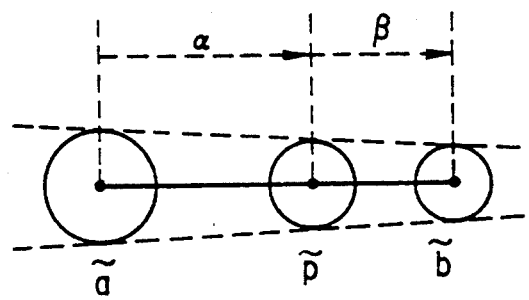
FIG. 27 relates to the explanation of the algorithm for the fuzzy recognition of the freehand curves to which the present invention is applied and illustrates an interior-division fuzzy point between fuzzy points for explaining the generation principle of the segment reference model.
Figure 28:
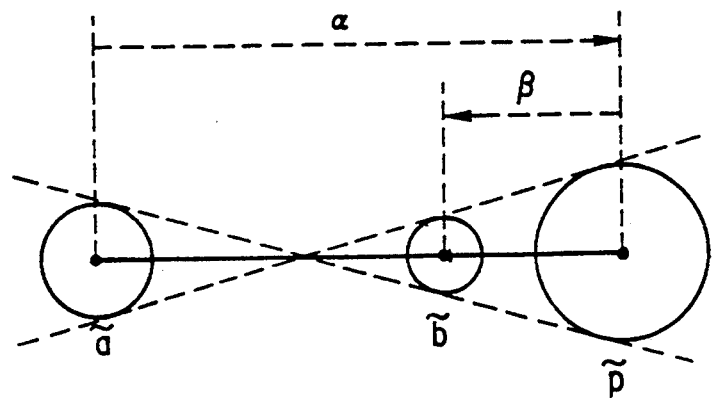
FIG. 28 relates to the explanation of the algorithm for the fuzzy recognition of the freehand curves to which the present invention is applied and illustrates an exterior-division fuzzy point between fuzzy points for explaining the generation principle of the segment reference model.

This behavior is shown in FIGS. 27 and 28, for example.

Care must be taken when $\overline{p}$ and $\overline{b}$ are given first, and $\overline{a}$ is obtained such that $\overline{p}$ internally divides $\overline{a}$ and $\overline{b}$ into $\alpha:\beta$. In this case, equation (38) is used instead of equation (39).

$$\overline{a} = \left(\frac{\alpha+\beta}{\beta}\right)\overline{p} - \left(\frac{\alpha}{\beta}\right)\overline{b} \quad (38)$$

$$= <\left(\frac{\alpha+\beta}{\beta}\overline{p} - \frac{\alpha}{\beta}\overline{b}\right), \left(\frac{\alpha+\beta}{|\beta|}r_p + \frac{|\alpha|}{|\beta|}r_b\right)>$$

$$\left(\frac{\alpha+\beta}{\beta}\right)p + \left(-\frac{\alpha}{\beta}\right)b = \quad (39)$$

$$<\left(\frac{\alpha+\beta}{\beta}p - \frac{\alpha}{\beta}b\right), \left(\left|\frac{\alpha+\beta}{\beta}\right|r_p + \left|\frac{\alpha}{\beta}\right|r_b\right)>$$

FMPS

Figure 29:
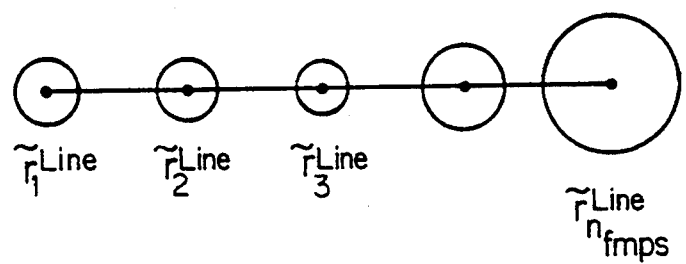
FIG. 29 relates to the explanation of the algorithm for the fuzzy recognition of the freehand curves to which the present invention is applied and illustrates an example of the FMPS of the segment reference model shown in FIG. 26 for explaining the generation principle of the segment reference model.

The n fmps fuzzy points which divide the linear reference model equidistantly are obtained and defined as the FMPS of the linear reference model. Such FMPS can be obtained easily by the operation for obtaining the interior-division fuzzy point and the exterior-division fuzzy point of $\overline{a}_0$ and $\overline{a}_1$. For example, the FMPS shown in expression (40), as shown in FIG. 29 is obtained from the linear reference model shown in FIG. 26.

$$\{\overline{l}_1^{Line}, \overline{l}_2^{Line}, \ldots, \overline{l}_{nfmps}^{Line}\} \quad (40)$$

Figure 30:
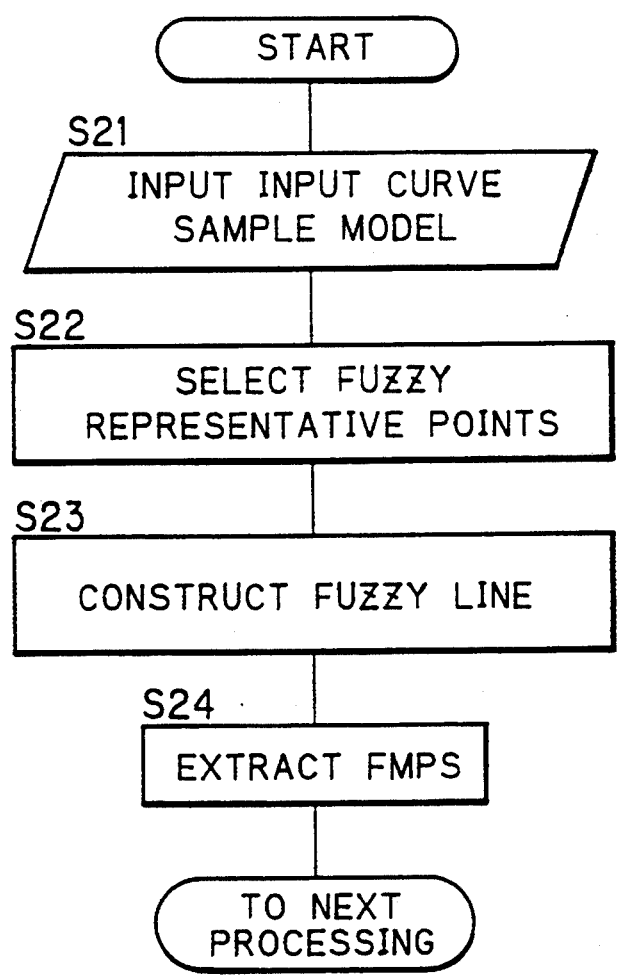
FIG. 30 is a flowchart of the segment reference model generation process in FIG. 6.

FIG. 30 shows a flowchart of the Linear Reference Model Construction M6.

First, the fuzzy sample model of the input curve segmented by the fuzzy segmentation is input to the system (Step S21).

Then, two fuzzy points serving as the first and second fuzzy representative points, respectively are appropriately selected from the input curve sample model represented as the fuzzy spline curve input in step S21 (step S22).

Next, a fuzzy curve satisfying the first and the second fuzzy representative points are generated as a fuzzy curve model (step S23).

In step S23, a set of interior-division fuzzy points between the first and the second fuzzy representative points is obtained. Further, the end point of the fuzzy curve model is obtained such that the ratio of the arc length between the first fuzzy representative point and the second fuzzy representative point to the arc length between the second fuzzy representative point and the end point of the curve sample model equals the ratio of the distance between the first fuzzy representative point and the second fuzzy representative point on the fuzzy curve model to the distance between the second fuzzy representative point and the end point of the fuzzy curve model. Further, a set of exterior-division fuzzy points between the first and second fuzzy representative points with respect to between the second fuzzy representative point and the end point of the fuzzy curve model.

Further, in step S23, a fuzzy curve model is constituted by the set of the interior-division fuzzy points between the first and second fuzzy representative points and the set of the exterior-division fuzzy points between the second fuzzy representative point and the end point of the fuzzy curve model.

Next, the n fmps fuzzy points are obtained to divide the linear reference model obtained in step S23 equidistantly and then defined as the FMPS of the linear reference model (step S24). In step S24, the FMPS is obtained by calculating the interior-division fuzzy point and the exterior-division fuzzy point between the first fuzzy representative point and the second fuzzy representative point, for example.

According to the above-described operation, the fuzzy linear model constituted by appropriately fuzzy-fashioned fuzzy curve can be generated corresponding to the fuzzy-fashioned input curve sample model, as a reference model when an input curve sample model is a segment of a line. The FMPS can be generated from the fuzzy curve model and can be used for evaluating the curve classes for curve inference while allowing for vagueness.

<Circular Reference Model Construction M7>

A reference model when the curve sample model of the target fundamental segment is the circular arc (including circle), is constituted by selecting three fuzzy representative points on the curve sample model and in the form of a fuzzy circular arc satisfying these points. The FMPS of the circular reference model is extracted from the fuzzy circular arc.

Quadratic Rational Bézier Curve Representation of Circular Arc

Figure 31:
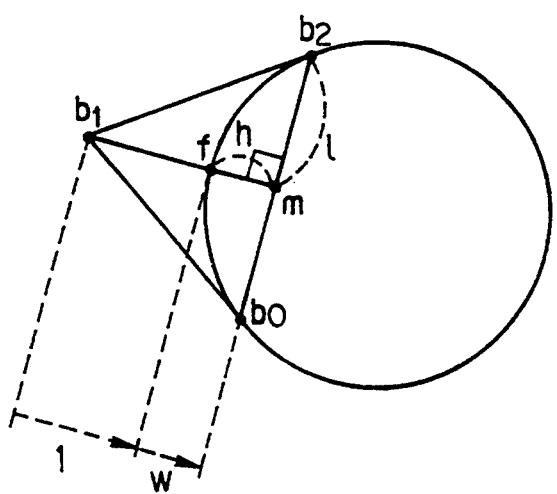
FIG. 31 relates to the explanation of the algorithm for the fuzzy recognition of the freehand curves to which the present invention is applied and illustrates a diagram for explaining an example of a quadratic rational Bézier curve representation of an circular arc.

Circular arc is a type of conical curve and can be represented by the quadratic rational Bézier curve. FIG. 31 shows an example of a circular arc represented by the quadratic rational Bézier curve. In FIG. 31, the arc length between b0 and b1 and passing through f can be expressed as a portion of the parameter value interval [0,1] of the quadratic rational Bézier curve given by a Bézier polygon b0 b1 b2, and a weight w and in accordance with equation (41).

$$b(t) = \frac{B_0^2(t)b_0 + wB_1^2(t)b_1 + B_2^2(t)b_2}{B_0^2(t) + wB_1^2(t) + B_2^2(t)} \quad (41)$$

-continued $$= \frac{\frac{B_0^2(t)b_0 + B_2^2(t)b_2}{B_0^2(t) + B_2^2(t)} + \frac{wB_1^2(t)}{B_0^2(t) + B_2^2(t)}b_1}{1 + \frac{wB_1^2(t)}{B_0^2(t) + B_2^2(t)}}$$

Further, the arc length between b0 and b2 and passing through opposite side of f can be expressed as a portion of the parameter value interval [0,1] of the quadratic Bézier curve given by the Bézier polygon b2 b1 b0 and a weight −w whose sign is inverted and in accordance with equation (42). Note that the $B_i^2(t)$ is a Bernstein polynomial.

$$b^c(t) = \frac{B_0^2(t)b_2 + (-w)B_1^2(t)b_1 + B_2^2(t)b_0}{B_0^2(t) + (-w)B_1^2(t) + B_2^2(t)} \tag{42}$$

$$= \frac{\frac{B_0^2(t)b_2 + B_2^2(t)b_0}{B_0^2(t) + B_2^2(t)} + \frac{(-w)B_1^2(t)}{B_0^2(t) + B_2^2(t)}b_1}{1 + \frac{(-w)B_1^2(t)}{B_0^2(t) + B_2^2(t)}}$$

The necessary and sufficient condition that these curves are circular arc is that the line b1 m is the vertical bisector of the line b0 b2 and a relation shown in equation (43) is established between the weight w, lengths l and h shown in FIG. 31.

$$w = \frac{l^2 - h^2}{l^2 + h^2} \tag{43}$$

The calculation of the weight of circle will now be described.

Figure 32:
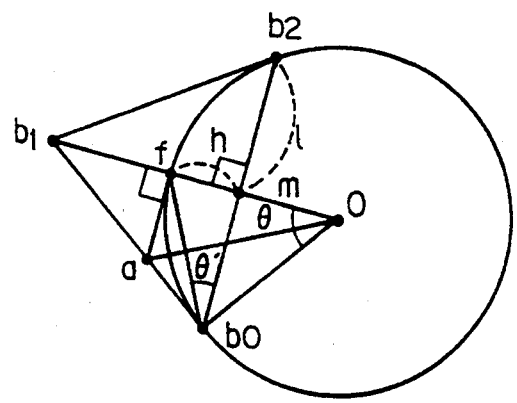
FIG. 32 relates to the explanation of the algorithm for the fuzzy recognition of the freehand curves to which the present invention is applied and illustrates a diagram for explaining an example of a weight of a circle.

When the circle is given as the quadratic rational Bézier curve as shown in FIG. 32, the weight w is expressed by equation (44).

$$w = \cos\theta \tag{44}$$

In FIG. 32, o f ⊥ b0 m and o a ⊥ b0 f is satisfied and thus equation (45) is established.

$$\theta' = Lfb_0m = Laof \tag{45}$$

Further, the triangle a b0 f constitutes an isosceles triangle and thus, equation (46) is obtained.

$$Laof = \tfrac{1}{2}\theta \tag{46}$$

From equations (44) through (46), the weight w is obtained as shown in equation (47).

$$w = \cos 2\theta' = 1 - 2\sin^2\theta' = \frac{l^2 - h^2}{l^2 + h^2} \tag{47}$$

Fuzzy Representative Points

According to the above nature, when two points b0 and b2 on the circumference, the vertical bisector of the line between b0 and b2, and one intersection f of the vertical bisector and the circumference are given, a circle passing through these points is obtained as the quadratic rational Bézier curve. Accordingly, three fuzzy points having similar relation as described above are selected from the curve sample model to be used as the fuzzy representative points for constructing the circular reference model. More specifically arbitrary two fuzzy points $\tilde{a}_0$ and $\tilde{a}_1$ on the curve sample model are selected. Next, the vertical bisector is obtained with respect to the line connecting the ridges of the member ship function of the two fuzzy points. Further, a fuzzy point $\tilde{f}$ on the vertical bisector is obtained among the fuzzy points of the portion from $\tilde{a}_0$ to $\tilde{a}_1$ on the curve sample model. This fuzzy point $\tilde{f}$ serves as a third fuzzy representative point.

In order that these fuzzy representative points represent the entire outline of the curve sample model, it is desirable that these points are not close too much.

Figure 33:
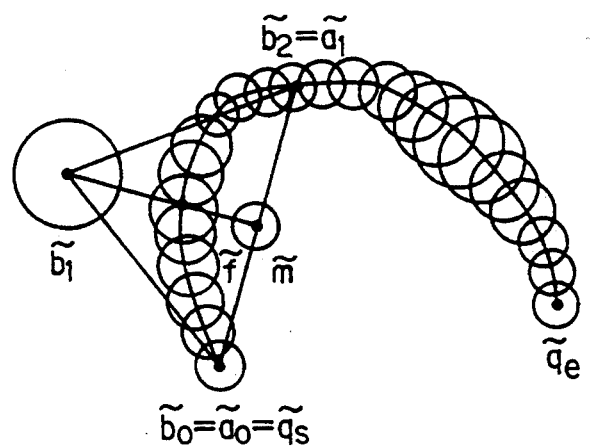
FIG. 33 relates to the explanation of the algorithm for the fuzzy recognition of the freehand curves to which the present invention is applied and illustrates a diagram for explaining the generation principle of an circular arc reference model.

A case will now be described where the start point $s$ of the curve sample model is set as one of the fuzzy representative point $a_0$ as well as an arbitrary fuzzy point on the curve sample model as the second fuzzy representative point $a_1$. More specifically, a case where the fuzzy representative points $a_0$, $a_1$ and f as shown in FIG. 33 are obtained with respect to the curve sample model as shown in FIG. 23A, for example.

The circular reference model can also be constructed by the similar method even in a general case where arbitrary two points on the curve sample model are selected as the fuzzy representative points $a_0$ and $a_1$. The description thereof will be omitted in this embodiment. According to the applicant's experiment, a preferable result could be obtained by selecting $q_s$ and $a_0$ and a fuzzy point whose line distance is the farthest from $q_s$ in the latter half of the curve sample model.

Circular Reference Model

The circular reference model is constituted as a fuzzy circular arc satisfying three fuzzy representative points. In this state, the fuzzy circular arc is defined by equations (48) and (49) by extending the ridges bi (i=1, 2, 3) of the Bézier polygon expressed by equations (41) and (42) to the fuzzy points $b_i$ (i=1, 2, 3).

$$\tilde{b}(t) = \frac{B_0^2(t)\tilde{b}_0 + wB_1^2(t)\tilde{b}_1 + B_2^2(t)\tilde{b}_2}{B_0^2(t) + wB_1^2(t) + B_2^2(t)} \tag{48}$$

$$= \frac{\frac{B_0^2(t)\tilde{b}_0 + B_2^2(t)\tilde{b}_2}{B_0^2(t) + B_2^2(t)} + \frac{wB_1^2(t)}{B_0^2(t) + B_2^2(t)}\tilde{b}_1}{1 + \frac{wB_1^2(t)}{B_0^2(t) + B_2^2(t)}}$$

$$\tilde{b}^c(t) = \frac{B_0^2(t)\tilde{b}_2 + (-w)B_1^2(t)\tilde{b}_1 + B_2^2(t)\tilde{b}_0}{B_0^2(t) + (-w)B_1^2(t) + B_2^2(t)} \tag{49}$$

$$= \frac{\frac{B_0^2(t)\tilde{b}_2 + B_2^2(t)\tilde{b}_0}{B_0^2(t) + B_2^2(t)} + \frac{(-w)B_1^2(t)}{B_0^2(t) + B_2^2(t)}\tilde{b}_1}{1 + \frac{(-w)B_1^2(t)}{B_0^2(t) + B_2^2(t)}}$$

In this stage, the fuzzy Bézier polygon $\tilde{b}_i$ (i=1, 2, 3) and the weight w are defined so that the fuzzy circular arc satisfies the given three fuzzy representative points $\tilde{a}_0$, $\tilde{a}_1$ and $\tilde{f}$. This serves as the circular reference model. This procedure is as follows.

First, let the fuzzy representative point $\tilde{a}_0=\tilde{b}_0$ and the fuzzy representative point $\tilde{a}_1=\tilde{b}_2$, as shown in FIG. 33. Then, get the fuzzy midpoint $\tilde{m}$ between $\tilde{a}_0$ and $\tilde{a}_1$ from equation (50).

$$\tilde{m} = \frac{\tilde{a}_0 + \tilde{a}_1}{2} \tag{50}$$

Then, a distance l between the ridges of the membership functions of $\tilde{a}_0$ and $\tilde{m}$ and distance h between the ridges of the membership functions of $\tilde{f}$ and $\tilde{m}$ are obtained. Further, the weight w is calculated with equation (43). Last, $\bar{b}_1$ is calculated with equation (51) such that f serves as the fuzzy point internally dividing $\bar{b}_1$ and $\bar{m}$ into 1:w.

$$\bar{b}_1 = \frac{(1 + w)\bar{f} - \bar{m}}{w} \qquad (51)$$

Figure 34:
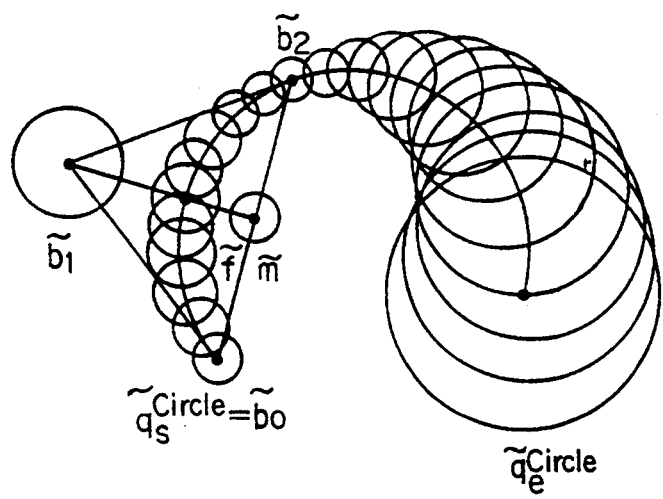
FIG. 34 relates to the explanation of the algorithm for the fuzzy recognition of the freehand curves to which the present invention is applied and illustrates a diagram showing an example of an circular arc reference model of a fuzzy version of the circular arc reference model shown in FIG. 33 for explaining the generation principle of the circular arc reference model.

By constructing the circular reference model as described above, the circular reference model satisfying the fuzzy representative points as shown in FIG. 33, for example are obtained as shown in FIG. 34. Note that the end point $\bar{q}_e{}^{Circle}$ of the circular reference model is fixed to be a value such that the ratio of the arc length between $\bar{a}_0$ and $\bar{a}_1$ to the arc length between $\bar{a}_1$ and $\bar{q}_e$ along the curve sample model equals the ratio of the arc length between $\bar{b}_0$ and $\bar{b}_2$ to the arch length between $\bar{b}_2$ and $\bar{q}_e{}^{Circle}$ along the circular reference model.

FMPS

Figure 35:
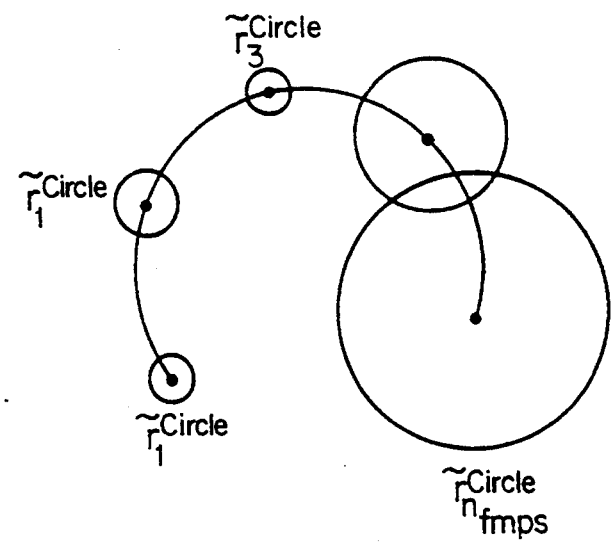
FIG. 35 relates to the explanation of the algorithm for the fuzzy recognition of the freehand curves to which the present invention is applied and illustrates a diagram showing an example of the FMPS of the circular arc reference model shown in FIG. 34 for explaining the generation principle of the circular arc reference model.

The n fmps fuzzy points on the circular reference model are obtained so as to divide the circular reference model equidistantly along the curve and defined as the FMPS of the circular reference model, as shown in expression (52). For example, the FMPS as shown in FIG. 35 is obtained from the circular reference model in FIG. 34.

$$\{\bar{\tau}_1{}^{Circle}, \bar{\tau}_2{}^{Circle}, \ldots, \bar{\tau}_{nfmps}{}^{Circle}\} \qquad (52)$$

In this stage, it is difficult to restrictedly divide equidistantly the fuzzy rational Bézier curve along the curve. Accordingly, first the circular reference model is evaluated by appropriate points so as to be arranged at regular intervals on the parameter t along the curve and an approximated polygon for the circular arc is constituted. Next, a relation between the parameter and the arc length is approximately calculated as a polygonal curve graph. Then, the parameter values corresponding to points dividing the curve at regular intervals are approximately calculated. Last, the FMPS is approximately obtained by reevaluating the circular reference model in the calculated parameter values.

Figure 36:
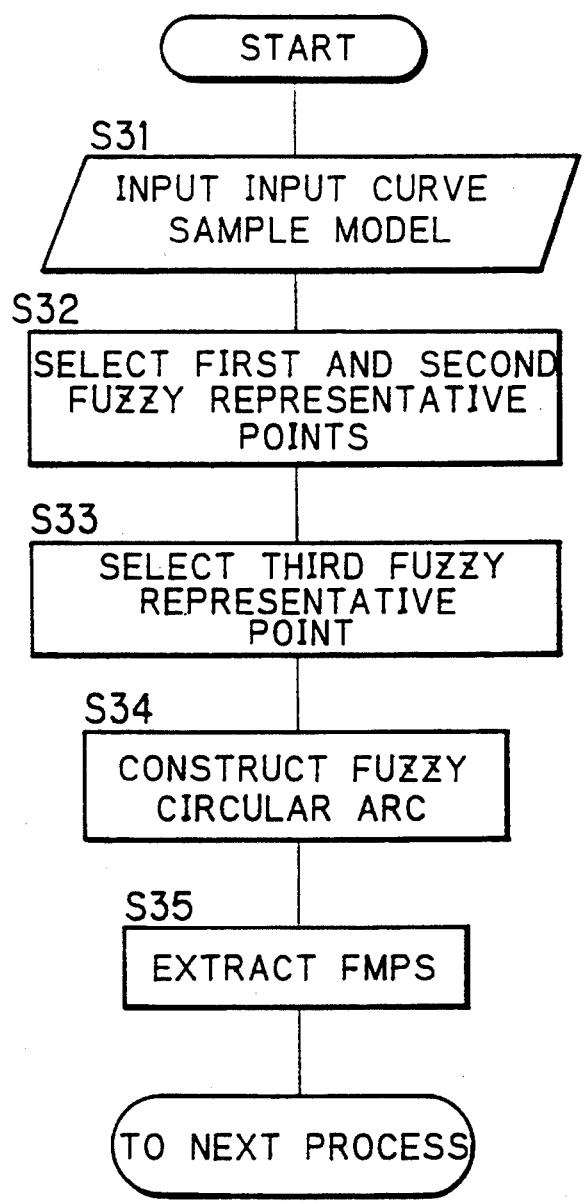
FIG. 36 is flowchart for the circular arc reference model generation process in FIG. 6.

FIG. 36 shows a flowchart of the circular Reference Model Construction M7.

A fuzzy sample model of the input curve segmented by the fuzzy segmentation is input to the system (step S31).

Next, arbitrary two fuzzy points appropriate to the first and second fuzzy representative points, respectively are selected from the input curve sample model represented as the fuzzy spline curve input in step S31 (step S32).

Further, a fuzzy point serving as the third fuzzy representative point is selected in accordance with the first and second fuzzy representative points selected in step S32 (step S33).

In step S33, the vertical bisector of the line connecting the ridges of the membership functions of the first and second fuzzy representative points is obtained. Further, a fuzzy point on the vertical bisector among the fuzzy points of the portion from the first representative point to the second representative point on the input curve sample model is selected and defined as the third fuzzy representative point.

Next, the fuzzy circular arc satisfying the first through third fuzzy representative points as well as the weight is generated as the fuzzy circular model (step S34).

In step S34, the fuzzy Bézier polygon is obtained so as to satisfy the first through third fuzzy representative points. The weight of the circular arc is obtained in accordance with the first through third fuzzy representative points. Further, the end point of the fuzzy circular model is fixed to a value such that the ratio of the arc length between the first fuzzy representative point and the second fuzzy representative point to the arc length between the second fuzzy representative point and the end point along the curve sample model equals to the ratio of the arc length between the first fuzzy representative point and the second fuzzy representative point along the fuzzy circular model.

Further, in step S34, the fuzzy circular model is constituted in accordance with the fuzzy Bézier polygon, the weight of the circular arc and the end point of the fuzzy circular model.

Next, the n fmps fuzzy points are obtained so as to divide the circular reference model at regular intervals and defined as the FMPS of the circular reference model (step S35).

As has been described above, in step S35, the approximated polygon of the circular arc is constituted by evaluating the circular reference model by appropriate number of points so as to be arranged at regular intervals on the parameter t. Then, the relation between the parameter and the arc length is approximately obtained as a polygonal curve graph. Accordingly, the parameter values corresponding to the points dividing the circular reference model at regular intervals are approximately obtained. Thus, the FMPS is approximately obtained by reevaluating the circular reference model in accordance with the parameters.

According to the method described above, the fuzzy circular model constituted by the fuzzy circular arc appropriately fuzzy-fashioned corresponding to the fuzzy-fashioned input curve sample model is obtained as the reference model when the input curve sample model is assumed to be the circular arc. From this fuzzy circular model, the FMPS as described above is generated, for example and can used for evaluating the curve classes for inferring curves while allowing for vagueness.

<Elliptic Reference Model Construction M8>

A reference model when the curve sample model of the target fundamental curve segment is elliptic arc (including ellipse) as a fuzzy elliptic arc satisfying three fuzzy representative points and one auxiliary point selected from the curve sample model. Next, the FMPS of the ellipse reference model is extracted from the fuzzy elliptic arc.

Quadratic Rational Bézier Curve Representation of Elliptic Arc

Figure 37:
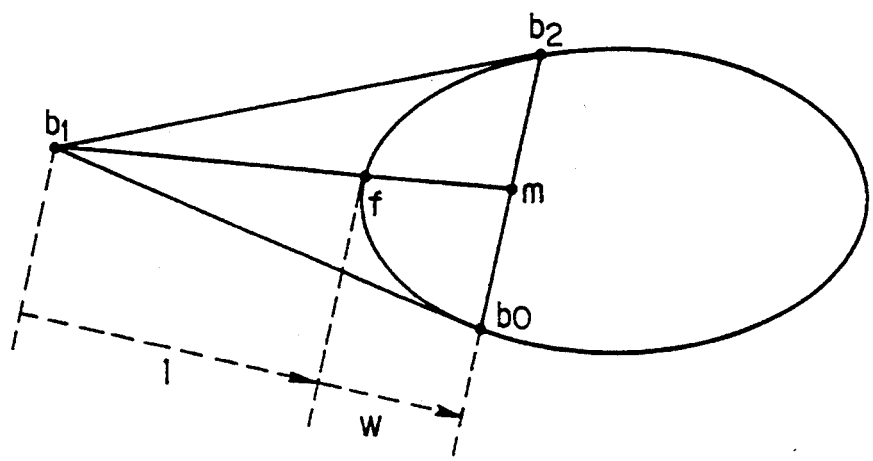
FIG. 37 relates to the explanation of the algorithm for the fuzzy recognition of the freehand curves to which the present invention is applied and illustrates a diagram for explaining an example of a quadratic rational Bézier curve representation of an elliptic arc.

The elliptic arc is a type of conical curves and can be expressed as the quadratic rational Bézier curve. FIG. 37 shows an example of the elliptic arc expressed by the quadratic rational Bézier curve. The elliptic arc of a portion from b0 to b2 passing through f can be expressed as the portion of the parameter value interval [0,1] of the quadratic rational Bézier curve, given by equation (53) and in accordance with the Bézier polygon b0 b1 b2 and a weight w (1>w>-1).

$$b(t) = \frac{B_0{}^2(t)b_0 + wB_1{}^2(t)b_1 + B_2{}^2(t)b_2}{B_0{}^2(t) + wB_1{}^2(t) + B_2{}^2(t)} \qquad (53)$$

$$= \frac{\frac{B_0^2(t)b_0 + B_2^2(t)b_2}{B_0^2(t) + B_2^2(t)} + \frac{wB_1^2(t)}{B_0^2(t) + B_2^2(t)}b_1}{1 + \frac{wB_1^2(t)}{B_0^2(t) + B_2^2(t)}}$$

Further, the elliptic arc of a portion from b2 to b0 passing through opposite to f can be represented as a portion of parameter value interval [0,1] of the quadratic rational Bézier curve given by equation (54) and in accordance with the Bézier polygon b2 b1 b0 and the weight $-w$ whose sign is inverted. Note that the $B_i^2(t)$ is a quadratic Bernstein polynomial.

$$b^c(t) = \frac{B_0^2(t)b_2 + (-w)B_1^2(t)b_1 + B_2^2(t)b_0}{B_0^2(t) + (-w)B_1^2(t) + B_2^2(t)} \quad (54)$$

$$= \frac{\frac{B_0^2(t)b_2 + B_2^2(t)b_0}{B_0^2(t) + B_2^2(t)} + \frac{(-w)B_1^2(t)}{B_0^2(t) + B_2^2(t)}b_1}{1 + \frac{(-w)B_1^2(t)}{B_0^2(t) + B_2^2(t)}}$$

In this state, if the midpoint of the line b0 and b2 is defined as m the intersection f of the line b1 m and the elliptic arc is farthest from the line b0 b2 among the points on the elliptic arc.

Figure 38:
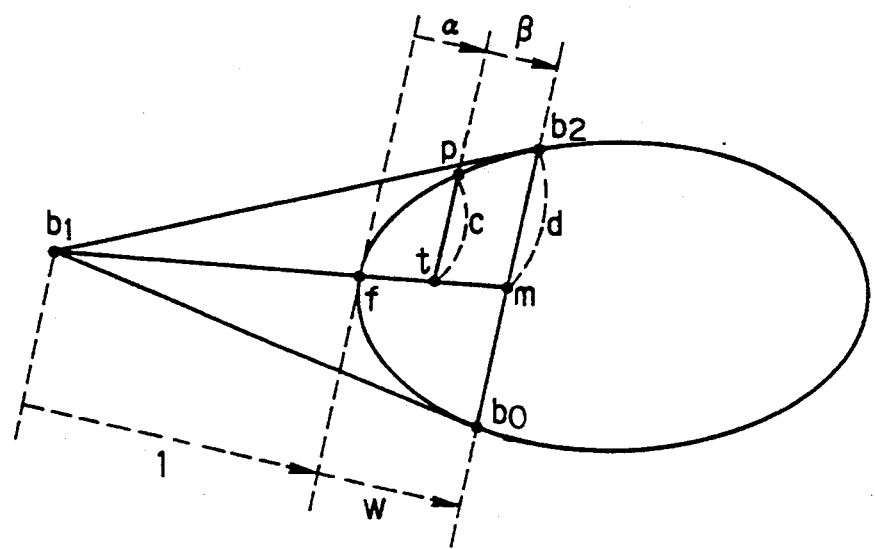
FIG. 38 relates to the explanation of the algorithm for the fuzzy recognition of the freehand curves to which the present invention is applied and illustrates a diagram for explaining an example of the relation between the auxiliary points and a weight of an ellipse.

Further, as shown in FIG. 38, when a further arbitrary auxiliary point p is given on, the elliptic arc and an intersection of the line fm and a curve segment drawn from p and parallel to the line b0 b2 is denoted as t, the relation shown in equation (55) is established between the distances c and d, the interior-division ratio $\alpha:\beta$ of the line fm due to the point t.

$$w = \frac{(\alpha + \beta)^2 c^2 - \alpha(\alpha + 2\beta)d^2}{\alpha^2 d^2 - (\alpha + \beta)^2 c^2} \quad (55)$$

A method for calculating the weight of the ellipse by using the auxiliary point will now be described.

Assume now that the auxiliary point p is taken on the elliptic arc. Then, the weight w is expressed by equation (56). Equation (57) is obtained by squaring both sides of equation (56).

$$w = \frac{\beta}{2\gamma}\left(\sqrt{\frac{n}{m}} + \sqrt{\frac{m}{n}}\right) \quad (56)$$

$$w^2 = \frac{\beta^2(n + m)^2}{4\gamma^2 nm} \quad (57)$$

Figure 39:
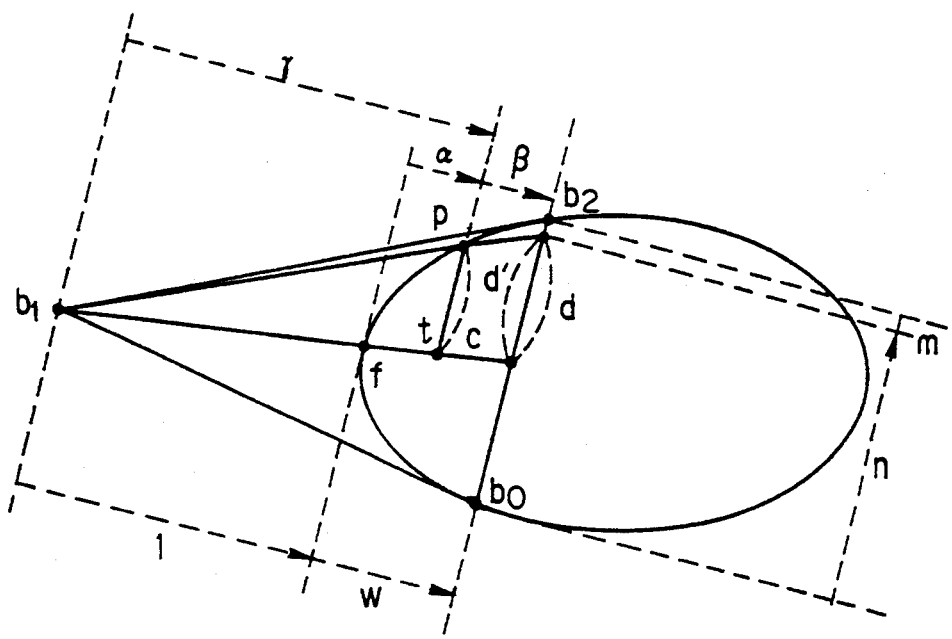
FIG. 39 relates to the explanation of the algorithm for the fuzzy recognition of the freehand curves to which the present invention is applied and illustrates a diagram for explaining auxiliary points and a weight of an ellipse.

On the other hand, equation (58) is satisfied from FIG. 39, then equation (59) is obtained.

$$(\gamma - \alpha):(\alpha + \beta) = 1:w \quad (58)$$

$$\gamma = \frac{(1 + w)\alpha + \beta}{w} \quad (59)$$

Further, equation (60) is satisfied and then equation (62) is obtained.

$$c:d' = \gamma:(\gamma + \beta) \quad (60)$$

$$d' = c\left(1 + \frac{\beta}{\gamma}\right) \quad (61)$$

$$n:m = (d + d'):(d - d') \quad (62)$$
$$m(d + d') = n(d - d') \quad (63)$$

In this stage, equation (61) is substituted for equation (63) to obtain equation (64), and equation (59) is further substituted for equation (64) to obtain equation (65).

$$m((d+c)\gamma+c\beta)=((d-c)\gamma-c\beta) \quad (64)$$

$$m((d+c)((1+w)\alpha+\beta)+cw\beta)=n((d-c)((1+w)\alpha+\beta)-cw\beta) \quad (65)$$

If values on both sides of equation (65) is assumed to be P and equations (66) and (67) are substituted for equation (65), equations (68) and (69) are resulted and finally equation (70) is obtained.

$$A = (d + c)(1 + w)\alpha + (d + c)\beta + cw\beta \quad (66)$$
$$B = (d - c)(1 + w)\alpha + (d - c)\beta - cw\beta \quad (67)$$

$$m = \frac{P}{A} \quad (68)$$

$$n = \frac{P}{B} \quad (69)$$

$$n + m = \frac{2Pd((1 + w)\alpha + \beta)}{AB} \quad (70)$$

Further, if equation (59) is substituted for equation (70), equation (71) is obtained.

$$n + m = \frac{2Pdw\gamma}{AB} \quad (71)$$

In this stage, if equations (68), (69) and (71) are substituted for equation (57), equation (72) is obtained.

$$d^2\beta^2 = AB \quad (72)$$

Equations (66) and (67) defining A and B are substituted for equation (72) to obtain equation (73).

$$(1+w)((1+w)((d+c)\alpha+c\beta)((d-c)\alpha-c\beta)+2-d^2\alpha\beta)=0 \quad (73)$$

In case of the elliptic arc, $-1<w<1$ and $w\neq-1$ are satisfied. Accordingly, equation (74) is obtained.

$$(1+w)((d+c)\alpha+c\beta)((d-c)\alpha-c\beta)+2d^2\alpha\beta=0 \quad (74)$$

If equation (74) is solved with respect to weight w, the weight w is calculated as shown in equation (75).

$$w = \frac{(\alpha + \beta)^2 c^2 - \alpha(\alpha + 2\beta)d^2}{\alpha^2 d^2 - (\alpha + \beta)^2 c^2} \quad (75)$$

Figure 40:
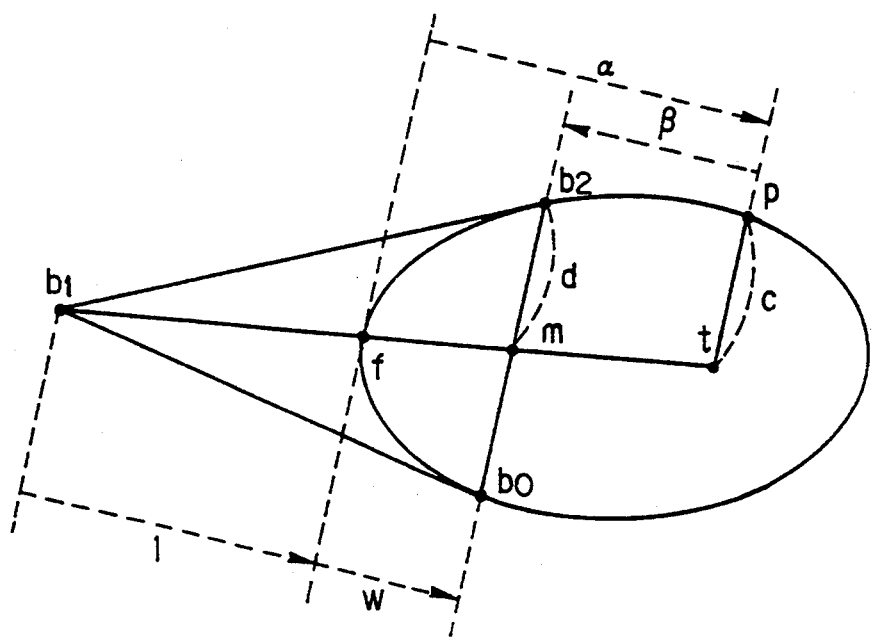
FIG. 40 relates to the explanation of the algorithm for the fuzzy recognition of the freehand curves to which the present invention is applied and illustrates a diagram for explaining another example of the auxiliary points and the weight of the ellipse.

Equation (55) is also true for the case where the auxiliary point p is set outside the Bézier polygon b0 b1 b2 as shown in FIG. 40. In this case, however, attention must be paid that $\beta$ becomes negative.

Fuzzy Representative Point

According to the above-described nature, if two points b0 and b2 on the elliptic arc and the point f farthest from the curve b0 and b2 are given, an ellipse passing through these three points is obtained as the quadratic Bézier curve by giving an appropriate weight.

Accordingly, three fuzzy points having similar relation as the points b0, b2 and f are selected and defined as the fuzzy representative points for constructing the elliptic reference model. More specifically, arbitrary two fuzzy points $\tilde{a}_0$ and $\tilde{a}_1$ on the curve sample model are selected. Next, a fuzzy point $\tilde{f}$ farthest from the line connecting the ridges of the membership functions of $\tilde{a}_0$ and $\tilde{a}_1$ among the fuzzy points of the portion from $\tilde{a}_0$ to $\tilde{a}_1$ on the curve sample model is obtained. This point f is defined as the third fuzzy representative point.

These fuzzy representative points are not preferably close too much in order to represent the entire outline of the curve sample model.

Figure 24A:
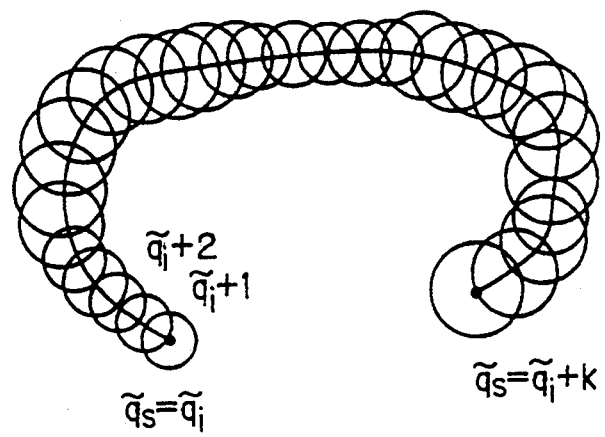
FIGS. 24A and 24B are diagrams showing yet another example of a curve sample model and an FMPS (Fuzzy Matching Point Set) of the curve sample model in order to explain an algorithm in the fuzzy recognition of the freehand curves to which the present invention is applied.
Figure 24B:
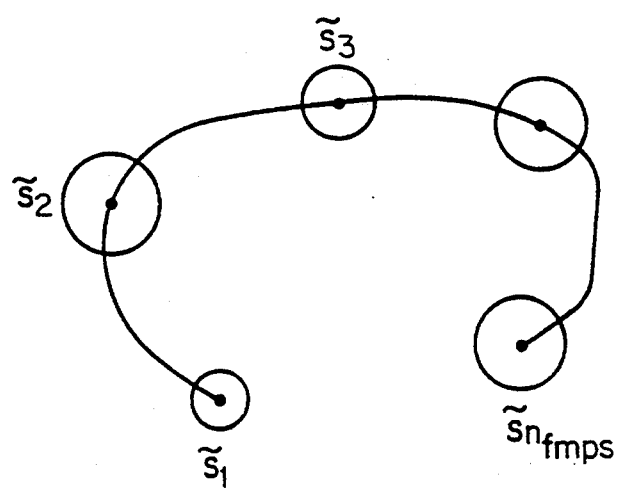
Figure 41:
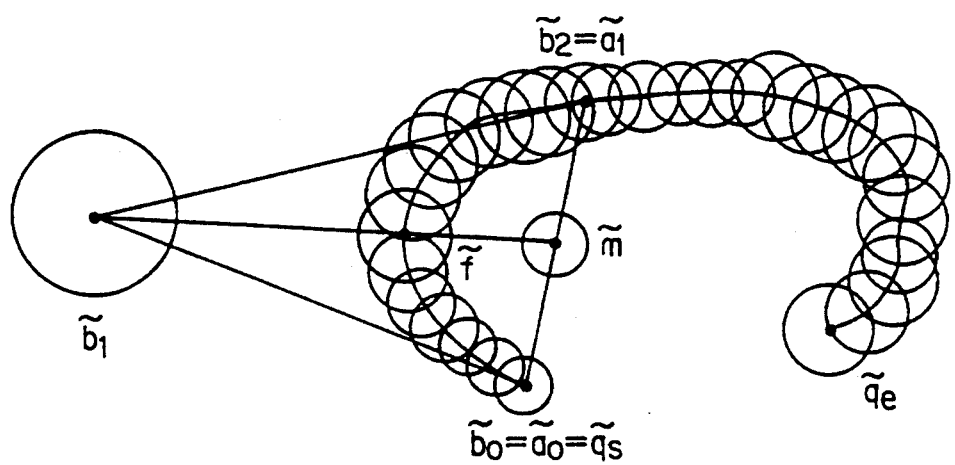
FIG. 41 relates to the explanation of the algorithm for the fuzzy recognition of the freehand curves to which the present invention is applied and illustrates a diagram showing an example of a curve sample model for explaining a generation principle of the elliptic arc reference model.

A case where the start point $\tilde{q}_s$ of the curve sample model is set as one $\tilde{a}_0$ of the fuzzy representative points and an arbitrary fuzzy point on the curve sample model is set as the second fuzzy representative point $\tilde{a}_1$ will now be described. More specifically, a case where the fuzzy representative points $\tilde{a}_0$ and $\tilde{a}_1$ and $\tilde{f}$ are obtained as shown in FIG. 41 with respect to the curve sample model as shown in FIG. 24A will be described.

Figure 42:
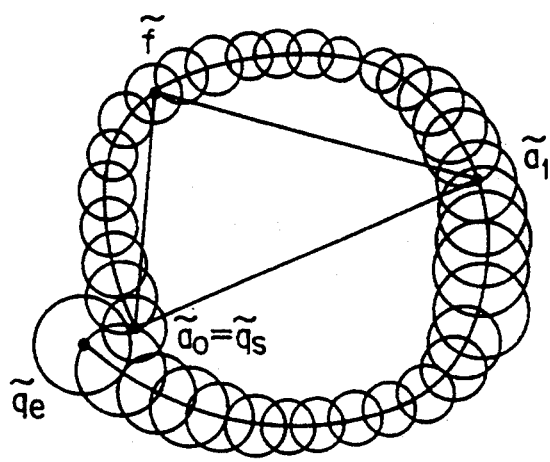
FIG. 42 relates to the explanation of the algorithm for the fuzzy recognition of the freehand curves to which the present invention is applied and illustrates a diagram showing an example of selection of representative points in the curve sample model for explaining the generation principle of the elliptic arc reference model.
Figure 43:
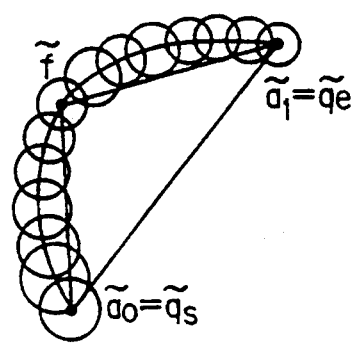
FIG. 43 relates to the explanation of the algorithm for the fuzzy recognition of the freehand curves to which the present invention is applied and illustrates a diagram showing another example of the selection of representative points in the curve sample model for explaining the generation principle of the elliptic arc reference model.

It is possible to construct the elliptic reference model by the similar method even in a general case where arbitrary points on the curve sample model are selected as the fuzzy representative points $\tilde{a}_0$ and $\tilde{a}_1$ but the description thereof will be omitted. According to the applicant's experiment, a good result can be obtained by defining $\tilde{q}_s$ as $\tilde{a}_0$ and a fuzzy point whose line distance is farthest from $\tilde{q}_s$ among the latter half of the curve sample model is selected as $\tilde{a}_1$. An example where such fuzzy representative points are selected is shown in FIGS. 42 and 43.

Elliptic Reference Model

The elliptic reference model is constructed as a fuzzy elliptic arc satisfying three fuzzy representative points. In this embodiment, the fuzzy elliptic arc is defined by equations (76) and (77) by extending the ridges bi (i=1, 2, 3) of the Bézier polygon expressed by equations (53) and (54) to fuzzy points $\tilde{b}_i$ (i=1, 2, 3).

$$\tilde{b}(t) = \frac{B_0^2(t)\tilde{b}_0 + wB_1^2(t)\tilde{b}_1 + B_2^2(t)\tilde{b}_2}{B_0^2(t) + wB_1^2(t) + B_2^2(t)} \quad (76)$$

$$= \frac{\frac{B_0^2(t)\tilde{b}_0 + B_2^2(t)\tilde{b}_2}{B_0^2(t) + B_2^2(t)} + \frac{wB_1^2(t)}{B_0^2(t) + B_2^2(t)}\tilde{b}_1}{1 + \frac{wB_1^2(t)}{B_0^2(t) + B_2^2(t)}}$$

$$\tilde{b}^c(t) = \frac{B_0^2(t)\tilde{b}_2 + (-w)B_1^2(t)\tilde{b}_1 + B_2^2(t)\tilde{b}_0}{B_0^2(t) + (-w)B_1^2(t) + B_2^2(t)} \quad (77)$$

$$= \frac{\frac{B_0^2(t)\tilde{b}_2 + B_2^2(t)\tilde{b}_0}{B_0^2(t) + B_2^2(t)} + \frac{(-w)B_1^2(t)}{B_0^2(t) + B_2^2(t)}\tilde{b}_1}{1 + \frac{(-w)B_1^2(t)}{B_0^2(t) + B_2^2(t)}}$$

In this stage, the fuzzy Bézier polygon $\tilde{b}_i$ (i=1, 2, 3) and the weight w are determined such that the fuzzy elliptic arc satisfies the three fuzzy representative points $\tilde{a}_0$, $\tilde{a}_1$ and $\tilde{f}$. The elliptic reference model is defined as such fuzzy Bézier polygon and the weight. This procedure is as the follows:

First, as shown in FIG. 41, the two representative fuzzy points and $\tilde{a}_0$ and $\tilde{a}_1$ are defined as $\tilde{b}_0$ and $\tilde{b}_2$, respectively. Next, the fuzzy midpoint $\tilde{m}$ of $\tilde{a}_0$ and $\tilde{a}_1$ is calculated with equation (78).

$$\tilde{m} = \frac{\tilde{a}_0 \tilde{a}_1}{2} \quad (78)$$

In this stage, one auxiliary point p is defined on the curve sample model. Then, the intersection t is obtained of the line connecting the ridges of the membership functions between $\tilde{f}$ and $\tilde{m}$ and the line drawn from p and in parallel to the line connecting the ridges of membership functions of $\tilde{b}_0$ and $\tilde{b}_2$. Then, the values corresponding to c, d, $\alpha$ and $\beta$ in FIG. 38 or 40 are obtained, and the weight w is calculated by equation (55). Last, the $\tilde{b}_1$ is obtained by equation (79) such that $\tilde{f}$ serves as the fuzzy point internally dividing $\tilde{b}_1$ and $\tilde{m}$ into 1:w.

$$\tilde{b}_1 = \frac{(1+w)\tilde{f} - \tilde{m}}{w} \quad (79)$$

Figure 44:
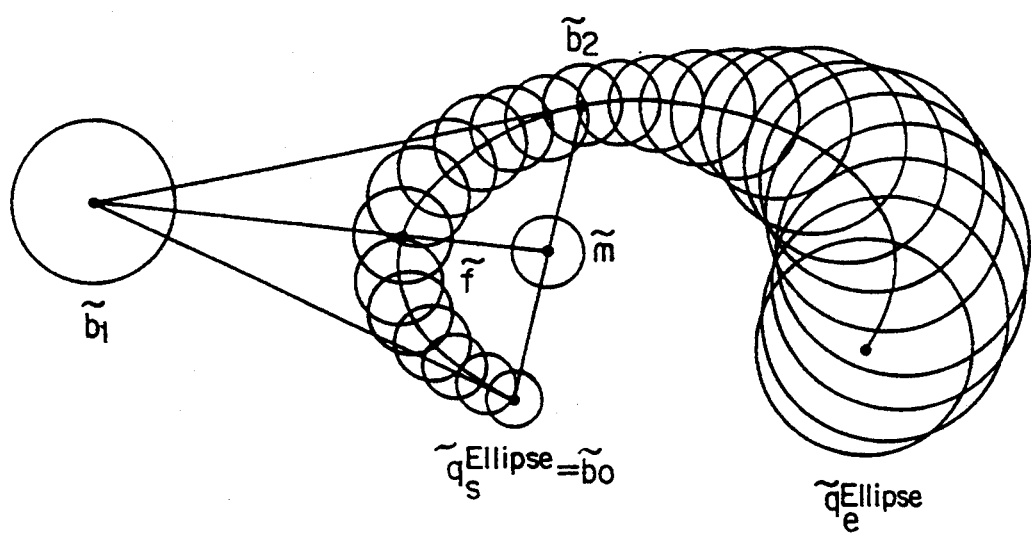
FIG. 44 relates to the explanation of the algorithm for the fuzzy recognition of the freehand curves to which the present invention is applied and illustrates a diagram showing an example of an elliptic arc reference model of a fuzzy version corresponding to the curve sample model shown in FIG. 41 for explaining the generation principle of the elliptic arc reference model.

If the elliptic reference model is constructed as described above, the elliptic reference model satisfying the fuzzy representative points as shown in FIG. 41, for example is obtained as shown in FIG. 44. Note that the end point $\tilde{q}_e^{Ellipse}$ of the elliptic reference model is fixed to a value such that the ratio of the arc length between $\tilde{a}_0$ and $\tilde{a}_1$ to the arch length between $\tilde{a}_1$ and $\tilde{q}_e$ along the curve sample model equals the ratio of the arch length between $\tilde{b}_0$ and $\tilde{b}_2$ to the arch length between $\tilde{b}_2$ and $\tilde{q}_e^{Ellipse}$ along the elliptic reference model.

Figure 45:
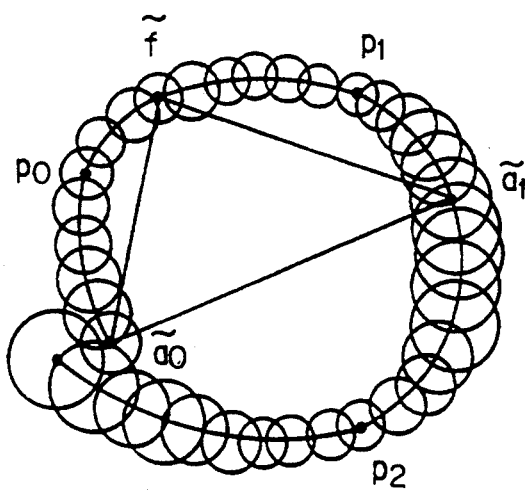
FIG. 45 relates to the explanation of the algorithm for the fuzzy recognition of the freehand curves to which the present invention is applied and illustrates a diagram showing an example of selection of auxiliary points for determining a weight in the curve sample model for explaining the generation principle of the elliptic arc reference model.
Figure 46:
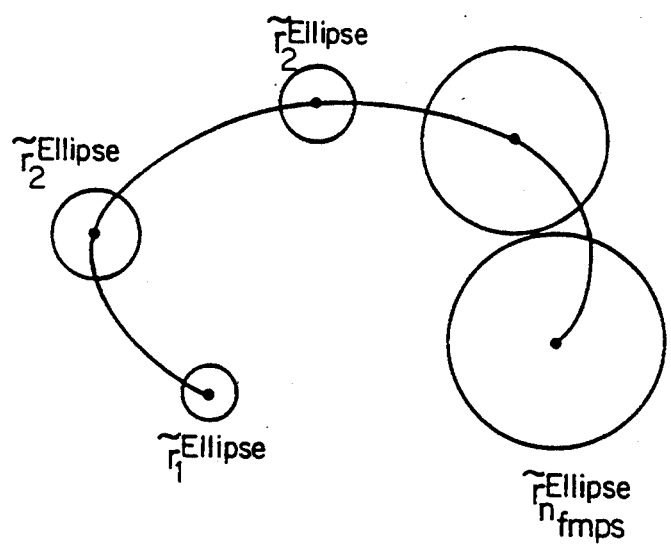
FIG. 46 relates to the explanation of the algorithm for the fuzzy recognition of the freehand curves to which the present invention is applied and illustrates a diagram showing an example of the FMPS of the elliptic arc reference model shown in FIG. 44 for explaining the generation principle of the elliptic arc reference model.

The auxiliary point p may be selected fundamentally as an arbitrary point on the curve sample model apart from the three fuzzy representative points to a certain degree. However, the constituted elliptic reference model may partially be distorted from the original curve sample model depending on a position of the auxiliary point p. Accordingly, in the experiment, three auxiliary points p0, p1, p2 are selected as shown in FIG. 45. Then, three types of elliptic reference models are constructed with respect to each auxiliary point. The elliptic reference model which can obtain the highest possibility according to the possibility evaluation of the curve classes to be described later is adopted as the final elliptic reference model to thereby obtain a good result.

These auxiliary points p0, p1, p2 are selected as farthest points from the line connecting the ridges of the membership functions of $\tilde{a}_0$ and $\tilde{f}$, the line connecting the ridges of the membership functions of $\tilde{f}$ and $\tilde{a}_1$, and the line connecting the ridges of $\tilde{a}_1$ and $\tilde{a}_0$.

FMPS n fmps fuzzy points are defined on the elliptic reference model so as to divide the elliptic reference model equidistantly. These points are defined as the FMPS of the elliptic reference model and shown by expression (80).

$$\{\tilde{r}_1^{Ellipse}, \tilde{r}_2^{Ellipse}, \ldots, \tilde{r}_{nfmps}^{Ellipse}\} \quad (80)$$

It is difficult to divide restrictedly the fuzzy rational Bézier curve at regular intervals. Accordingly, first the elliptic reference model is evaluated by appropriate number of points so as to be arranged at regular intervals on the parameter t and an approximated polygon of the elliptic arc is constructed. Then, a relation between the parameters and the distances along the curve on the elliptic arc are approximately obtained as the polygonal curve graph. Thus, the parameter values corresponding to the points dividing the curve at regular intervals are approximately obtained. Last, the elliptic reference model is reevaluated in the obtained parameter values to approximately obtain the FMPS.

Figure 47:
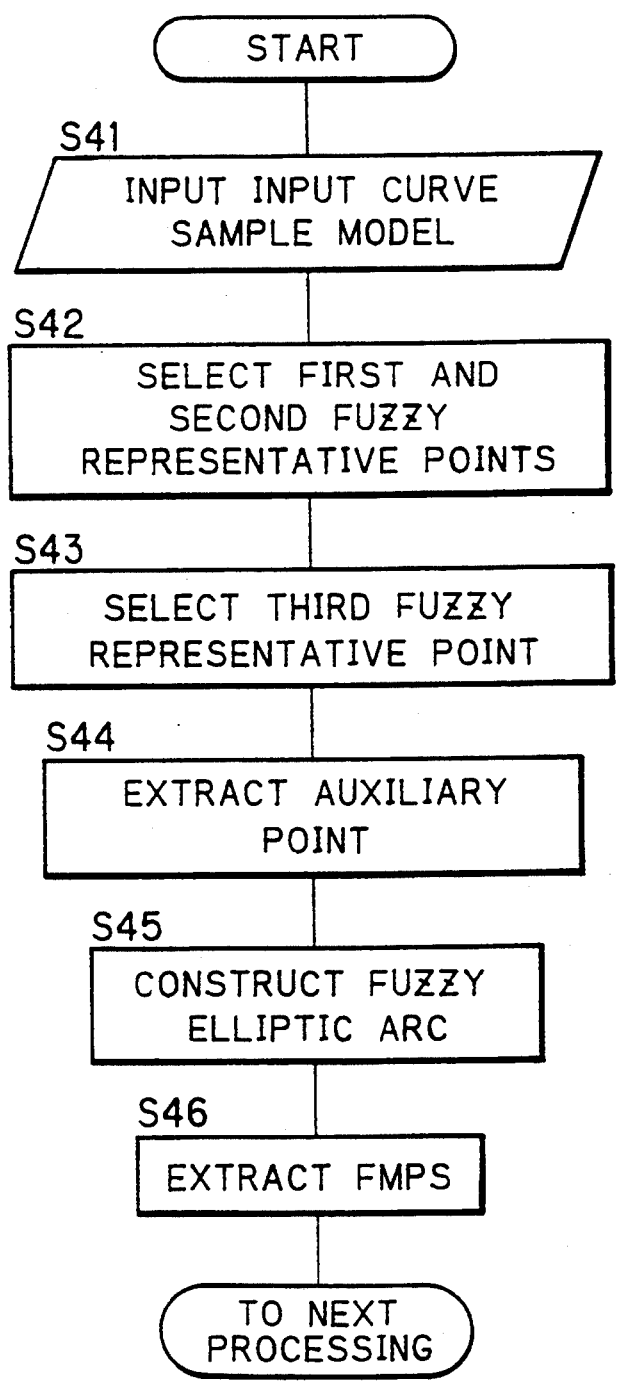
FIG. 47 is a flowchart of the elliptic arc reference model generation process in FIG. 6.

FIG. 47 shows the flowchart of the Elliptic Reference Model M8.

First, the fuzzy sample model of the input curve segmented by the fuzzy segmentation is input to the system (step S41).

Next, two fuzzy points appropriate to the first and second fuzzy representative points are selected from the input curve sample model expressed as the fuzzy spline curve input in step S41 (step S42).

Further, a fuzzy point as the third fuzzy representative point is selected in accordance with the first and second fuzzy representative points selected in step S42 (step S43).

In step S43, a fuzzy point farthest from the line connecting the ridges of the membership functions of the first and second fuzzy representative points is obtained as the third fuzzy representative point.

Further, the auxiliary point is obtained on the curve in which the grade of the input curve sample model is 1 and distant from the first through third fuzzy representative points to a certain degree (step S44). One point will suffice for the auxiliary point obtained in step S44 fundamentally. However, a plurality of auxiliary points may be obtained by selecting the farthest points from the lines connecting the ridges of the membership functions of the first through third fuzzy representative points and the elliptic reference model which can obtain the best result among the reference models obtained with respect to the farthest points may be adopted as the final elliptic reference model.

Next, the fuzzy elliptic arc satisfying the first through third fuzzy representative points and the weight is generated as the fuzzy elliptic arc model (step S45).

In step S45, the fuzzy Bézier polygon is obtained so as to satisfy the first through third fuzzy representative points. The weight of the arc is obtained in accordance with the first through third fuzzy representative points and the auxiliary point. Further, the end point of the fuzzy elliptic arc model is fixed to a value such that the ratio of the arc length between the first fuzzy representative point and the second fuzzy representative point to the arc length between the second fuzzy representative point and the end point of the curve sample model along the curve sample model equals the ratio of the arc length between the first representative point and the second representative point to the arch length between the second fuzzy representative point and the end point of the fuzzy elliptic arc model along the fuzzy elliptic arc model.

Further, in step S45, the fuzzy elliptic arc model is constructed in accordance with the fuzzy Bézier polygon, the weight of the elliptic arc and the end point of the fuzzy elliptic arc model.

Next, n fmps fuzzy points are obtained on the elliptic reference model obtained in step S45 so as to divide the elliptic reference model at regular intervals and these points are defined as the FMPS of the elliptic reference model (step S46).

In step S46, the approximated polygon of the elliptic arc is constructed by evaluating the elliptic reference model with appropriate number of points so as to divide the elliptic arc model at regular intervals on the parameter t. Then, the relation between the parameter and the distance along the curve on the elliptic arc is obtained approximately as the polygonal curve graph. In accordance with the parameter value, the elliptic reference model is reevaluated so that the FMPS is approximately obtained.

According to the above described method, the fuzzy elliptic model constituted by the appropriately fuzzy-fashioned fuzzy elliptic arc corresponding to the fuzzy fashioned input curve sample model can be obtained as the reference model when the input curve sample model is assumed to be the elliptic arc. Then, the FMPS is generated from the fuzzy elliptic arc model and can be used for evaluating the curve classes for the curve inference while allowing for vagueness.

<Curve Class Possibility Evaluation M9>

As described above, the curve sample model of the target fundamental curve segment is obtained and further the curve models when the curve sample model is assumed to be line, circular arc and elliptic arc, respectively are obtained as curve reference model, circular reference model, and elliptic reference model, respectively. However, in this embodiment, these reference models are hypothetical models so as to satisfy at most several fuzzy representative points among the curve sample models. Accordingly, the degree to which these hypotheses are closed to the original curve sample model over the entire fundamental curve segment must be verified.

According to the above described method, the verification of the degree of the closeness between the fuzzy curves is replaced with the degree of closeness of the FMPS (shown in expression (26)) of the reference model for each curve class described above and is measured by possibility measure which is a type of fuzzy measure.

More specifically, the possibility $P^{Class}$ that a curve sample model belongs to the curve class Class($\epsilon${Line, Circle, Ellipse}) is defined by equation (81).

$$P^{Class} = \min_{i} (\sup_{v} (\mu_{\tilde{s}_i}(v) \wedge \mu_{\tilde{T}_i Class}(v))) \tag{81}$$

where the left and right terms connected by an operator "$\wedge$" indicating min operation which takes smaller value rep resent the conical membership functions of $\tilde{s}_i$ and $\tilde{T}_i{}^{Class}$.

The portion of expression (82) in equation (81) is obtained by the possibility measure as the possibility of the proposition that "the ith fuzzy matching point $\tilde{s}_i$ of the sample model is the ith fuzzy matching point $\tilde{T}_i{}^{Class}$ of the reference model".

$$\sup_{v} (\mu_{\tilde{s}_i}(v) \wedge \mu_{\tilde{T}_i Class}(v)) \tag{82}$$

Expression (81) expresses a possibility obtained by ANDing these possibilities with respect to all the fuzzy matching points. Accordingly, $p^{Class}$ means the possibility of the proposition that "all of the FMPS of the sample models are the FMPS of the reference models".

Figure 48:
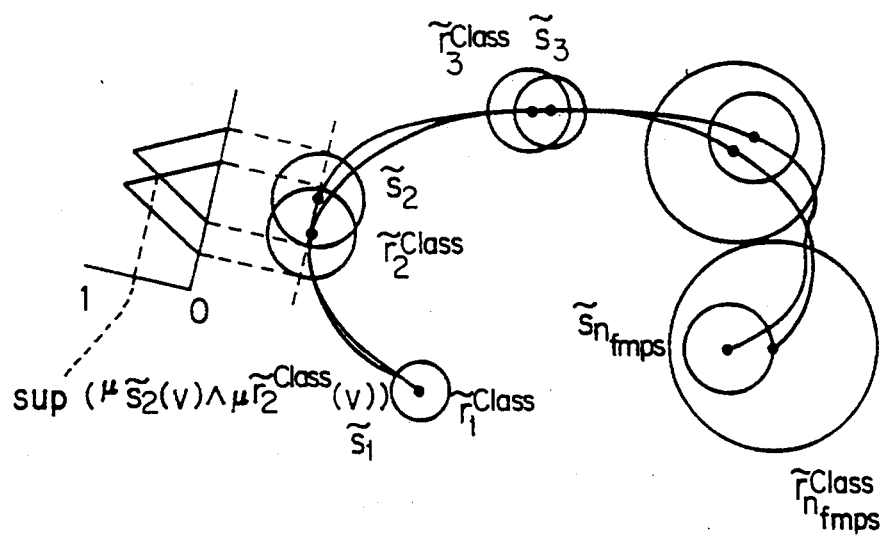
FIG. 48 relates to the explanation of the algorithm for the fuzzy recognition of the freehand curves to which the present invention is applied and illustrates a diagram for explaining possibility measurement of a coincidence between a curve sample model and the FMPS of a curve reference model.

Expression (82) is easily obtained from the cross section cut obtained by cutting the membership functions of $\tilde{s}_i$ and $\tilde{T}_i{}^{Class}$ by the line connecting the ridges thereof as shown in FIG. 48. Accordingly, the possibility $P^{Class}$ of expression (81) is also obtained easily. This $P^{Class}$ is obtained with respect to each of line, circular arc and elliptic arc so that the possibility $P^{Line}$, $P^{Circle}$, and $P^{Ellipse}$ for each curve class are obtained.

Figure 49:
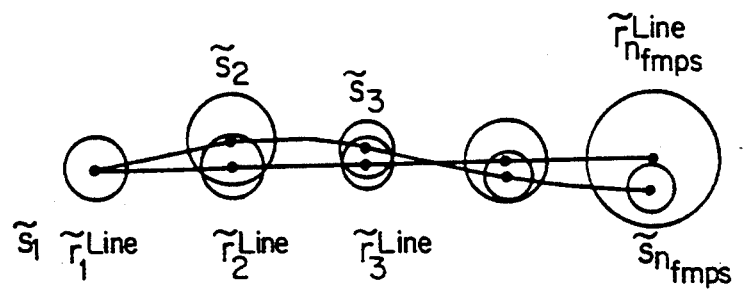
FIG. 49 relates to the explanation of the algorithm for the fuzzy recognition of the freehand curves to which the present invention is applied and illustrates a diagram for explaining possibility measurement of a coincidence between a curve sample model and the FMPS of a segment reference model.
Figure 50:
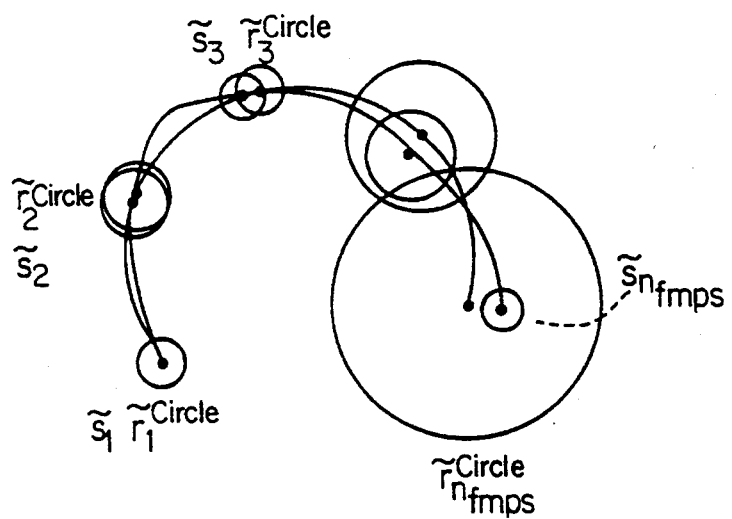
FIG. 50 relates to the explanation of the algorithm for the fuzzy recognition of the freehand curves to which the present invention is applied and illustrates a diagram for explaining possibility measurement of a coincidence between the curve sample model and the FMPS of the circular arc reference model.
Figure 51:
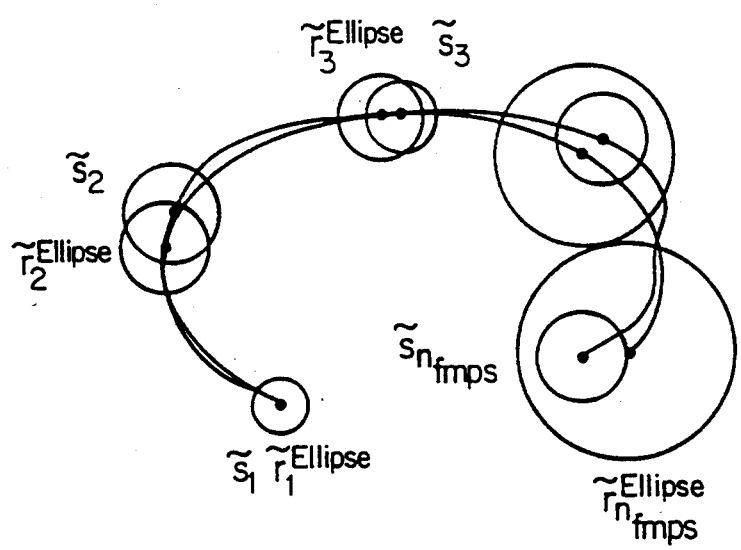
FIG. 51 relates to the explanation of the algorithm for the fuzzy recognition of the freehand curves to which the present invention is applied and illustrates a diagram for explaining possibility verification of a coincidence between the curve sample model and the FMPS of the elliptic arc reference model.

FIG. 49 shows a behavior of verifying the possibility that the FMPS of the curve sample model in FIG. 22A becomes the FMPS of the line sample model in FIG. 29. FIG. 50 shows a behavior of verifying the possibility that the FMPS of the curve sample model in FIG. 23A becomes the FMPS of the circular reference model it. FIG. 35. FIG. 51 shows a behavior of verifying that the FMPS of the curve sample model in FIG. 24A becomes the FMPS of the elliptic reference model.

<Closeness Possibility Evaluation M10>

In order to evaluate that the curve sample model of the target fundamental curve segment is the closed curve, the possibility $P^{Closed}$ that the curve is closed is defined as shown in equation (83) by using the possibility measure which is a type of fuzzy measures.

$$P^{Closed} = \sup_{v}(\mu_{\overline{q_e}}(v) \wedge \mu_{\overline{q_s}}(v)) \tag{83}$$

where $\mu qs(v)$ and $\mu qe(v)$ are conical membership functions of qs and qe, respectively and "$\wedge$" is a min operation which takes a smaller value. The left and right terms connected by the operator "$\wedge$" represent conical membership functions of $\overline{q}_s$ and $\overline{q}_e$, respectively.

Figure 52:
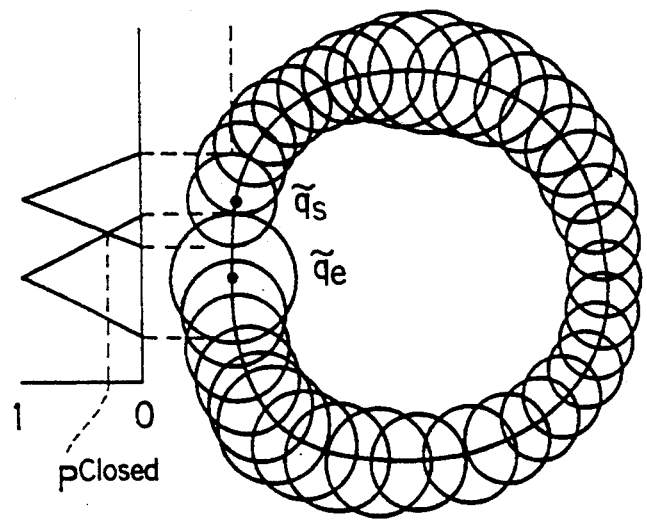
FIG. 52 relates to the explanation of the algorithm for the fuzzy recognition of the freehand curves to which the present invention is applied and illustrates a diagram for explaining evaluation of closeness of a curve sample model.

Expression (83) represents a possibility of the proposition that "the end point $\overline{q}_e$ is the start point $\overline{q}_s$". The value of the possibility is easily obtained from the cross section obtained by cutting the membership functions of $\overline{q}_s$ and $\overline{q}_e$ by the line connecting the ridges of thereof as shown in FIG. 52.

<Fuzzy Inference for Curve Classes M11>

The curve class intended by a drawer is inferred among the seven fundamental curve classes: line, circle, circular arc, ellipse, elliptic arc, closed free curve, and open free curve with respect to the curve sample model of the target fundamental curve segment from the possibility of line $p^{Line}$, the possibility of circular arc (including circle) $P^{Circle}$, the possibility of elliptic arc (including ellipse) $P^{Ellipse}$, and the possibility of closed curve $p^{Closed}$.

Figure 53:
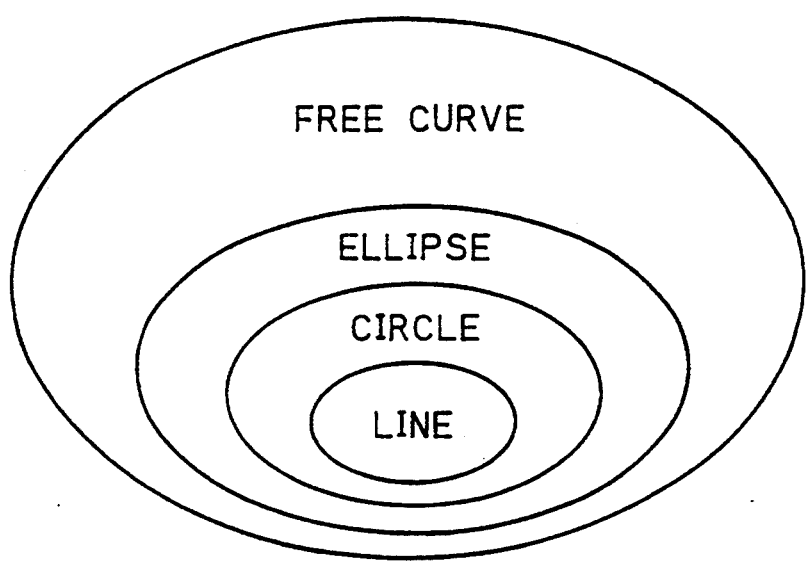
FIG. 53 relates to the explanation of the algorithm for the fuzzy recognition of the freehand curves to which the present invention is applied and illustrates a diagram for explaining an involvement relation of the curve classes.

The degree of freedom is increased in the order of line, circular arc, elliptic arc, and free curve. FIG. 53 shows involvement relation among the degree of freedom of these curve classes. Accordingly, a relation shown in equation (84) is generally established between the possibilities obtained separately for each curve class with respect to the same sample model.

$$p^{Line} \leq p^{Circle} \leq p^{Ellipse} \leq p^{FreeCurve} = 1 \tag{84}$$

Accordingly, it is meaningless to infer the intended curve simply from the magnitude of the possibility $P^{Class}$ for each curve class. It is necessary to infer the curve class from the mutual relation among $P^{Class}$ (Class{Line, Circle, Ellipse}) for each curve class.

More specifically, the inference must be performed such that if the possibility of a simple class having low degree of freedom is high enough, the simple curve class must be selected even if the possibility of the curve class having the low degree of freedom is somewhat lower than the possibility of the curve class having high degree of freedom.

On the other hand, each curve class can be refined depending on whether the curve is the closed curve or not. For example, the elliptic arc and the ellipse can be refined into separate curve class. In this embodiment, open curve involves closed curve as a special case so as to recognize that ellipse is a special case of elliptic arc. Accordingly, the open curve can be considered as having higher degree of freedom than that of the closed curve.

Taking account of the above described facts, the curve class intended by a drawer is inferred by using the inference rule shown in FIG. 54. The first rule in FIG. 54 shows that "If there is possibility of line, then line". The fourth rule shows that "if there are no possibility of line and no possibility of elliptic arc and there is possibility of elliptic arc and the curve class is possibly closed, then ellipse". The seventh rule shows that "if there are no possibility of line, no possibility of ellipse, no possibility of elliptic arc and no possibility of closed, then open free curve".

Since this inference is executed as the fuzzy inference, not that one of the inference rules shown in FIG. 54 is applied but that all of the seven inference rules are parallelly evaluated. As a result, the curve class is obtained as a discrete fuzzy set having a definition range shown in expression (85).

{Line(L), Circle(C), CircularArc(CA), Ellipse(E), EllipticArc(EA), ClosedFreeCurve(FC), OpenFreeCurve(FO)} (85)

More specifically, each of the grade values of the inference results $\widetilde{C}_I$ of the curve class by the inference rules shown in FIG. 54 is obtained as shown in equations (86) through (92).

$$\mu_{\widetilde{C}_I}(L) = p^{Line} \tag{86}$$

$$\mu_{\widetilde{C}_I}(C) = (1 - p^{Line}) \wedge p^{Circle} \wedge p^{Closed} \tag{87}$$

$$\mu_{\widetilde{C}_I}(CA) = (1 - p^{Line}) \wedge p^{Circle} \wedge (1 - p^{Closed}) \tag{88}$$

$$\mu_{\widetilde{C}_I}(E) = (1 - p^{Line}) \wedge 1 - p^{Circle}) \wedge p^{Ellipse} \wedge p^{Closed} \tag{89}$$

$$\mu_{\widetilde{C}_I}(EA) = 1 - p^{Line}) \wedge 1 - p^{Circle}) \wedge p^{Ellipse} \wedge (1 - p^{Closed}) \tag{90}$$

$$\mu_{\widetilde{C}_I}(FC) = 1 - p^{Line}) \wedge 1 - p^{Circle}) \wedge 1 - p^{Ellipse} \wedge p^{Closed} \tag{91}$$

$$\mu_{\widetilde{C}_I}(FO) = 1 - p^{Line}) \wedge 1 - p^{Circle}) \wedge 1 - p^{Ellipse} (1 - p^{Closed}) \tag{92}$$

Figure 55A:
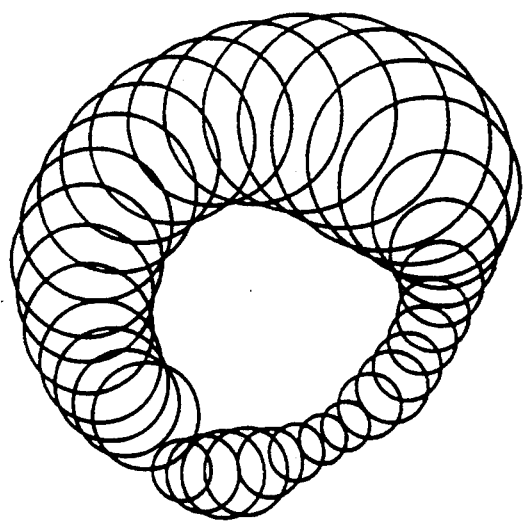
FIGS. 55A and 55B relate to the explanation of the algorithm for the fuzzy recognition of the freehand curves to which the present invention is applied and illustrate a diagram showing an example of the curve sample model and inferred fuzzy curve classes.
Figure 55B:
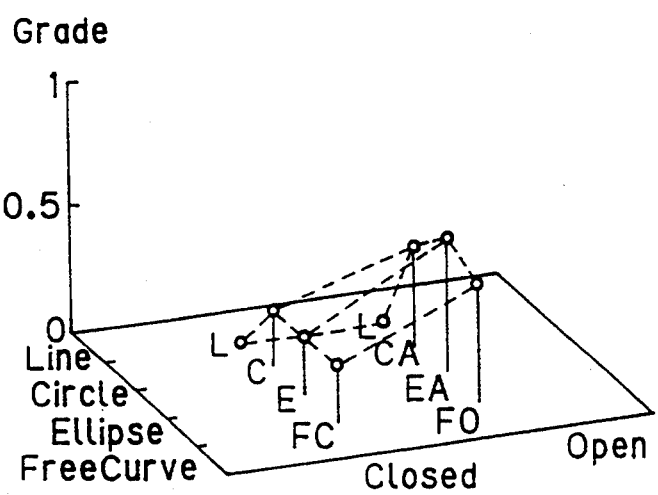

FIGS. 55A and 55B show an example of the curve sample model and the fuzzy curve class $\widetilde{C}_I$ inferred with respect to the model. In this example, the grade (shown by equation (90)) of the elliptic arc (EA) is highest. However, the grades of other curve classes are also considerably high, resulting in vague inferred curve class. This is because the inference results obtained by the method according to the present invention can reflect the roughness of the drawing manner and the vagueness of the shape of the input curve sample model. In contrast, if the curve sample model is more carefully drawn or its shape is characteristic, a conclusive inference result involving less vagueness can be obtained.

One of the curve classes is determined by presenting the inferred fuzzy curve class $\widetilde{C}_I$ to the drawer and making the drawer to effectively select the final curve class interactively or by conveying as one of information the inferred result to the high-grade inference system having further identifying information. According to the experiment system, an effective human interface is realized by presenting sequentially on a display screen the curve class having higher grade until the drawer agrees.

If one curve class is determined, the reference model corresponding to the curve class is adopted as the recognized curve. Note that if the free curve is determined, the curve sample model is used as the recognized curve. Curves recognized in this stage are obtained as fuzzy curves.

<Calculation of Recognized Curve Representative Value (Representative Curve) M12>

The recognized curves obtained as described above are all fuzzy curves and not suited to be displayed on a screen or to be used with an ordinary CAD system. Then, an ordinary curve (not fuzzy) is calculated by extracting the portion where the grade of the obtained fuzzy curve is 1 as the representative value of the recognized curve (representative curve).

Line Case

If the recognized curve class is line, the line reference model as shown in FIG. 26 is the recognized curve. Accordingly, the line connecting the ridge of the membership function of $\tilde{q}_s{}^{Line}$ and the ridge of the membership function of $\tilde{q}_e{}^{Line}$ is defined as the representative value of the recognized curve.

Circle Case

If the recognized curve is circle, the elliptic reference model as shown in FIG. 34 is the recognized curve. In this case, the circle serving as the representative value of the recognized curve is obtained in the form of the rational Bézier curve shown in equations (41) and (42) if the ordinary Bézier polygon b0 b1 b2 is constructed b the ridges of the membership functions of each of the obtained Bézier polygon $\tilde{b}_0 \tilde{b}_1 \tilde{b}_2$. The definition range of the parameter t is defined as [0,1] with respect to equations (41) and (42) so as to obtain the closed circle independent of the position of the end point $\tilde{q}_e{}^{Circle}$.

Circular Arc Case

If the recognized curve class is circular arc, the circular arc reference model as shown in FIG. 34 similar to the circle case is the recognized curve. Accordingly, the circular arc serving as the representative value of the recognized curve is obtained in the form of the rational Bézier curve shown in equations (41) and (42) if the ordinary Bézier polygon $\tilde{b}_0 \tilde{b}_1 \tilde{b}_2$ is constituted by the ridges of the membership functions of each of the obtained fuzzy Bézier polygon b0 b1 b2. Note that the parameter t of equation (42) is limitedly ranged from 0 through the parameter value giving $\tilde{q}_e{}^{Circle}$.

Ellipse Case

If the recognized curve class is ellipse, the elliptic reference model as shown in FIG. 44 is the recognized curve. In this case, ellipse serving as the representative values of the recognized curve is obtained in the form of the rational Bézier curve shown in equations (53) and (54) when the ordinary Bézier polygon b0 b1 b2 is constituted by the ridges of the membership functions of each of the obtained fuzzy Bézier polygon $\tilde{b}_0 \tilde{b}_1 \tilde{b}_2$. The definition range of the parameter t is defined as [0,1] with respect to equations (53) and (54) independent of the position of the end point $\tilde{q}_e{}^{Ellipse}$ so as to obtain the closed ellipse.

Elliptic Arc Case

If the recognized curve class is elliptic arc, the elliptic reference model as shown in FIG. 44 is obtained as the recognized curve similar to the ellipse case. Accordingly, elliptic arc serving as the representative value of the recognized curve in the form of the rational Bézier curve defined by equations (53) end (54) when the ordinary Bézier polygon b0 b1 b2 is constituted by the ridges of the membership functions of each of the obtained fuzzy Bézier reference model $\tilde{b}_0 \tilde{b}_1 \tilde{b}_2$. Note that the parameter t in equation (54) is limitedly defined ranging from 0 to the parameter value giving $\tilde{q}_e{}^{Ellipse}$.

Closed Free Curve Case

If the recognized curve class is closed curve, appropriate number of fuzzy points on the curve sample model are obtained. Then, the B-spline curve passing through the ridges of the membership functions is obtained, which serves as the representative values of the recognized curve.

Open Free Curve Case

If the recognized curve is open free curve, appropriate number of fuzzy points on the curve sample model are obtained. Then, the B-spline curve passing through the ridges of the membership functions is obtained, which serves as the representative values of the recognized curve.

<Connection of Recognized Curve Representative Value (Representative Curve) M13>

Figure 56:
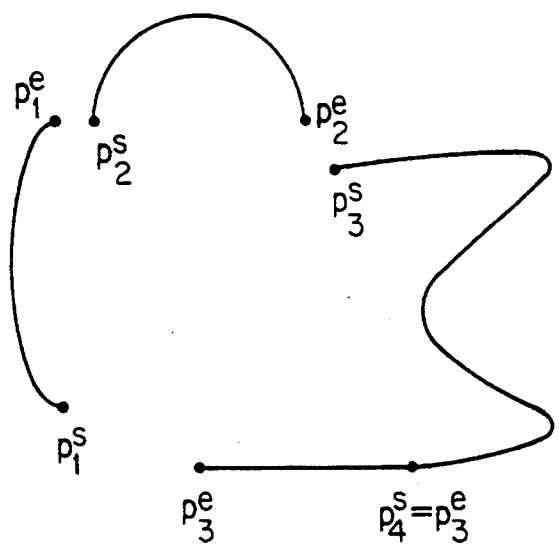
FIG. 56 is a diagram showing an example of recognized representative curves for explaining a connection process of the representative curves according to the present invention in the fuzzy recognition of the freehand curves.

The whole of the input first curve is recognized as a set of several representative curves by performing the above described processes with respect to each of the fundamental curve segments. However, the recognized representative curve is not always obtained as mutually-connected lines in spite that the original input curve is drawn by one stroke. For example, the recognized curve is obtained as shown in FIG. 56. Accordingly, when the curve must be recognized as connected, the connection process due to a post process is necessary.

When taking account that the curve classes of the recognized curve must be saved, the affine conversions of curve which can be utilized for the connection process are limited to parallel displacement, rotation, and enlargement/reduction. Accordingly, the following connection process is performed.

Figure 57:
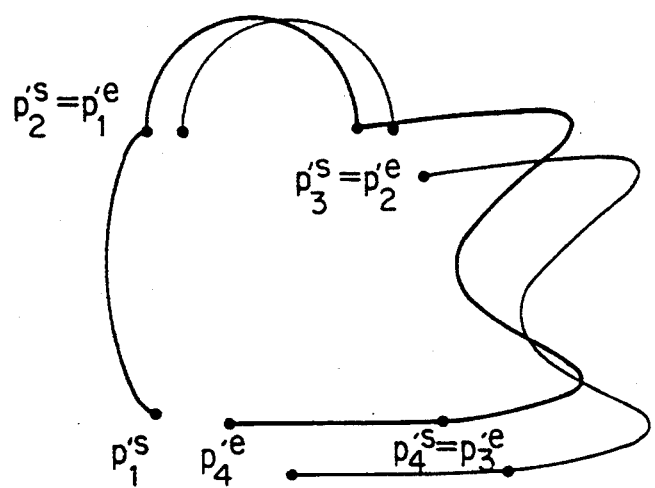
FIG. 57 is a diagram showing an example of a connection due to parallel displacement of recognized representative curves for explaining a connection process of the representative curves according to the present invention in the fuzzy recognition of the freehand curves.
Figure 58:
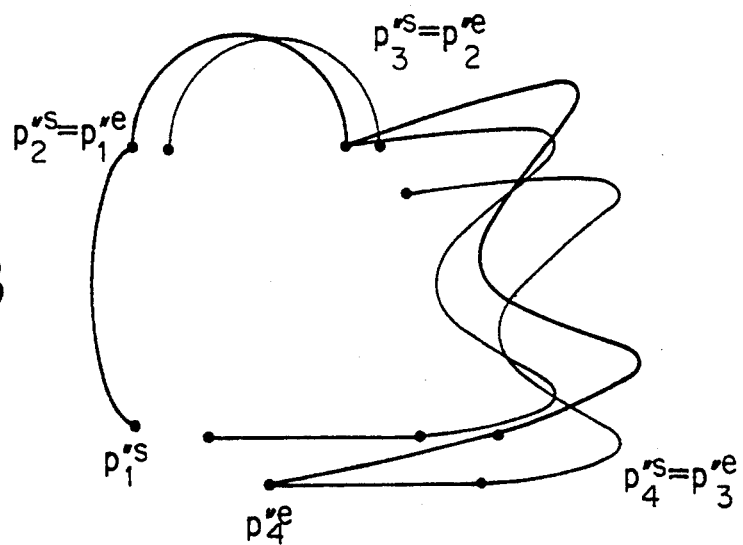
FIG. 58 is a diagram showing an example of a coincidence process of ending points of rotated and enlarged/reduced recognized representative curves for explaining the connection process of the representative curves according to the present invention in the fuzzy recognition of the freehand curves.
Figure 59A:
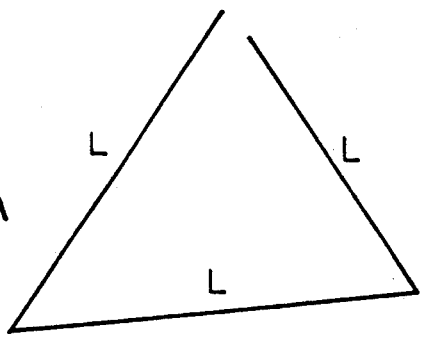
FIGS. 59A and 59B are diagrams showing an example of the representative curves before connected and the connected representative curves for explaining the connection process according to the present invention in the fuzzy recognition of the freehand curves.
Figure 59B:
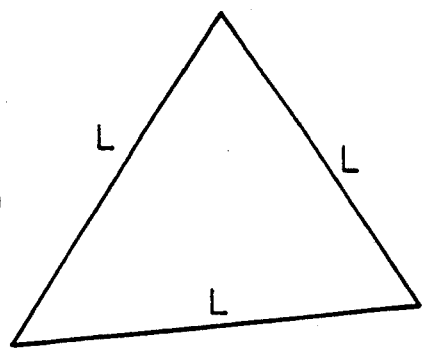
Figure 60A:
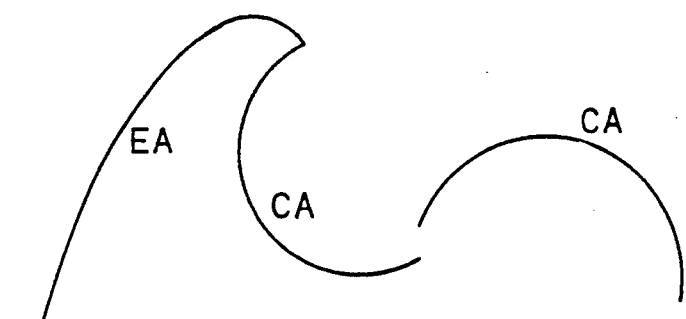
FIGS. 60A and 60B are diagrams showing another example of the representative curves before connected and the connected representative curves for explaining the connection process according to the present invention in the fuzzy recognition of the freehand curves.
Figure 60B:
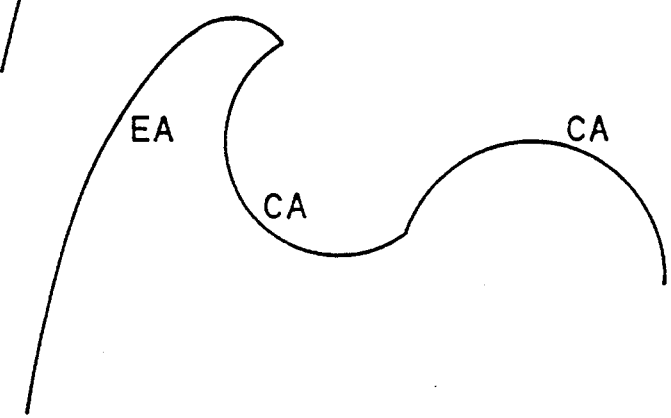
Figure 61A:
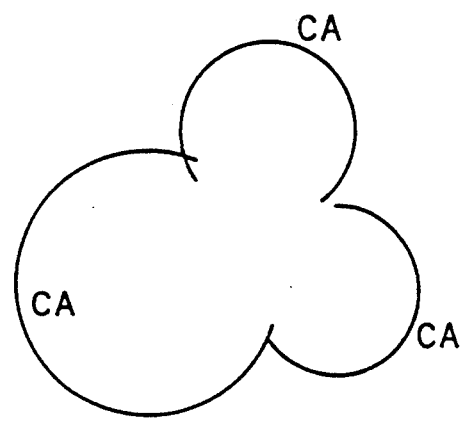
FIGS. 61A and 61B are diagrams showing yet another example of the representative curves before connected and the connected representative curves for explaining the connection process according to the present invention in the fuzzy recognition of the freehand curves.
Figure 61B:
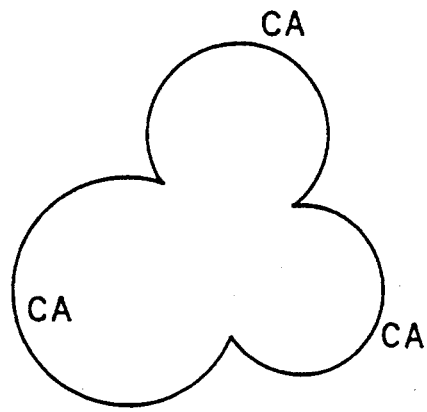

First, as shown in FIG. 57, the second and succeeding representative curves are subjected to parallel displacement so that the start and end points of the representative curve of each of the curve segment coincides with each other. In this stage, the end point of the last representative curve (p'e4 in FIG. 57) may possibly displaced from the original point (pe4 in FIG. 56) due to the accumulation of displacement by the parallel displacement. Accordingly, in order not to change the shape of the outline as much as possible, a connection point (p's3 in FIG. 57) farthest from the start point (p's1 in FIG. 57) of the first representative curve is obtained. Then, the representative curves following this connection point are subjected to rotation and enlargement/reduction so that the end point of the last representative curve coincides with the original end point (FIG. 58).

The representative curves previously obtained are represented as the rational Bézier curve or the B-spline curve. For this reason, the affine conversion such as parallel displacement, rotation, and enlargement/reduction necessary for the connection process can be realized easily by the affine conversion of the Bézier polygon or the control polygon.

If the recognized and selected representative curves are appropriate, a preferable connection process is obtained as shown in FIGS. 59A, 59B, 60A, 60B, 61A and 61B by the above described connection process.

Figure 62:
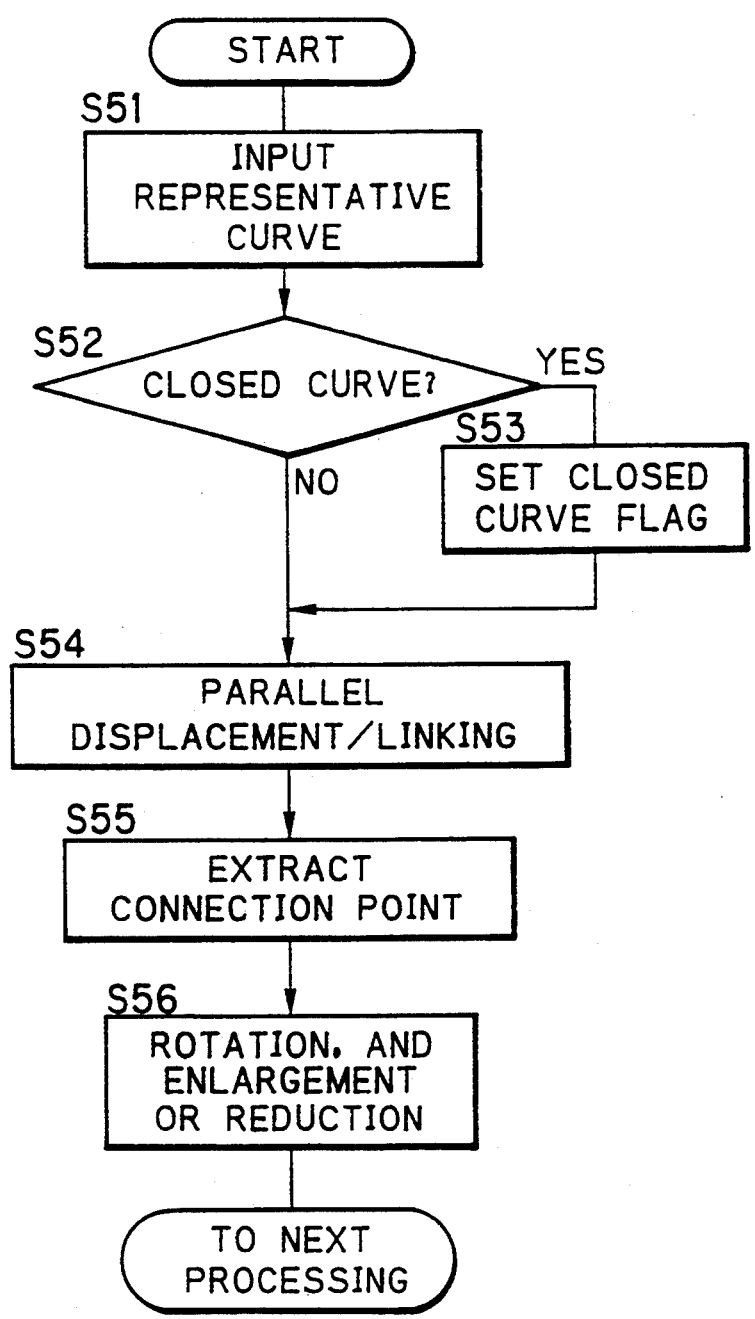
FIG. 62 is a flowchart of the connection process of the representative curves in FIG. 6.

FIG. 62 shows a flowchart of the Curve Connection Process M13.

First, the representative curves of line, circle, elliptic arc, ellipse, elliptic arc, closed freedom curve and open freedom curve are input for each of the fundamental curve segment (step S51). The representative curves obtained in step S51 are expressed either as the Bézier curve of the spline curve.

Next, it is determined whether or not the entire input curve is the closed curve (step S52). If the input curve is the closed curve, a closed curve flag is set (step S53). In order to determine the closed curve, the algorithm similar to the evaluation of the closeness of each segment described above is used.

The second and succeeding representative curves obtained in step S51 are sequentially subjected to the parallel displacement and mutually connected and linked (step S54).

Next, a connection point farthest from the start point of the first representative curve of the representative curves obtained in step S51 and subjected to the parallel displacement in step S54 (step S55).

The succeeding representative curves following the connection point are rounded in bundle around the connection point obtained in step S55 and enlarged/reduced to obtain the final connection result (step S56). The step S56 is executed with reference to the closed curve flag. When the closed curve flag is off, i.e., when the input curve is the open curve, the rotation and enlargement/reduction is performed such that the end point of the final representative curve coincides with the original point of the representative curve. Further, when the closed curve flag is on, i.e., when the input curve is the closed curve, the rotation and enlargement/reduction is performed such that the end point of the final representative curve coincides with the start point of the first representative curve.

According to the method described above, a series of representative curves of the curve sample model for each representative curve segment represented as a portion of the fuzzy spline curve are appropriately connected so that a sequence of curves along the intention of the original input curve can be obtained.

<Parameter Conversion of Recognized Curve Representative Values (Representative Curves) M14>

Among the representative curves obtained as described above, circle, circular arc, ellipse, and elliptic arc are expressed as the rational Bézier curve. However, this expression is not general as a representation form of an ordinary CAD system. For this reason, the output result according to the present method must be converted into a General parameter representation for use with the ordinary CAD system.

Circle and Circular Arc Case

Figure 63:
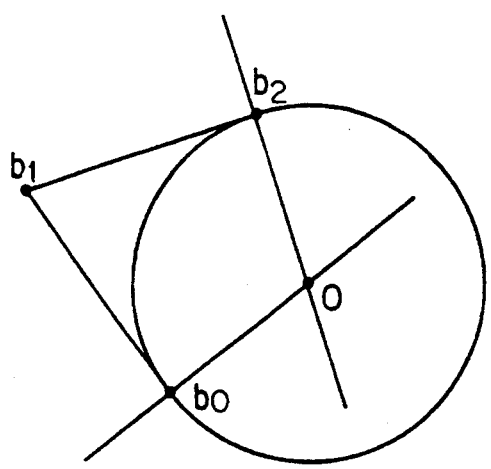
FIG. 63 relates to the explanation of the algorithm for the fuzzy recognition of the freehand curves to which the present invention is applied and illustrates a diagram for explaining Bézier polygon and its center of a circle.

Circle is represented by its center and radius. Circular arc is represented by its center, radius, start point and end point. In this stage, since the start end end points have already been obtained, only the center and the radius are obtained Center o can be obtained as the intersection of a perpendicular of line between b0 and b1 and passing through b0 and a perpendicular of line between b2 and b1 and passing through b2 as shown in FIG. 63. If the center o is obtained, then the radius is obtained as the distance between b0 and o.

Ellipse and Elliptic Arc Case

Ellipse is represented by its center, major axis, minor axis, and inclined angle with respect to abscissa (x-axis) of the major axis. Elliptic arc is represented by its center, major axis, minor axis, inclined angle with respect to abscissa of the major axis, start point and end point. The start and end points of the elliptic arc have already been obtained, the center, major axis and minor axis and inclined angle of the major axis may only be obtained.

First, the following result can be obtained by obtaining implicit function expression of ellipse as shown in equation (93) from the Bézier polygon b0 b1 b2 and weight w.

$$ax^2 + 2hxy + by^2 + 2gx + 2fy + c = 0 \tag{93}$$

The center $o = (x0, y0)$ of the ellipse can be obtained from the implicit function expression of equation (93), as shown in equations (94) and (95).

$$x_0 = \frac{hf - bg}{ab - h^2} \tag{94}$$

$$y_0 = \frac{hg - af}{ab - h^2} \tag{95}$$

In order to obtain the major axis and the minor axis, two solutions of quadratic equation of t as shown in equation (96) are obtained. The solution having a smaller value is denoted as ta and the solution having a larger value is denoted as tb.

$$t^2 - (a+b)t + (ab - h^2) = 0 \tag{96}$$

Next, equation (97) is obtained and then major axis (length of major axis) dl and minor axis (length of minor axis) ds are obtained as shown in equations (98) and (99).

$$D = \begin{vmatrix} a & h & g \\ h & b & f \\ g & f & c \end{vmatrix} = abc - ch^2 - af^2 - bg^2 + 2fgh \tag{97}$$

$$d_l = 2\sqrt{\frac{D}{t_a(h^2 - ab)}} \tag{98}$$

$$d_s = 2\sqrt{\frac{D}{t_b(h^2 - ab)}} \tag{99}$$

In order obtain inclination $\theta$ of major axis, equation (100) satisfying $0 \leq \theta' < (\pi/2)$ is obtained.

$$\theta' = \frac{1}{2} \tan^{-1}\left(\frac{2h}{a-b}\right) \tag{100}$$

Then, $\theta$ is expressed by equation (101) depending on the sign of h and obtained so as to satisfy $0 \leq \theta < \pi$.

$$\theta = \begin{cases} \theta' & \text{(for } h \leq 0\text{)} \\ \theta' + \frac{\pi}{2} & \text{(for } h > 0\text{)} \end{cases} \tag{101}$$

Figure 64:
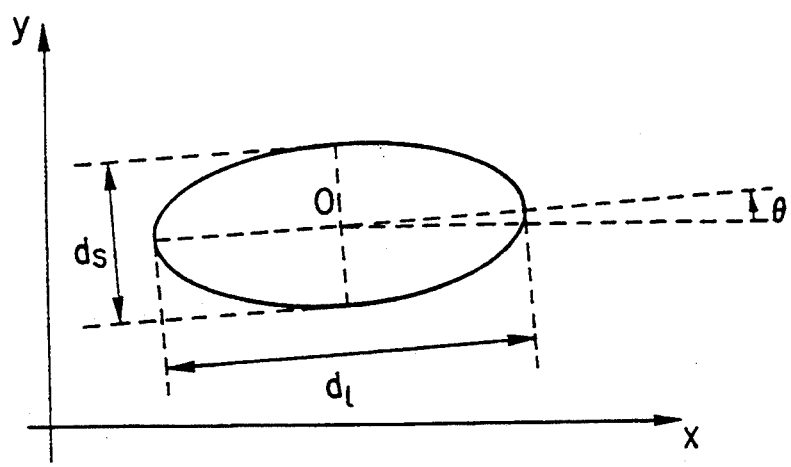
FIG. 64 relates to the explanation of the algorithm for the fuzzy recognition of the freehand curves to which the present invention is applied and illustrates a diagram for explaining parameters of an ellipse.

FIG. 64 shows the above parameters of the ellipse.

<Recognition Experimental Example>

Figure 65A:
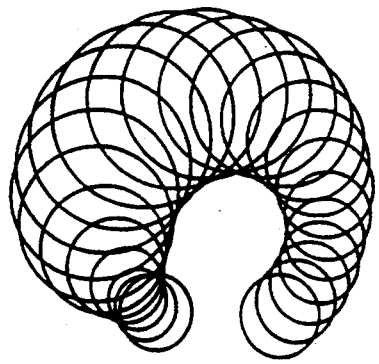
FIGS. 65A and 65B relate to the explanation of the algorithm for the fuzzy recognition of the freehand curves to which the present invention is applied and illustrate diagrams for explaining an example of a curve sample model and an inference result of the fuzzy curve classes due to the algorithm of the present invention.
Figure 65B:
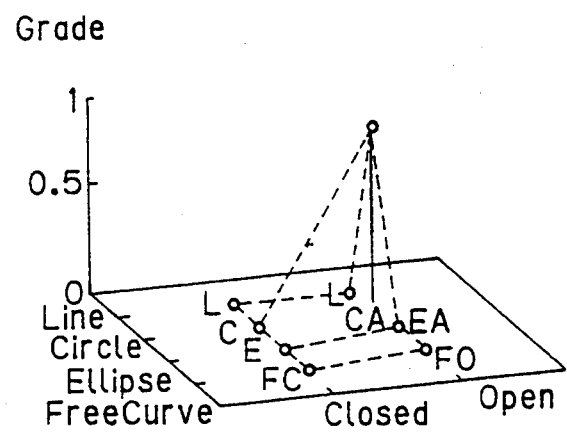
Figure 66A:
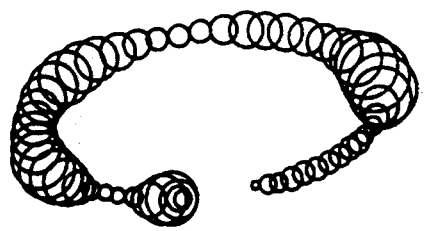
FIGS. 66A and 66B relate to the explanation of the algorithm for the fuzzy recognition of the freehand curves to which the present invention is applied and illustrate diagrams showing another example of a curve sample model and an inference result of the fuzzy curve classes due to the algorithm of the present invention.
Figure 66B:
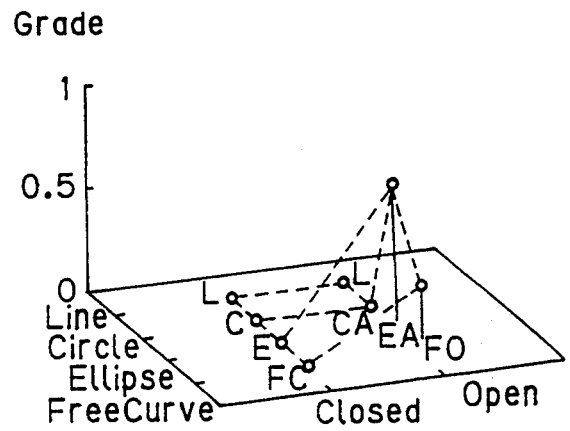
Figure 69A:
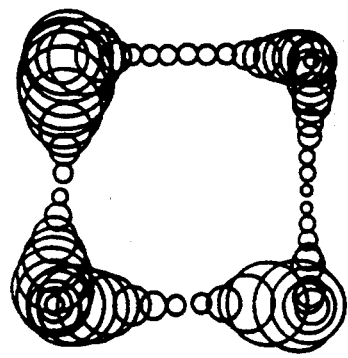
FIGS. 69A and 69B relate to the explanation of the algorithm for the fuzzy recognition of the freehand curves to which the present invention is applied and illustrate diagrams for explaining an example of a curve sample model and a recognized curve due to the algorithm of the present invention.
Figure 69B:
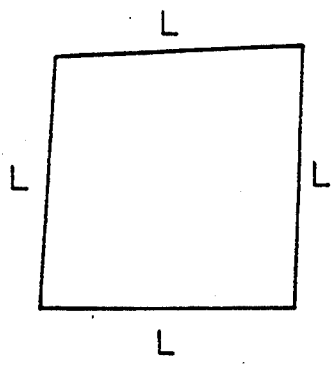
Figure 70A:
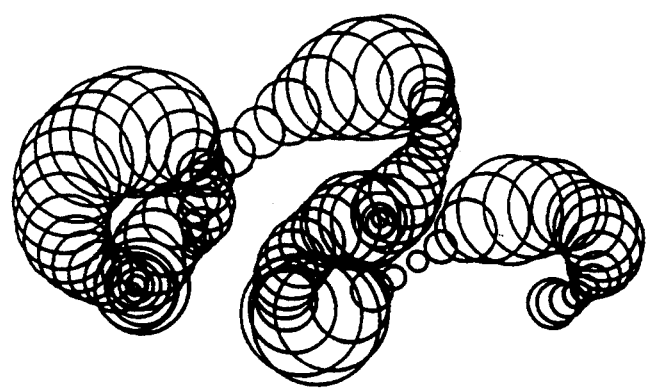
FIGS. 70A and 70B relate to the explanation of the algorithm for the fuzzy recognition of the freehand curves to which the present invention is applied and illustrate diagrams for explaining another example of a curve sample model and a recognized curve due to the algorithm of the present invention.
Figure 70B:
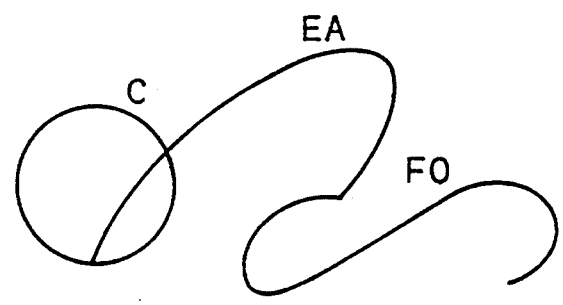

FIGS. 65A and 65B through 68A and 68B show several examples of the curve sample models each constituted by a single curve segment and inferred fuzzy curve classes. FIGS. 65A and 65B show an example of inputting circular arc symbolically by drawing roughly. FIGS. 66A and 66B show an example of inputting the elliptic arc by drawing in a medium rough manner. FIGS. 67A and 67B show an example of inputting a free curve by drawing carefully. FIGS. 68A and 68B show inferred results where the drawing manner and the shape are subtle. As is apparent from the examples shown in FIGS. 65 through 67, the curve classes can be distinguishably drawn depending on the degree of roughness of drawing and the shape. Further, as is apparent from the example shown in FIG. 68, when the drawing manner and the shape are subtle and thus the curve class cannot be determined definitely, information of the vagueness is output as the vague fuzzy curve class which makes the grades of all the curve classes high.

FIGS. 69A, 69B, 70A, and 70B show recognition examples of an input curve constituted by a plurality of curve segments. In FIGS. 60 and 70, A represents a fuzzy-spline-curve-fashioned input curve, and B shows representative curves connected as described above corresponding to the curve class having highest grade among the inferred fuzzy curve classes with respect to each curve segment.

In the above embodiments, a system comprising a pen and tablet unit, and a computer has been exemplified. The present invention can also be applied to a pen computer system as well as a CAD system using a pointing device such as a mouse.

What is claimed is:

1. A system for identifying freehand curve drawings comprising:
    a tablet device having a display/input surface, a display device for displaying data on the display/input surface and a pen for inputting a freehand curve drawing by a trace on the display/input surface as a series of point data representing a series of points of the drawing; and
    a curve identifying device for executing a process for identifying a curve from the series of point data being inputted through the tablet device;
    said curve identifying device comprising:
    (1) a memory for storing results of execution of the process for identifying a curve and providing the results to the display device of the tablet device for displaying the results on the display/input surface;
    (2) fuzzy curve information generating means for generating fuzzy curve information by adding input positional vagueness information to each point data of the series of point data being inputted through the tablet device, said input positional vagueness information being generated in accordance with input behavior of the freehand curve drawing by use of the pen on the display/input surface of the tablet device;
    (3) segmentation means for dividing the fuzzy curve information into a plurality of segments by evaluating a degree of standstill at each of the points of the drawing based on said input positional vagueness information, and for outputting to the memory a result of division of the fuzzy curve information, said degree of standstill representing a possibility that each of the points of the drawing is a stop of a stroke of the pen on the display/input surface of the tablet device when inputting the freehand curve drawing; and
    (4) curve class identifying means for identifying a curve class and a representative curve in the curve class by measuring a possibility of the curve class for each of the segments with respect to each of a plurality of curve classes, and for outputting to the memory a result of identification of a curve class.

2. The system according to claim 1, wherein the segmentation means obtains from the fuzzy curve information, possibility and necessity that each point is a standstill, evaluates in accordance with the possibility and the necessity, a degree of standstill at each of the points as an interval truth value, and divides the fuzzy curve information into a plurality of segments in accordance with evaluation result.

3. The system according to claim 1, wherein the curve class identifying means comprises:
    curve sample model generating means for generating an input curve sample model of each segment;
    line reference model generating means for generating a fuzzy-fashioned line reference model;
    circular arc reference model generating means for generating a fuzzy-fashioned circular arc reference model; and
    elliptic arc reference model generating means for generating a fuzzy-fashioned elliptic arc reference model.

4. The system according to claim 3, wherein the line reference model generating means comprises:
    means for selecting appropriate two fuzzy points as first and second fuzzy representative points from the input curve sample model generated by the curve sample model generating means; and
    means for generating the fuzzy-fashioned line reference model by constructing a fuzzy line satisfying the representative points as a set of interior-division fuzzy point and exterior-division fuzzy point between the first and second fuzzy representative points.

5. The system according to claim 3, wherein the elliptic arc reference model generating means comprises:
    means for selecting appropriate two fuzzy points as the first and second fuzzy representative points from the input curve sample model generated by the curve sample model generating means;
    means for obtaining as a third fuzzy representative point a fuzzy point farthest from a line connecting ridges of membership functions of the first and second fuzzy representative points among the fuzzy points of a portion between the first and second representative points on the input curve sample model;
    means for selecting an arbitrary one point as an auxiliary point from farthest points from the lines connecting the ridges of the membership functions of the first through third fuzzy representative points on the input curve sample model; and
    means for generating a fuzzy-fashioned elliptic arc reference model by constructing as a quadratic fuzzy rational Bézier curve, a fuzzy elliptic arc satisfying the first through third fuzzy representative points as well as the auxiliary point.

6. A system for identifying freehand curve drawings, comprising:
    a tablet device having a display/input surface, a display device for displaying data on the display/input surface and a pen for inputting a freehand curve drawing by a trace on the display/input surface as a sequence of point data representing a sequence of points of the drawing; and
    a curve identifying device for executing a process for identifying a curve from the sequence of point data being inputted through the tablet device;

said curve identifying device comprising;
(1) a memory for storing results of execution of the process for identifying a curve and providing the results to the display device of the tablet device for displaying the results on the display input surface;
(2) fuzzy curve information generating means for generating fuzzy curve information by adding input positional vagueness information to each point data of the sequence of point data being inputted through the tablet device, said input positional vagueness information being generated in accordance with input behavior of the freehand curve drawing by use of the pen on the display/input surface of the tablet device;
(3) segmentation means for dividing the fuzzy curve information into a plurality of segments by evaluating a degree of standstill in the fuzzy curve information with respect to each of the points of the drawing based on said input positional vagueness information, and for outputting to the memory a result of division of the fuzzy curve information, said degree of standstill representing a possibility that each of the points of the drawing is a stop of a stroke of the pen on the display/input surface of the tablet device when inputting the freehand curve drawing;
(4) curve class identifying means for identifying a curve class and a representative curve in the curve class for each segment by verifying possibility of the curve class for each segment with respect to each of a plurality of curve classes and for outputting to the memory a result of identification of a curve class; and
(5) connecting means for connecting representative curves by adjusting positions of the representative curve and for outputting to the memory a result of connecting the representative curves.

7. The system according to claim 6, wherein the segmentation means obtains possibility and necessity that each point is a standstill from the fuzzy curve information, evaluates a degree of standstill at each point as an interval truth value in accordance with the possibility and the necessity, and divides the fuzzy curve information into a plurality of segments based on the evaluation result.

8. The system according to claim 6, the curve class identifying means comprises:
curve sample model generating means for generating an input curve sample model at each segment;
line reference model generating means for generating a line reference model represented in a fuzzy manner;
circular arc reference model generating means for generating a circular arc reference model represented in a fuzzy manner; and
elliptic arc reference model generating means for generating an elliptic arc reference model represented in a fuzzy manner.

9. The system according to claim 8, wherein the line reference model generating means comprises:
means for selecting appropriate two fuzzy points as first and second fuzzy representative points from the input curve sample model generated by the curve sample model generating means; and
means for generating the line reference model represented in the fuzzy manner by constructing a fuzzy line satisfying the fuzzy representative points as a set of interior-division point and an exterior-division point between the first and second fuzzy representative points.

10. The system according to claim 8, wherein the circular arc reference model generating means comprises:
means for selecting appropriate two points as first and second fuzzy representative points from the input curve sample model generated by the curve sample model generating means;
means for obtaining as a third fuzzy representative point a fuzzy point farthest from a line connecting ridges of membership functions of the first and second fuzzy representative points among fuzzy points of a portion between then first and second representative points on the input curve sample model;
means for selecting an arbitrary point as an auxiliary point from farthest points from the line connecting the ridges of the membership functions of the first through third fuzzy representative points on the input curve sample model; and
means for generating the elliptic arc reference model represented in a fuzzy manner by constructing a fuzzy elliptic arc satisfying the first through third fuzzy representative points as well as the auxiliary point.

11. The system according to claim 6, the connecting means comprises:
means for sequentially linking each representative curve by sequentially displacing parallelly second and succeeding representative curves of a sequence of representative curves obtained by the identifying means of the curve classes;
means for obtaining a point farthest from a start point of a first representative curve of the linked representative curves; and
means for rotating as well as enlarging and reducing in bundle around the connecting point the representative curves following the connecting point, and making an end point of last representative curve to be coincident with a position of an end point of original representative curve.

12. A system for identifying freehand curve drawings, comprising:
a tablet device having a display/input surface, a display device for displaying data on the display/input surface and a pen for inputting a freehand curve drawing by a trace on the display/input surface as a sequence of dots of the drawing; and
a curve identifying device for executing a process for identifying a curve from the sequence of dots being inputted through the tablet device;
said curve identifying device comprising:
(1) a memory for storing results of execution of the process for identifying a curve and providing the results to the display device of the tablet device for displaying the results on the display/input surface;
(2) fuzzy curve information generating means for generating fuzzy curve information from the sequence of dots of the drawing by adding input positional vagueness information to data representative of each dot of the sequence of dots being inputted through the tablet device, said input positional vagueness information being generated in accordance with input behavior of the freehand curve drawing by use of the pen on the display/input surface of the tablet device, and interpolating to the sequence of dots of the drawing and the input positional vagueness information;

(3) segmentation means for evaluating a degree of standstill at each point on the fuzzy curve information based on said input positional vagueness information, said degree of standstill representing a possibility that each of the points of the drawing is a stop of a stroke of the pen on the display/input surface of the tablet device when inputting the freehand curve drawing, said segmentation means preliminarily dividing the fuzzy curve information into a plurality of segments and outputting to the memory candidates for partition points of the fuzzy curve drawing;

(4) first defining means for converting the candidates for partition points into definite partition points in response to interactive operation by use of the pen on the display/input surface of the tablet device;

(5) curve class identifying means for preliminarily recognizing a curve class and a representative curve in the curve class for each segment by verifying possibility of the curve class for each segment with respect to each of a plurality of curves, and for outputting to the memory recognition candidates of a curve class;

(6) connecting means for connecting the representative curves by adjusting a position of the representative curve, and for outputting to the memory a result of connection of the representative curves;

(7) second defining means for converting the recognition candidates into a definite recognition result of the curve class and the representative curve for each segment in response to interactive operation by use of the pen on the display/input surface of the tablet device, and restarting the connection means; and (8) parameter conversion means for converting the connected representative curve at each segment into parameters of the curve drawing and outputting the parameters to the memory.

13. The system according to claim 12, wherein the segmentation means obtains possibility and necessity that each point is a standstill from the fuzzy curve information, evaluates a degree of standstill as an interval truth value in accordance with the possibility and the necessity, and divides the fuzzy curve information into a plurality of segments in accordance with the evaluation result.

14. The system according to claim 12, wherein the curve class identifying means comprises:
curve sample model generating means for generating a curve sample model at each segment;
line reference model generating means for generating a line reference model represented in a fuzzy manner;
circular arc reference model generating means for generating a circular arc represented in a fuzzy manner; and
elliptic arc reference model generating means for generating an elliptic arc reference model represented in a fuzzy manner.

15. The system according to claim 14, wherein the line reference model generating means comprises:
means for selecting appropriate two fuzzy points as first and second fuzzy representative points from an input curve sample model generated by the curve sample model generating means; and
means for generating the line reference model represented in a fuzzy manner by constructing a fuzzy line satisfying the representative points as a set of an interior-division point and an exterior-division point between the first and second fuzzy representative points.

16. The system according to claim 14, wherein the elliptic arc reference model generating means comprises:
means for selecting appropriate two fuzzy points as first and second fuzzy representative points from the input curve sample model generated by the sample model generating means;
means for obtaining as a third fuzzy representative point a fuzzy point farthest from a line connecting ridges of membership functions of the first and second fuzzy representative points among fuzzy points of a portion from the first representative point to the second representative point on the input curve sample model;
means for selecting an arbitrary point as an auxiliary point from farthest points from the line connecting the ridges of the membership functions of the first through third fuzzy representative points on the input curve sample model; and
means for generating the elliptic reference model represented in a fuzzy manner by constructing a fuzzy elliptic arc satisfying the first through the third points as well as the auxiliary point as a quadratic rational Bézier curve.

17. The system according to claim 12, wherein the connecting means comprises:
means for sequentially displacing second and the succeeding representative curves of a sequence of curves obtained by the curve-class identifying means and sequentially linking each representative curves;
means for obtaining a connection point farthest from a start point of a first representative curve of the linked sequence of representative curves; and
means for rotating and enlarging/reducing around the connection point the representative curves following the connection point and making an end point of last representative curve to be coincident with a position of a original end point of the representative curve.

18. The system according to claim 1, wherein said fuzzy curve generating means comprises accelerating means for generating said positional vagueness information in accordance with acceleration of the pen on the display/input surface of the tablet device while inputting the freehand drawing.

19. The system according to claim 18, wherein said accelerating means comprises means for generating said positional vagueness information as a radius of a circle proportional to said acceleration of the pen on the display/input surface of the tablet device while inputting the freehand drawing.

20. The system according to claim 1, wherein said fuzzy curve generating means comprises pressure means for generating said positional vagueness information in accordance with pressure of the pen on the display/input surface of the tablet device while inputting the freehand drawing.

* * * * *